United States Patent [19]
Lindsley

[11] Patent Number: 6,128,672
[45] Date of Patent: Oct. 3, 2000

[54] DATA TRANSFER USING SOFTWARE INTERRUPT SERVICE ROUTINE BETWEEN HOST PROCESSOR AND EXTERNAL DEVICE WITH QUEUE OF HOST PROCESSOR AND HARDWARE QUEUE POINTERS ON EXTERNAL DEVICE

[75] Inventor: Brett Louis Lindsley, Wheaton, Ill.

[73] Assignee: Motorola, Inc., Schaumburg, Ill.

[21] Appl. No.: 09/037,692

[22] Filed: Mar. 10, 1998

[51] Int. Cl.[7] .................. G06F 3/00; G06F 3/02; G06F 3/23; G06F 3/05; G06F 13/24
[52] U.S. Cl. .................. 710/19; 710/15; 710/17; 710/18; 710/29; 710/48; 710/52; 710/263
[58] Field of Search .................. 395/872; 710/52, 710/15, 17, 18, 19, 29, 48, 263

[56] References Cited

U.S. PATENT DOCUMENTS

| | | | |
|---|---|---|---|
| 4,380,063 | 4/1983 | Janson et al. | 370/60 |
| 4,527,233 | 7/1985 | Ambrosius, III et al. | 364/200 |
| 4,964,040 | 10/1990 | Wilcox . | |
| 4,965,793 | 10/1990 | Polzin et al. | 370/94.1 |
| 5,459,839 | 10/1995 | Swarts et al. | 395/650 |
| 5,465,335 | 11/1995 | Anderson . | |
| 5,604,866 | 2/1997 | Kolb et al. | 395/200.13 |
| 5,890,208 | 3/1999 | Kwon | 711/112 |
| 5,938,747 | 8/1999 | Young | 710/53 |

OTHER PUBLICATIONS

FASTCHART—A Fast Time Deterministic CPU And Hardware Based Real–Time Kernel, Lennart Lindh et. al., IEEE Publication Jun. 1991, pp. 36–40.

*Primary Examiner*—Thomas C. Lee
*Assistant Examiner*—Tanh O. Nguyen

[57] ABSTRACT

The present invention provides a method, device and article of manufacture for efficient transfer of data items between a host processor and an external device. The host processor is coupled to external queue pointers and is used for queuing a plurality of data items and transferring the plurality of data items to the external device using an interrupt service routine unit. The external device is coupled to the host processor and is used for storing and incrementing or decrementing the external queue pointers, and processing the data items.

31 Claims, 24 Drawing Sheets

— PRIOR ART —

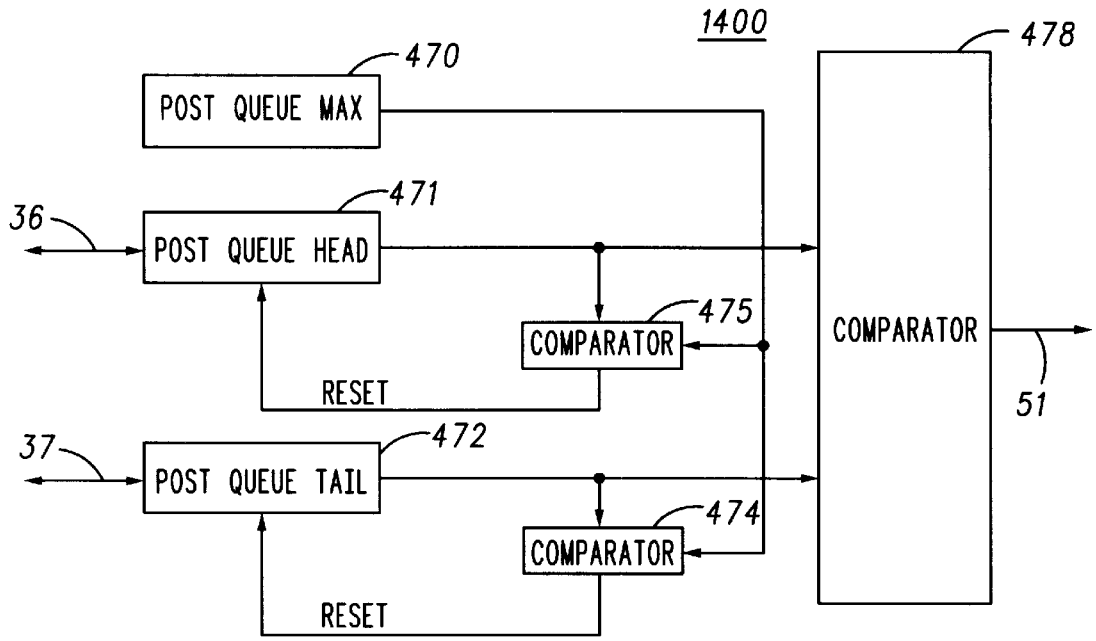
FIG.14
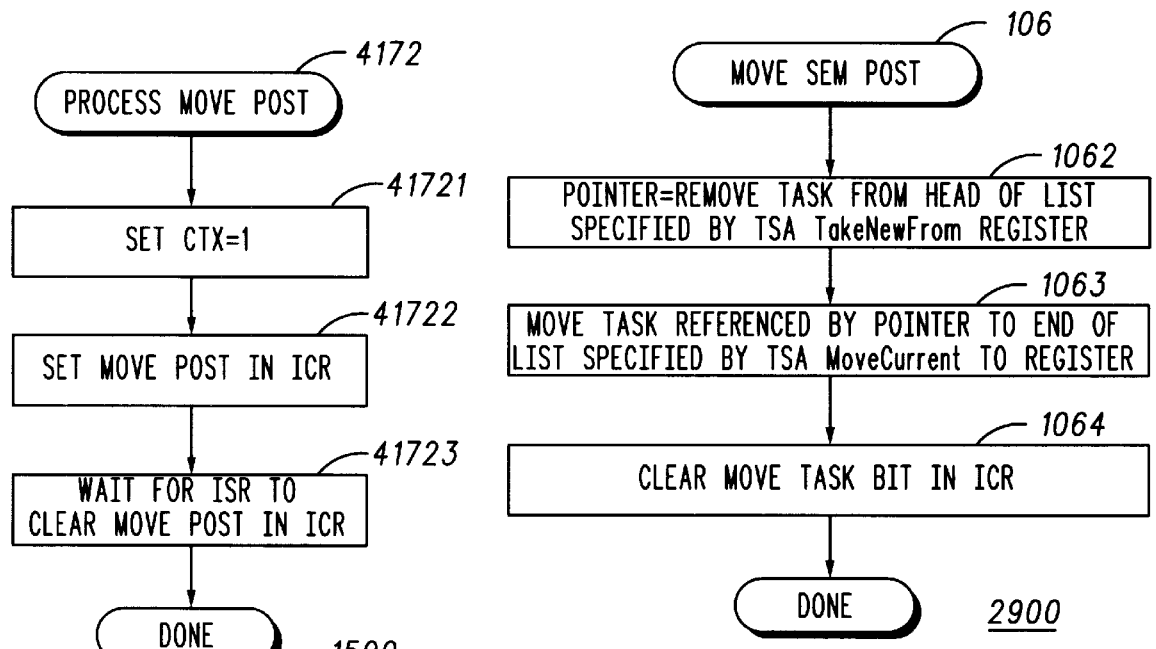
FIG.15
FIG.29
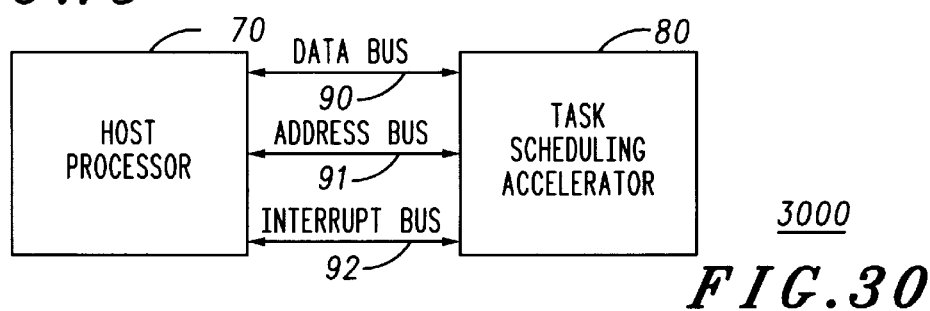
FIG.30

*3400*

*3500*

DATA TRANSFER USING SOFTWARE INTERRUPT SERVICE ROUTINE BETWEEN HOST PROCESSOR AND EXTERNAL DEVICE WITH QUEUE OF HOST PROCESSOR AND HARDWARE QUEUE POINTERS ON EXTERNAL DEVICE

RELATED PATENT APPLICATIONS

The present patent application is related to the following patent applications which are being filed simultaneously (and are hereby incorporated herein) and are assigned to the same entity, Motorola, Inc.: U.S. patent application Ser. No. 09/037,173, still pending, Method, Device and Article of Manufacture for Efficient Task Scheduling in a Multi-tasking Preemptive Priority-Based Real-Time Operating System, by Brett Louis Lindsley; U.S. patent application Ser. No. 09/041,101, still pending, Method, Device and Article of Manufacture for Implementing a Real-Time Task Scheduling Accelerator, by Brett Louis Lindsley, Uri Dayan and Moshe Tarrab; U.S. patent application Ser. No. 09/037, 599, still pending, Method, Device and Article of Manufacture for Specifying and Controlling a Task Switch from an External Device in a Multi-Tasking Preemptive Priority-Based Real-Time Operating System, by Brett Louis Lindsley and Ed Martinez; and U.S. patent application Ser. No. 09/041,189, still pending Method, Device and Article of Manufacture for Clearing Command Bits in a Task Scheduling Device for a Multi-Tasking Preemptive Priority-Based Real-Time Operating System, by Brett Louis Lindsley.

FIELD OF THE INVENTION

The field of the invention relates to multiple task execution processors, in particular, a multi-task execution processor having a preemptive prioritized task scheduling system.

BACKGROUND OF THE INVENTION

Multi-tasking is the capability of a single processor to execute multiple tasks concurrently. A processor performs multi-tasking execution by switching between tasks using a defined set of multi-tasking rules. For theoretical reasons, real-time multi-tasking systems preferably use a set of rules where tasks are prioritized. Lower priority tasks can be preempted (forcibly switched) to execute a higher priority task if necessary. This "preemptive prioritized" system always executes the highest priority ready task.

A "task" is defined as an independent entity of computing. For example, where a computer system permits many users on different terminals access to the same processor, the computer system assigns a unique task to each user's computing (where each user's computing is unrelated to another user's computing). Generally, a task unit contains an entry for each task. Tasks are typically synchronized using "events". An event is used to indicate that an activity has taken place, such as data arrival, time-out, etc. Thus, an event may indicate execution of a task, an interrupt service routine or the like. Events are counted using semaphores. Semaphores synchronize the event producer and the event consumer as shown in FIG. 2, numeral 200.

Events are generated by tasks 201 or interrupt service routines (ISRs) 202. ISRs are not allowed to consume events because ISRs are not scheduled and execute outside of the normal task scheduling environment of the processor. However, ISRs are allowed to generate events to indicate the status of the cause of the interrupt.

A counting semaphore 203 allows a plurality of events to be generated without being lost. Similarly, a plurality of tasks may be waiting for the same event. When the semaphore counter is positive, it indicates events have been produced but no tasks are waiting for the events. When the semaphore counter is zero, it indicates no events have been generated and no tasks are waiting. When the semaphore counter is negative, it indicates there are no events generated but a plurality of tasks are waiting for the events. The process of generating an event to a semaphore is typically called "posting" the event 204. The process of waiting for an event from a semaphore is typically called "pending" for the event 205.

When an event is generated for a semaphore that has a list of tasks pending, the task 206 at the head of the list becomes ready for execution. At this time, the task scheduling function 207 must determine if this task should be selected for execution or if it should be put in a list with other ready tasks to be executed at a later time. This decision is based on the priority of the task that is currently executing compared to the priority of the task that has just become ready.

If the task that has just become ready is the same or lower priority than the currently executing task, the currently executing task continues executing. The new ready task is moved to a list to be executed at a later time.

If the task that has just become ready is a higher priority than the currently executing task, the currently executing task is preempted to allow the new ready task to execute. Thus, the highest priority ready task 208 is always selected for execution.

At some time, the currently executing task completes its computation and becomes inactive. A task becomes inactive by pending on a semaphore when the semaphore count is zero or negative. For example, a semaphore may represent data buffers that require processing. If the task that processes data buffers pends for the semaphore that represents data buffers, the task is synchronized to the data buffer generation. If data buffers are available, the semaphore count is greater than zero. Task pend requests on the semaphore allow the task to continue. If data buffers are not available, the semaphore count is less than or equal to zero. When the task pends on the semaphore with a count that is less than or equal to zero, the task does not have data for processing and will block execution.

At the point when a task pends on a semaphore with zero or negative count, the task that has made the request is not allowed to continue execution and must "block". The task scheduling function stops this task and selects another task for execution. The task scheduling function looks at other ready tasks at the same or lower priorities to determine the next highest priority ready task. If a task is found, it is selected for execution. If a task is not found, the processor is put into an idle state until a task becomes ready.

Although the task selection process is easy to understand, in a practical environment this can lead to significant inefficiencies. For example, the following cause inefficiencies in a preemptive prioritized task scheduling system:

Each time a semaphore is processed, there is a potential for a task change. This causes the scheduling function to be called quite often when many times there is no change.

When a task pends for a semaphore and blocks, the scheduler must perform a search algorithm to determine the next ready task. If there are a large number of tasks and priority levels, this activity may be time-consuming.

The process of searching for a task may have variable timing making task scheduling functions non-deterministic.

The task scheduler must obtain control of the processor to switch tasks.

In a software task scheduling system, interrupt service routines typically require entry and exit code to flag interrupt usage and nesting. The flagging is typically used to call the scheduler to determine if the interrupt generated an event that may have changed execution. The use of entry and exit code consumes time and is undesirable when processing interrupts.

Solutions to the problems set forth above typically involve constraining the functionality of the scheduler. These constraints may include limiting the number of tasks, limiting the number of priority levels, limiting the number of tasks at each priority level, limiting the representation range of the semaphore counter, etc. It is undesirable to have such constraints in a system because such constraints may restrict the type of system that can be supported.

Thus, there is a need for a method, device and article of manufacture that optimizes real-time multi-tasking for a processor.

SUMMARY

A combined hardware and software data queuing mechanism for efficient data transfer from a host processor to an external device is presented. In one embodiment, the host processor maintains a queue of data items and the external device maintains hardware pointers to the queue. Data is efficiently stored in the host processor's queue by reading the external hardware pointers when the external device data registers are full. Data is efficiently retrieved from the queue and written to the external device by an interrupt service routine by reading the external hardware pointers. The hardware queue pointers automatically increment and wrap when reaching a maximum value. Placing the queue pointers in hardware relieves the software of maintaining the pointers, incrementing them and wrapping them. Since the external hardware device has direct access to the queue pointers, the external hardware device asserts its interrupt to request data from the host processor only when it knows there is data queued in the host processor.

In one embodiment, a device provides efficient transfer of data items between a host processor and an external device. The device includes the host processor and the external device. The host processor is coupled to external queue pointers. The host processor is capable of queuing a plurality of data items and transferring the plurality of data items to the external device using an interrupt service routine unit. The external device is coupled to the host processor for storing and incrementing/decrementing the external queue pointers and processing the data items.

In another embodiment, a method for efficient transfer of data items between a host processor and an external device is provided. The method includes using a host processor which is coupled to external queue pointers for queuing a plurality of data items. The method further includes transferring the plurality of data items to the external device using an interrupt service routine unit, and using the external device which is coupled to the host processor for storing and manipulating the external queue pointers and processing the data items.

In another embodiment, an article of manufacture having a device for efficient transfer of data items between a host processor and an external device is provided. The device includes the host processor and the external device. The host processor is coupled to external queue pointers for queuing a plurality of data items and transferring the plurality of data items to the external device using an interrupt service routine unit. The external device is coupled to the host processor for storing and manipulating the external queue pointers, and processing the data items.

The foregoing is a summary and thus contains, by its very nature and by necessity, simplifications, generalizations and omissions of detail. Consequently, the reader will appreciate that the summary is illustrative only and is not intended to be limiting in any way. Other aspects, inventive features, and advantages of the present invention, as defined solely by the claims, will become apparent to one of ordinary skill in the art based on the teachings of the non-limiting detailed description set forth below.

BRIEF DESCRIPTION OF THE DRAWINGS

FIG. 14 is a schematic representation of operation of pointer registers for assisting the queuing of semaphore posts in accordance with the present invention.

FIG. 15 is a flow chart showing one embodiment of steps for how the state machine requests semaphore posts to be moved from the queue on the host processor to the task scheduling accelerator in accordance with the present invention.

FIG. 29 is a flow chart showing one embodiment of steps for how the interrupt service routine moves a task between queues in accordance with the present invention.

FIG. 30 is a block diagram illustrating how the task scheduling accelerator is physically connected to a host processor in accordance with the present invention.

DETAILED DESCRIPTION OF A PREFERRED EMBODIMENT

Figure 1:
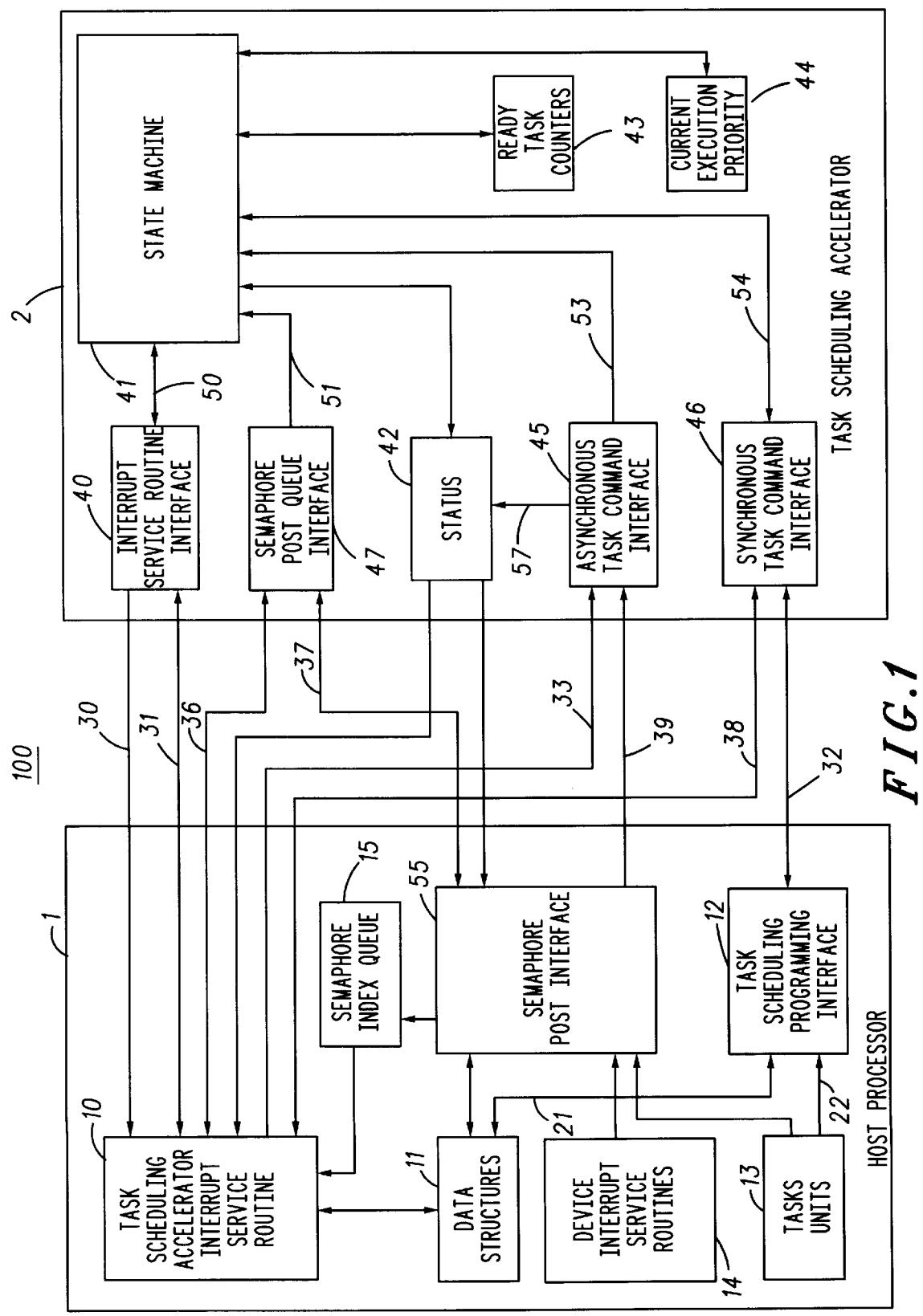
FIG. 1 is a block diagram of one embodiment of a device in accordance with the present invention, showing data flow and functionality of the invention.
Figure 2:
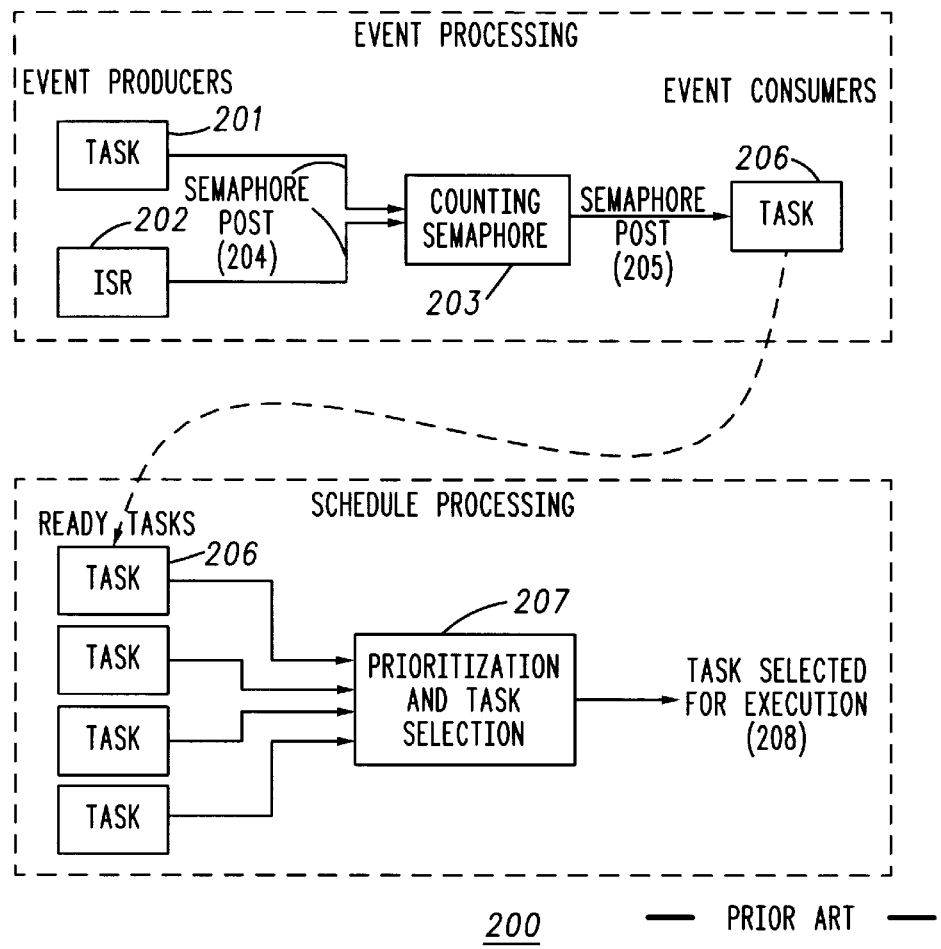
FIG. 2 is a diagrammatic representation of event processing and schedule processing with respect to the basic operation of an event driven preemptive prioritized task multi-tasking system in accordance with the present invention.

The present invention resolves the problems with implementing task scheduling without the need for imposing constraints by moving a selected portion of the task scheduling functionality to an external hardware accelerator. By allowing part of the functionality to remain in software on the host processor, flexibility is maintained without the need of constraints. By moving scheduling decisions to an external accelerator device, fast determination of scheduling decisions is performed. Since the external accelerator device may compute schedule decisions in parallel with activity on the host processor, an overlap of scheduling decisions with host processor activity allows variable or lengthy scheduling decisions to be hidden during host processor activity.

The present invention improves upon software task scheduling implementations because software implementations are typically slow, require interrupt service routine entry and exit functions, and execute scheduling functions in serial with task execution.

The present invention also improves upon prior art hardware devices. Prior art hardware devices store almost all of the information for task scheduling locally in the hardware. To minimize the amount of information stored (and reduce the hardware cost), prior art devices require restrictions to limit the number of tasks, the number of tasks at the same priority level, the range of the semaphore counter, etc.

The present invention improves upon the prior art by providing a method of determining a ready task that is dependent only on the number of priority levels and not the number of tasks. This allows many tasks to be added to the system without an increase in the search time for a ready task. Further, scheduling computations for determining ready tasks is overlapped with the host processor for maximum efficiency. Because scheduling computations are performed externally to the host processor, no entry/exit code is required in interrupt service routines. The present invention is significantly faster than software schedulers. Efficient partitioning of information stored between the hardware and in the host processor significantly reduces the system cost without imposing restrictions.

The present invention utilizes a hardware accelerator, herein called a "task scheduling accelerator" (TSA), for improving the performance of real-time task scheduling without imposing constraints on the functionality of the system. An efficient partitioning between the TSA and the host processor software allows functional flexibility while providing acceleration of task scheduling functionality.

The TSA implements a model of task scheduling where tasks are prioritized and lower priority tasks may be pre-empted if a higher priority task becomes ready. The TSA may execute commands to add a task, exit the current task, yield to another task at the same priority, modify the current task priority, pend for semaphores or post a semaphore. Using these basic functions, real-time operating system functionality may be developed.

The TSA accepts commands from tasks called "synchronous" task commands. These commands are synchronous from the point of view that the task may not issue another synchronous task command until the previous synchronous task command has been completed. It is allowable for the task to perform other activity after issuing a synchronous task command as long as the task verifies the previous synchronous task command has been completed prior to issuing another synchronous task command. The TSA provides the Task Command register to indicate when a synchronous task command has been recognized and clears the status bit when the function is completed.

Interrupts perform functions on the host processor asynchronous to task execution. Since interrupts may generate events by posting semaphores, it is necessary to have a separate mechanism for issuing commands that are asynchronous to tasks. When these "asynchronous" commands are issued, there is no need to wait for them to complete. An important aspect of a system using the TSA is that the TSA may request service from the host processor via an interrupt. This allows the host processor to additionally service TSA needs or to perform a task switch at the time of the interrupt. If the TSA determines the current task needs to be preempted, the TSA asserts its interrupt. This interrupt causes the host processor to enter a special mode for processing the interrupt request. At this time, the currently executing task has been preempted and a new task can be selected simply by changing to a new context. A task switch is performed by saving the context of the current task and loading the context of a new task. The context is defined as all the registers used by the task and any shared resources. Thus, a task switch involves saving all processor registers and shared resources used by the currently executing task and loading a new set of processor registers and shared resources for the new task.

A task command may cause the current task to be preempted. An example of when this occurs is when a task pends for a semaphore, but the semaphore count is zero or negative. The TSA preempts the currently executing task with an interrupt and switches to another task. Eventually, the task that was preempted becomes ready to execute. When the task continues executing, it determines the TSA status bit is clear and continues. The task is completely unaware preemption has taken place and other tasks were executed. This transparent switching of tasks is important to minimize exposure of the task scheduling functionality to the application program.

In a multi-tasking system, tasks are switched by changing the processor "context". Context is the current information representing the execution state of the task. This typically consists of all of the processor's registers and any additional globally shared resources. The TSA is considered to be a globally shared resource because each task writes task commands to the TSA without regard to other tasks. This introduces a difficult problem with external task scheduling hardware that the present invention solves very effectively. The problem is how the host processor can determine if the TSA registers represent context or not.

This issue is illustrated by an example. Consider the case when an interrupt posts a semaphore that readies a higher priority task. The higher priority task preempts the currently executing task. It is possible that the currently executing task was in the process of writing a task command to the TSA. In this case, this task command should be saved and later restored when the task resumes execution. This allows the task to execute the command it issued just prior to being preempted. In this situation, the TSA registers are considered to be context similar to the host processor's registers.

A second case is illustrated when a task issues a task command that causes the task to be preempted. In this situation, if the TSA's registers are saved and then restored, the command that caused the task switch would be restored causing another task switch. In this situation, the TSA registers should not be considered context. Further, the status bit that indicates the task command was completed needs to be cleared to indicate to the task that the command has completed.

The solution to the TSA "context" is to coordinate the context save/restore procedure between the TSA and the host processor interrupt service routine. This coordination adjusts the context (TSA registers) if the preemption is due to a synchronous task command but preserves the context when the task is being preempted due to an asynchronous task command. The details of this procedure are illustrated in finer detail later.

Another issue with external task scheduling devices is the host processor generating events faster than the TSA can process them. This typically happens when interrupt service routines generate interrupts and post semaphores in a non-predictable fashion. One solution is not to allow interrupts to post semaphores. A system of this type is very seriously constrained because activity from hardware devices cannot be efficiently synchronized. Another potential solution is to have the host processor wait until the TSA can accept additional semaphore posts. This is also an unacceptable solution because it makes interrupt service routines wait and is typically not desirable or allowable.

The solution to this problem is to place additional semaphore posts in a queue. The queuing must be efficient and allow the TSA to control the reading of the queue. The present invention employs a unique solution to this problem by partitioning the storage of additional semaphore posts on the host processor while maintaining the pointers to the queue in the TSA. This combination allows the TSA to be always aware of the state of the host processor queue without interrogating the host processor. Since the size of the queue depends on the software architecture, it is effective to store the queue in the host processor where the queue size can be determined based on the host processor software. The details of this procedure are described in finer detail later.

One embodiment of the present invention is shown in FIG. 1, numeral 100. FIG. 1 shows a block diagram of a Host Processor 1 coupled to a task scheduling accelerator (TSA)

Figure 3:
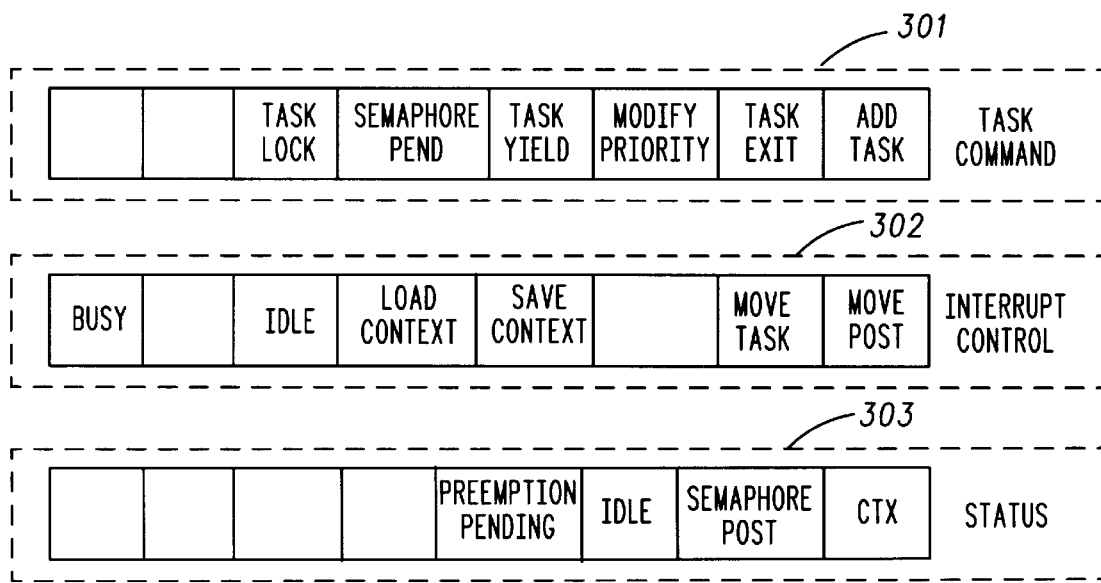
FIG. 3 shows schematic representations of examples of special function bits in control registers for task commands, interrupt control and status in accordance with the present invention describes.

2 that is typically implemented in hardware. The TSA contains registers for control/status or to specify a particular integer value. The control/status registers are shown in FIG. 3, numeral 300.

The Task Command register 301 indicates synchronous task commands issued by tasks on the host processor. These bits include:

Add Task—This bit is set to add a task to the current task set.

Task Exit—This bit is set to exit the currently executing task.

Modify Priority—This bit is set when the currently executing task changes its priority.

Task Yield—This bit is set to yield to another task at the same priority level.

Semaphore Pend—This bit is set when a task makes a pend request.

Task Lock—This bit specifies a mode of operation where the TSA will not preempt the current task. This is typically used to protect critical regions of programs that share data between multiple tasks. When the bit is cleared, the TSA is allowed to preempt the task.

These bits are described in further detail when covering the functions that use them.

The Interrupt Control register 302 specifies the reason for the TSA interrupt to the host processor. There are three major functions this register controls:

Move Post—This is an indication the TSA-ISR is to move a semaphore post index from the semaphore index queue to the asynchronous task command interface. There is no change in the currently executing task.

Move Task—This is an indication to move a task from one task list to another. There is no change in the currently executing task.

Task switch—The task switch is qualified by four bits:
Busy—Indicates the TSA is searching for a ready task.
Save Context—Indicates if the context of the current task should be saved.
Load Context—Indicates if the context of a new task should be loaded.
Idle—Indicates the task set is idle.

These bits are described in further detail when covering the functions that use them.

The Status register 303 specifies additional status information to the host processor or the TSA. These bits include:

CTX—This bit indicates if the TSA-ISR should treat the Task Command register as context (preserve it) or not as context (modify it). This bit is used to clear command bits in the Task Command register during a context switch.

Semaphore Post—This bit indicates a task or interrupt service routine has written a semaphore post to the asynchronous task command interface.

IDLE—This bit is used to retain the state of the task set being in the idle (no active tasks) state.

Preemption Pending—This bit is set to indicate the current task will be preempted when it turns off the task lock. This bit is set by the TSA if a semaphore is posted with a higher priority ready task pending when the task lock is enabled.

These bits are described in further detail when covering the functions that use them.

Figure 4:
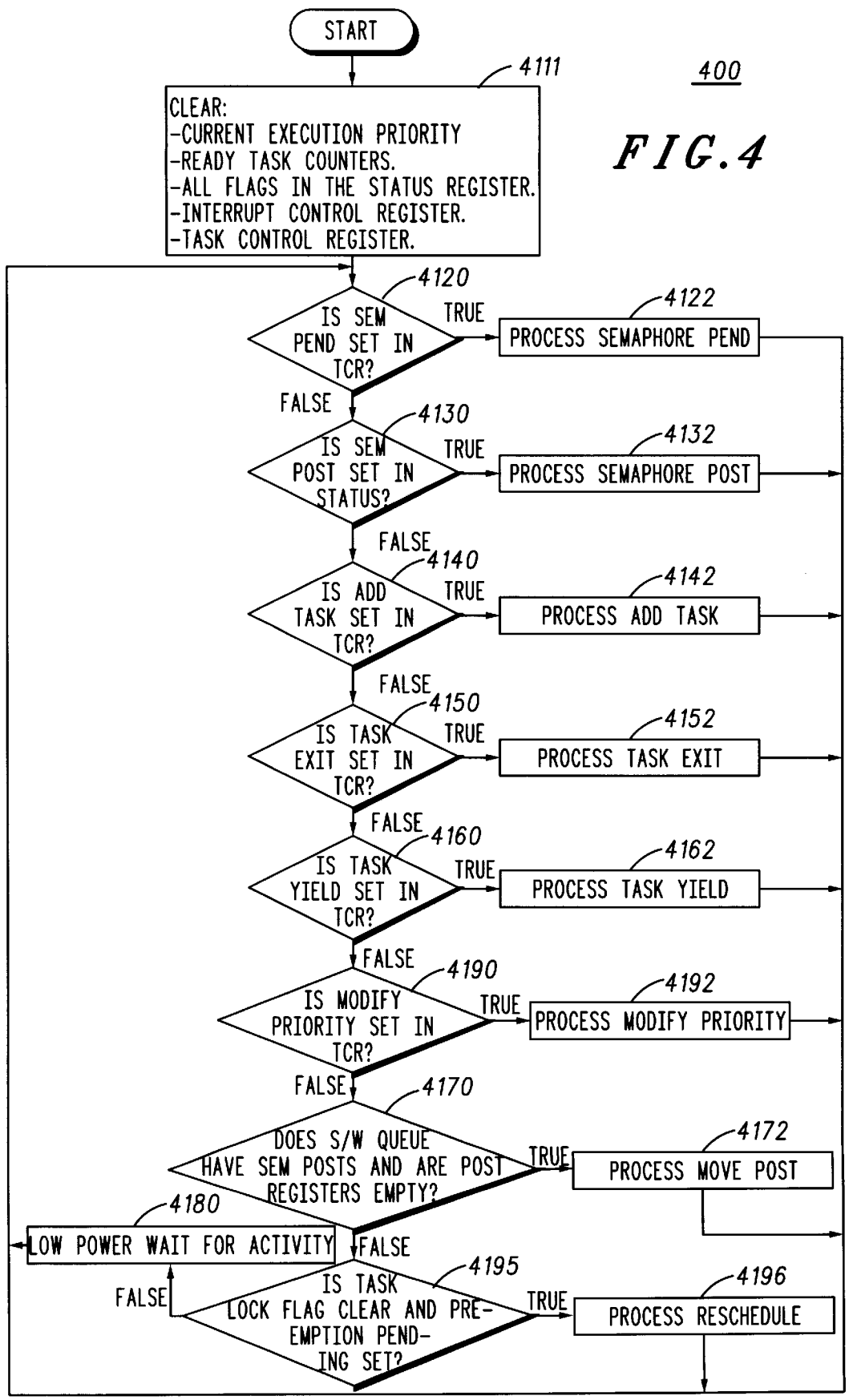
FIG. 4 is a flow chart showing one embodiment of steps for implementing the operation of the state machine that controls the accelerator in accordance with the present invention.

When the system is reset, the TSA begins execution of its internal State Machine 41 as indicated in FIG. 4, numeral 400. At initialization 4111, the State Machine 41 clears:

The Current Execution Priority 44. The Current Execution Priority 44 maintains the priority of the currently executing task. In this embodiment, a zero indicates the highest priority with lower priorities increasing in value. In this embodiment flowcharts indicate "higher priority" to mean a lower numeric value and "lower priority" to indicate a higher numeric value for priority. Since the Current Execution Priority 44 is being initialized to zero, it indicates the first task created by starting the host processor is currently the highest priority.

The Ready Task Counters 43. The Ready Task Counters store a plurality of integers that determines the number of ready tasks at each priority level. Since at reset there are no other ready tasks to execute, all Ready Task Counters 43 are set to zero.

All flags in the Status register 42. This includes
The CTX Flag. This bit indicates if the Synchronous Task Command Interface (STCI) 46 contains context. If the CTX bit is set, it indicates the STCI registers should be preserved because they may contain valid information written by the task that is currently executing. If the CTX bit is clear, it indicates the STCI registers have issued a task command that caused the context switch and the STCI registers should be modified to clear the task command status bit. It is initialized to zero by default.

The Semaphore Post flag. This bit indicates if the semaphore post registers in the Asynchronous Task Command Interface 45 have been written.

The IDLE flag. This bit indicates the host processor is currently idle and not processing any tasks.

The Preemption Pending flag. This bit indicates a ready task of higher priority will preempt the current task when the task lock is turned off.

The Interrupt Control register 403 in the Interrupt Service Routine Interface 40. This register is cleared because if any bit in the Interrupt Control register 403 is set, Interrupt Generator 404 asserts the interrupt 30. Since the TSA does not need any service at start-up, it is required to ensure the interrupt is negated after reset.

The Task Command register 465 in the Synchronous Task Command Interface 46. This register is cleared to indicate there are currently no task commands to process.

After initialization 4111, the State Machine 41 enters a loop checking for a function to execute with comparisons 4120, 4130, 4140, 4150, 4160, 4190 and 4170. The loop checking includes: Is Sem Pend set in the TCR (Task Command Register)? 4120; Is Sem Post set in Status? 4130; Is Add Task set in TCR? 4140; Is Task Exit set in TCR 4150; Is Task Yield set in TCR? 4160; Is Modify Priority set in TCR? 4190; Does S/W queue have sem posts and are post registers empty? 4170; and, Is the task lock off and the preemption pending bit set? 4195. If any comparison is true, the TSA processes the true function 4122, 4132, 4142, 4152, 4162, 4192, 4172, 4196 and returns to the beginning of the loop to check Is Sem Pend set in the TCR 4120. If all comparisons are false, the TSA does not have any functions to process and enters a low power mode 4180 until there is activity. Each of the functions of the State Machine 41 are explained in further detail later. Activity that brings the State Machine 41 out of low power 4180 is any of the loop conditions being true. Since the state machine is turned off when in low power, activity is detected by direct hard-wired logic to the state machine. This is shown in detail in FIG. 32 in the Clock Activate Logic 801600 where signals Semaphore Posted 8032, Task Command 8033 and Software Queue Not Empty 8034 indicate to the Clock Activate Logic 801600 to activate the Clock Control 80161.

The TSA 2 contains several functional interfaces. The Synchronous Task Command Interface (STCI) 46 allows tasks to issue synchronous task commands. A synchronous task command must wait until the TSA 2 has finished processing the previous synchronous task command before issuing another synchronous task command. The Task Command register 465 in the STCI 46 provides status bits that indicates the TSA 2 has recognized the command request. The status bit is cleared when the TSA 2 has completed the command.

Figure 5:
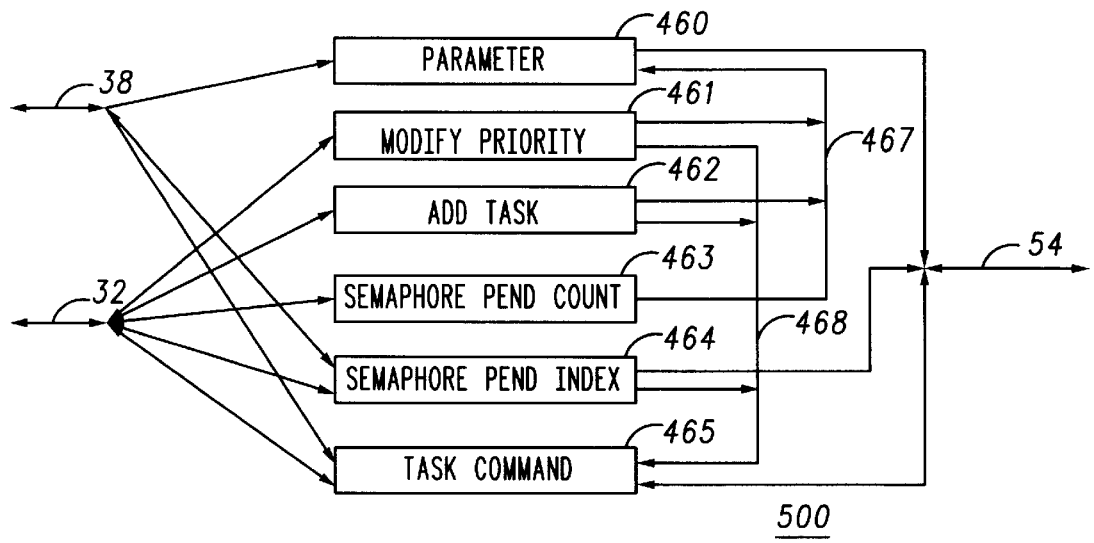
FIG. 5 is a flow chart showing one embodiment of data flows for executing commands that are synchronous to the task wherein the task must allow the previous command to clear before executing the next command in accordance with the present invention.

In one embodiment the STCI 46 contains registers as shown in FIG. 5, numeral 500. The Parameter register 460 is used to store values associated with synchronous task commands. Synchronous task commands that require values are Add Task, Modify Priority and Semaphore Pend. When a synchronous task writes the register to request the command, the value is transferred to this register. Since each synchronous task command must be completed prior to the issuing of another synchronous task command, only one value is written at any given time. This allows a minimization of the amount of hardware registers in the SCTI 46 and reduces context switching time by using a common register.

Figure 6:
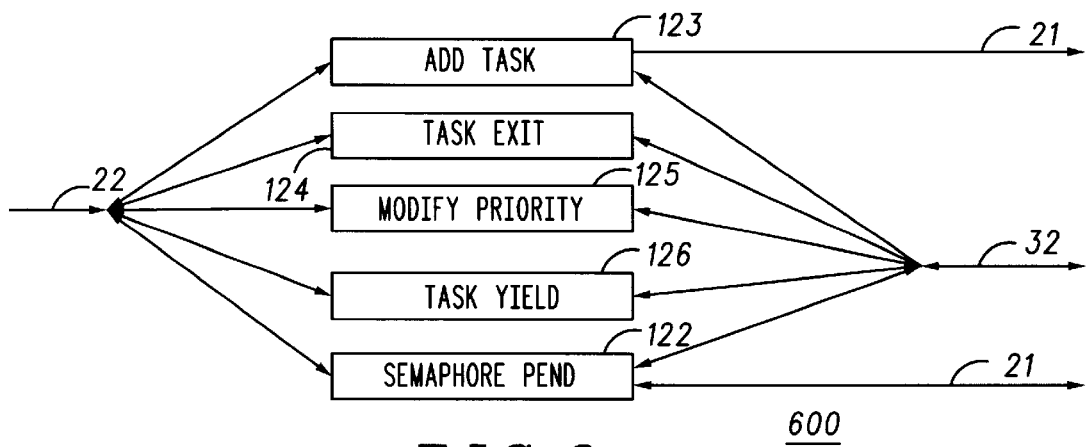
FIG. 6 is a flow chart indicating one embodiment of the functions that tasks and interrupts use to control the task scheduling accelerator in accordance with the present invention.
Figure 7:
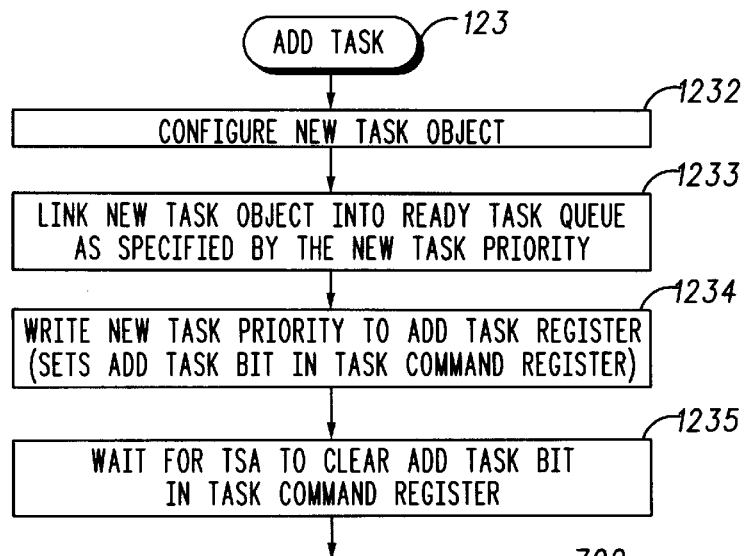
FIG. 7 is a flow chart showing one embodiment of steps for adding a new task to the currently executing task set in the multi-tasking environment in accordance with the present invention.

STCI 46 registers are associated with functions for issuing synchronous task commands as shown in FIG. 6, numeral 600. STCI implements the following functions:

The Add Task function. The Add Task register 462 is used to issue a command to add a new task to the task set. The Add Task function 123 in the Task Scheduling Programming Interface 12 is described in detail in FIG. 7, numeral 700. The Add task function 123 first adds a new task object to the data structures 11 via data path 21 to configure the context of the new task (task object) 1232 and links the new task object into the Ready Task Queue as specified by the new task priority 1233. The Add Task function 123 then writes the priority of the new task to the Add Task register 462 as shown in 1234. The priority of the new task is transferred to the Parameter register 460 and the Add Task bit is set in the Task Command register 465. To ensure the Add Task command has been completed 1235, the add task function 123 waits until the TSA has cleared the Add Task Bit in the Task Command register 465.

Figure 8:
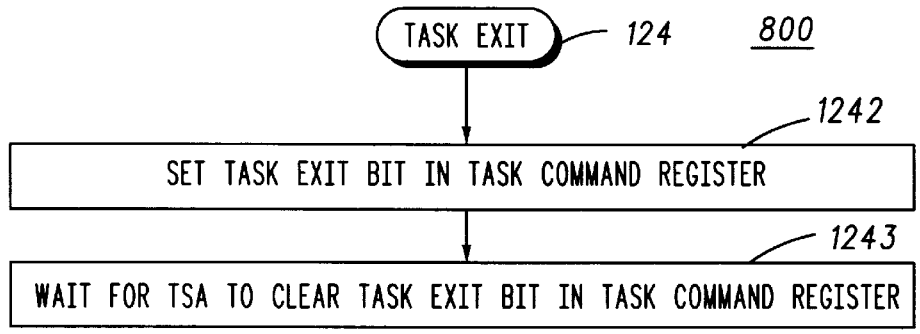
FIG. 8 is a flow chart illustrating one embodiment of steps for how a task exits to remove itself from the currently executing task set in the multi-tasking environment in accordance with the present invention.

The Task Exit function. The task exit function 124 in the Task Scheduling Programming Interface 12 is described in detail in FIG. 8, numeral 800. The task exit function 124 sets a bit in the Task Command register 465 to indicate the current task wishes to exit as shown in 1242. To ensure the task exit command has completed 1243, the task exit function 124 waits until the TSA has cleared the Task Exit Bit in the Task Command register 465. This task command has no apparent next step as indicated by no exit from 1243 because when the task is preempted, it never returns.

Figure 9:
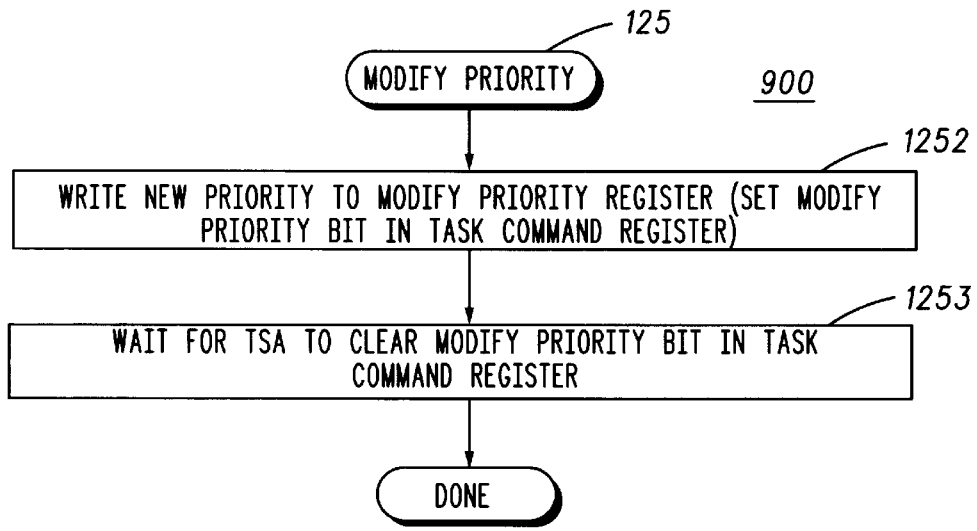
FIG. 9 is a flow chart showing one embodiment of steps for how a task may modify its own priority in accordance with the present invention.

The Modify Priority function. The Modify Priority register 461 is used to issue a command to change the priority of the currently executing task. The Modify Priority function 125 in the Task Scheduling Programming Interface 12 is described in detail in FIG. 9, numeral 900. The Modify Priority function 125 writes a new priority 1252 to the Modify Priority register 461 to issue the command. The new priority is transferred to the Parameter register 460 and the Modify Priority Bit is set in the Task Command register 465. To ensure the modify priority command has completed 1253 the Modify Priority function 125 waits until the TSA has cleared the Modify Priority Bit in the Task Command register 465.

Figure 10:
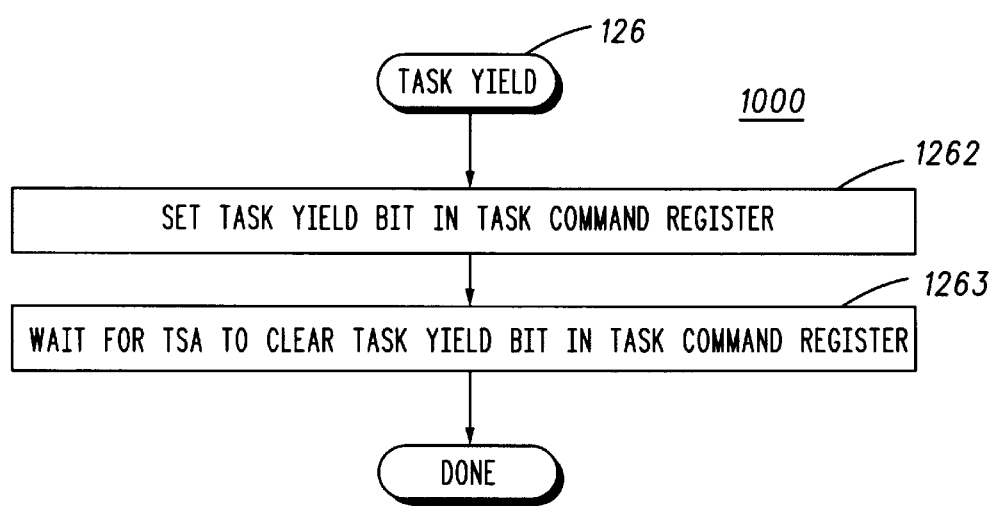
FIG. 10 is a flow chart showing one embodiment of steps for how a task may yield to another task at the same priority level in accordance with the present invention.

The Task Yield function. The Task Yield function 126 in the Task Scheduling Programming Interface 12 is described in detail in FIG. 10, numeral 1000. The task yield function 126 sets a bit in the Task Command register 465 to indicate the currently executing task wishes to yield to another task at the same priority level as shown in 1262. To ensure the Task Yield command has completed 1263 the Task Yield function 126 waits until the TSA has cleared the Task Yield bit in the Task Command register 465.

Figure 11:
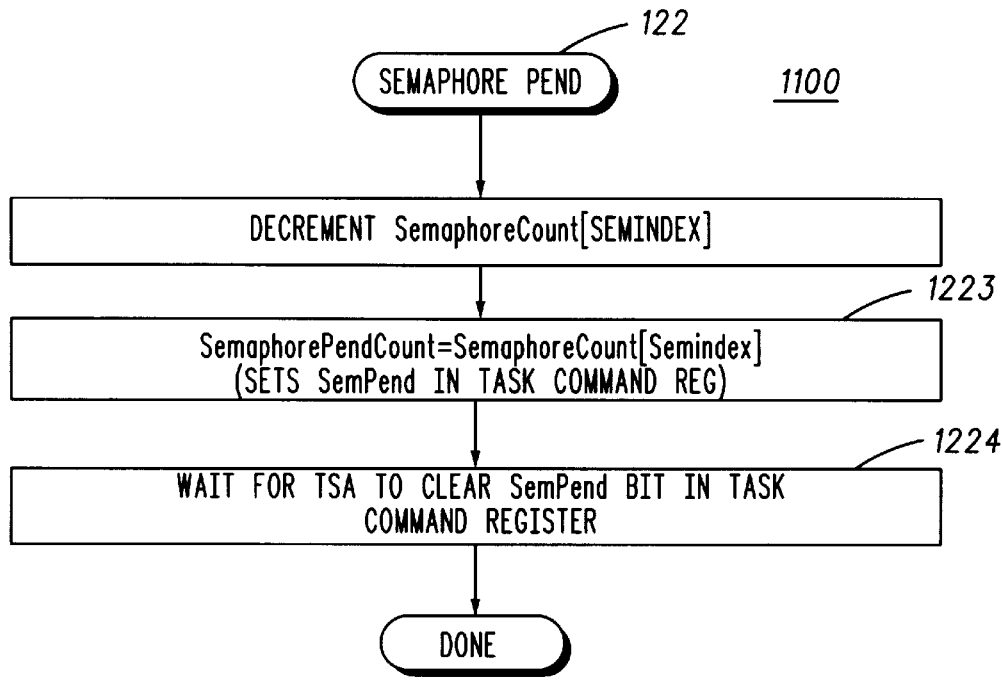
FIG. 11 is a flow chart showing one embodiment of steps for how tasks pend for semaphores on the host processor in accordance with the present invention.

The Semaphore Pend function. The Semaphore Pend Count register 463 and Semaphore Pend Index register 464 are used to pend for a semaphore specified by a semaphore index. The Semaphore Pend function 122 in the Task Scheduling Programming Interface 12 is described in detail in FIG. 11, numeral 1100. The Semaphore Pend function 122 first decrements the semaphore count associated with the semaphore index 1222. The semaphore index is an integer representing a particular semaphore. The Semaphore Pend function 122 then writes the decremented count to the Semaphore Pend Count register 463 as shown in 1223. The semaphore count is transferred to the Parameter register 460. The Semaphore Pend function 122 then writes the index of the semaphore to the Semaphore Pend Index register 464 and sets a flag in the Task Command register 465 as shown in 1223. To ensure the Semaphore Pend command has completed 1224 the semaphore pend function 122 waits until the TSA has cleared the Sem Pend Bit in the Task Command register 465.

The Task Lock mode. The Task Lock is a mode of operation and not a task command. The Task Lock mode indicates to the TSA that the currently executing task should not be preempted even if a higher priority ready task becomes available. This is typically used to protect data structures accessed by multiple tasks. When the task lock mode is set, only semaphore posts are allowed to be generated by tasks or ISRs. If the task lock mode is set and a higher priority ready task becomes available due to semaphore post, the TSA remembers this by setting the Preemption Pending bit in the Status register but does not preempt the current task. If there is a preemption pending when the task lock is turned off, the TSA preempts the currently executing task and selects the higher priority ready task that became available when the task lock was enabled.

An important aspect of the present invention is the implementation of the previously described synchronous task commands. Each command is relatively simple to implement, resulting in small memory usage in the host processor. Additionally, each command simply waits for the associated control bit in the Task Command register 465 to clear to indicate the command is complete. If a task preemption occurs, it is completely transparent to the task at this time. The task does not need to implement any component of the context switch nor does it need to be aware of any other tasks in the system.

Data path 32 indicates the Modify Priority register 461, the Add Task register, 462, the Semaphore Pend Count register 463, the Semaphore Pend Index register 464 and the Task Command register 465 are all accessible to the Task Scheduling Programming Interface 12 and its functions of Semaphore Pend 122, Add Task 123, Task Exit 124, Modify Priority 125 and Task Yield 126. Data path 38 indicates the Parameter register 460, Semaphore Pend Index register 464 and Task Command register 465 are accessible from the Task Scheduling Accelerator Interrupt Service Routine 10 during a task switch. Data path 54 indicates the state machine accesses the Parameter register 460, Semaphore Pend Index register 464 and Task Command register 465 to process scheduling decisions.

Figure 12:
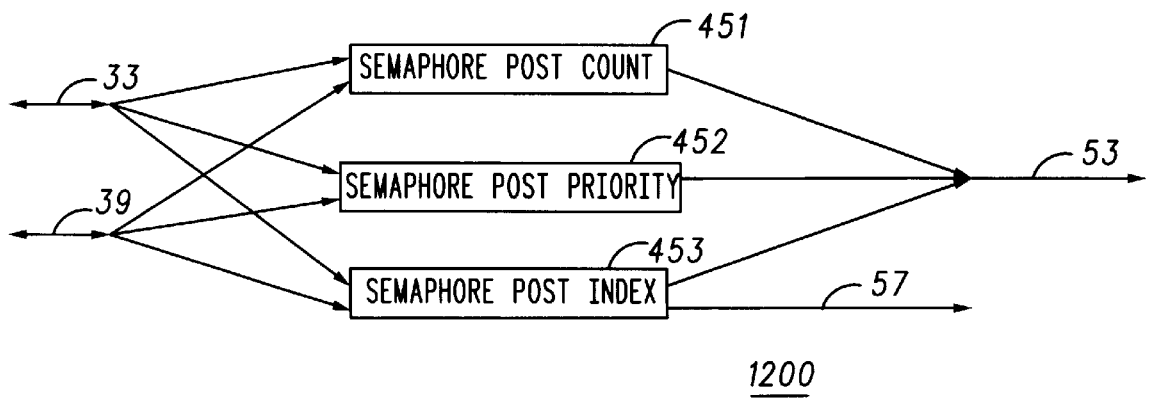
FIG. 12 is a flow chart showing one embodiment of data flows for executing commands that are asynchronous to the task (commands that the task does not need to wait for completion or commands generated by interrupts) in accordance with the present invention.

An asynchronous task command is issued via the Asynchronous Task Command Interface (ATCI) 45. The only task command that is issued asynchronous to tasks by interrupt service routines 14 is the semaphore post. The ATCI may also be used by tasks 13 for posting semaphores although the task does not need to synchronize (i.e., wait for it to complete). The details of the ATCI are shown in FIG. 12, numeral 1200. FIG. 12 shows the ATCI contains 3 registers. The Semaphore Post Count register 451 is used to receive the count value of a semaphore. The Semaphore Post Priority register 452 is used to receive the priority of the first task pending on the semaphore. The Semaphore Post Index register 453 is used to receive the index number of the semaphore. When the Semaphore Post Index register 453 is written, a status flag is set in the status register 42 via path 57. Data path 39 indicates the ATCI registers can be written from the Semaphore Post Interface 55. Data path 33 indicates the ATCI registers can be written from the TSA-ISR 10. Data path 53 indicates the ATCI registers may be accessed from the State Machine 41 for computing scheduling decisions. Thus, semaphore posts may be generated from three sources: Tasks 13 and Device Interrupt Service Routines 14 through the Semaphore Post Interface 55, or, from the TSA-ISR 10.

It is important to understand the TSA-ISR is the lowest priority interrupt serviced by the host processor. Alternatively, the TSA-ISR may be the last interrupt to be serviced when multiple devices share the same interrupt level. The reason is that it is necessary that no interrupt context be on the host processor stack when a task switch is performed. This requires all interrupts to be finished prior to the TSA performing a task switch. Since interrupts at a higher priority may generate semaphore posts, it is possible for more semaphore posts to be generated than can be processed by the TSA. This is resolved using a queuing mechanism.

Figure 13:
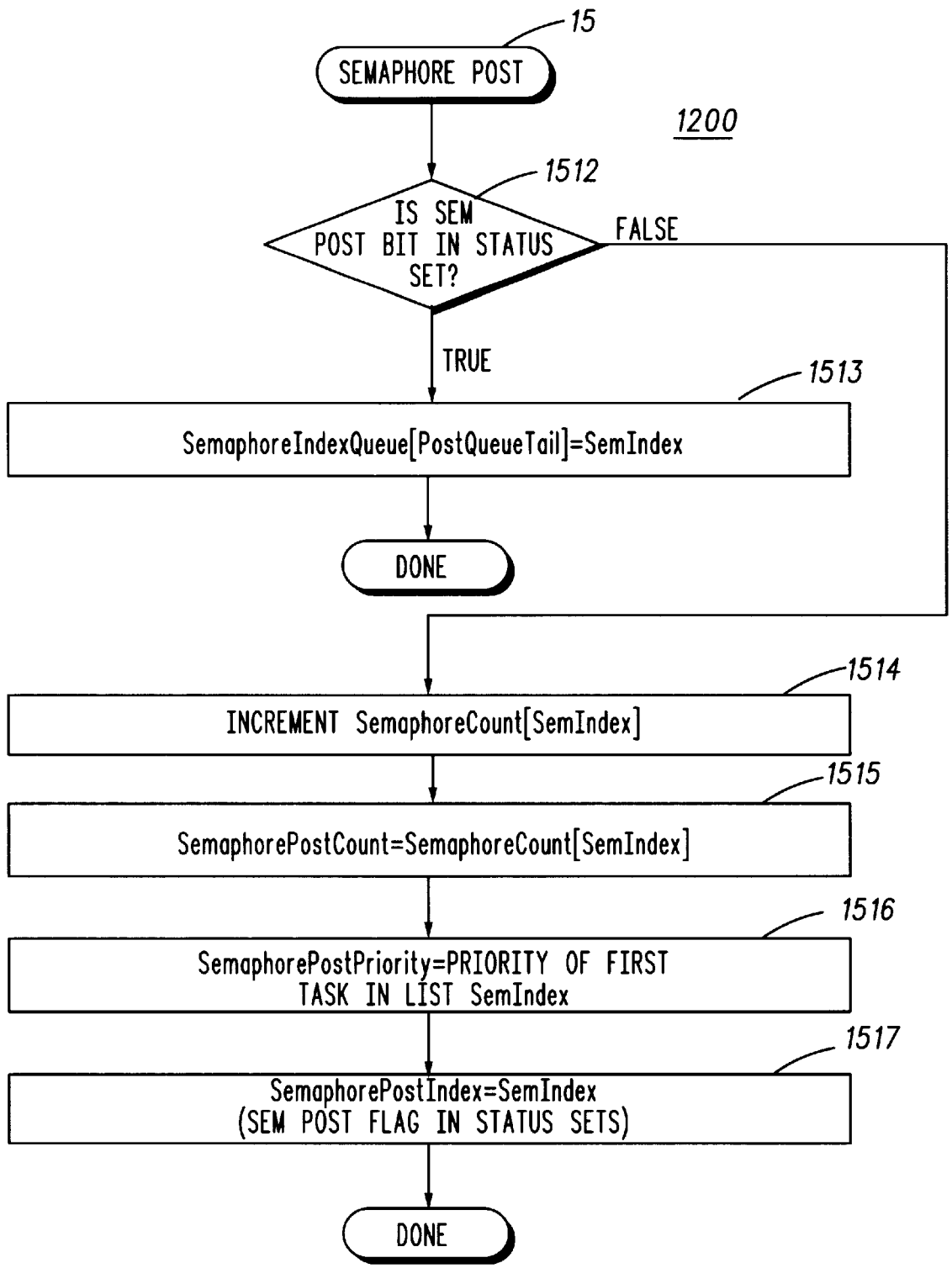
FIG. 13 is a flow chart showing one embodiment of steps for how semaphores are posted by tasks and interrupts on the host processor in accordance with the present invention.

The details to post semaphores from the Semaphore Post Interface 55 are shown in FIG. 13, numeral 1300. The Semaphore Post Interface 55 begins by checking the Semaphore Post bit in Status 42 to determine if the semaphore post registers in the ATCI have been written 1512. If decision 1512 is true, the registers have already been written and the semaphore post request must be queued. This is performed in 1513 by reading the Post Queue Tail register 472 in the Semaphore Post Queue Interface 47, SemaphoreIndexQueue[PostQueue Tail]=SemIndex. This register provides an integer that is used as a queue position to store the index in the Semaphore Index Queue 15.

If the decision 1512 is false, the ATCI can be written. The Semaphore Post Interface 55 increments the semaphore count at the specified index 1514, i.e., SemaphoreCount [SemIndex]. This incremented count is written to the Semaphore Post Count register 451, SemaphorePostCount= SemaphoreCount[SemIndex], as is shown in 1515. The Semaphore Post Interface 55 then obtains the priority of the first task pending on the semaphore 1516 from Data Structures 11. This priority is written to the ATCI Semaphore Post Priority register 452, SemaphorePostPriority priority of first task in list SemIndex, as shown in 1516. The Semaphore Post Interface 55 then writes the index of the semaphore to the Semaphore Post Index register 453, SemaphorePostindex=SemIndex, as shown in 1517. The action of writing the Semaphore Post Index register 453 causes the ATCI set the Semaphore Post bit in Status register 42.

A unique aspect of the present invention is the method for managing the Semaphore Index Queue 15. As has been indicated, semaphore indices are placed in the Semaphore Index Queue 15 if the ATCI registers are currently full. The details of the interface in the TSA for managing the queue pointers are shown in FIG. 14, numeral 1400. When the Semaphore Post Interface 55 reads the Post Queue Tail register 472, the Post Queue Tail register 472 auto-increments to then next queue position. A Comparator 474 compares the Post Queue Tail register 472 to a maximum value stored in the Post Queue Max register 470. If the Comparator 474 indicates the maximum value has been reached, the Post Queue Tail register 472 is reset. A similar operation occurs for the Post Queue Head register 471 except the Post Queue Head register 471 is read by the Task Scheduling Accelerator Interrupt Service Routine 10. When the Post Queue Head register 471 is read, it auto-increments to the next queue position. A Comparator 475 compares the Post Queue Head register 471 to a maximum value stored in the Post Queue Max register 470. If the Comparator 475 indicates the maximum value has been reached, the Post Queue Head register 471 is reset. Thus, efficient software queuing is possible by not requiring the software to increment and wrap the queue pointers. The Post Queue Head register 471 and Post Queue Tail register 472 are compared using Comparator 478 to determine if the two registers are equal. If they are equal, signal 51 indicates the Semaphore Index Queue 15 is empty. If the registers are unequal, signal 51 indicates the Semaphore Index Queue 15 is not empty. When signal 51 indicates the Semaphore Index Queue 15 is non-empty and Status 42 indicates the Semaphore Post bit is clear, then the State Machine 41 determines at decision 4170 to execute the Process Move Post 4172 function, as shown in FIG. 15, numeral 1500. The Process Move Post 4172 first sets the CTX bit 41721 in the Status register 42 to indicate that when the host processor services the interrupt (CTX=1 in this implementation), the registers in the STCI are context (i.e., should be preserved). The State Machine 41 then indicates to the Interrupt Service Routine Interface 40 that the ATCI can be written with a value from the Semaphore Index Queue 15 by setting the Move Post bit in Interrupt Control register (ICR) 403 as shown in 41722. The Process Move Post 4172 then waits for the Task Scheduling Accelerator Interrupt Service Routine 10 to process the interrupt 41723. The Process Move Post function 4172 knows the host processor has serviced the Move Post request when the Task Scheduling Accelerator Interrupt Service Routine 10 clears the Move Post bit in the Interrupt Control register 403.

Figure 16:
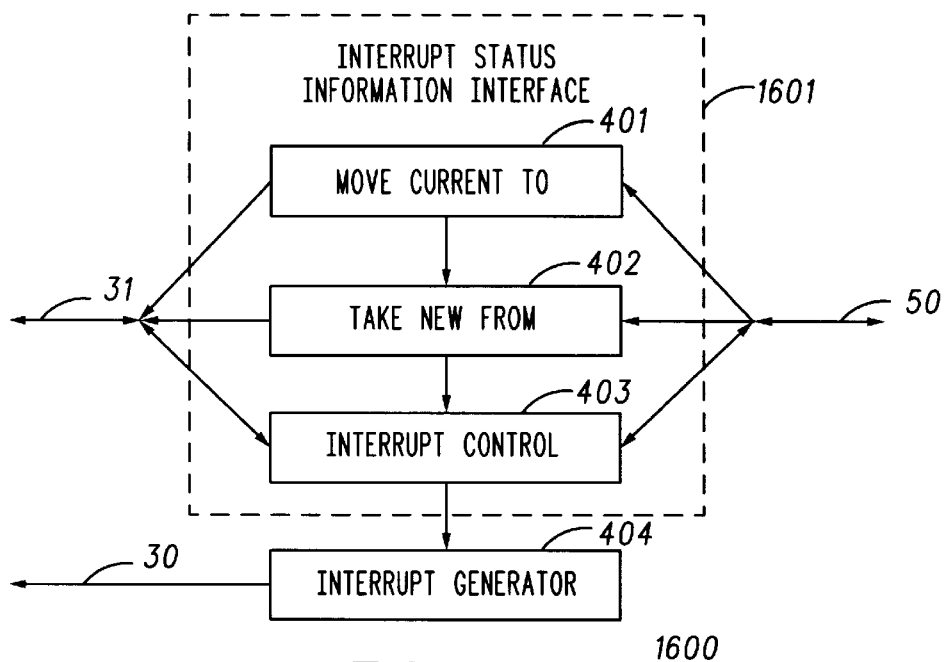
FIG. 16 is a schematic representation of the data flows and information for the accelerator to signal the host processor and communicate changes in the task execution in accordance with the present invention.
Figure 17:
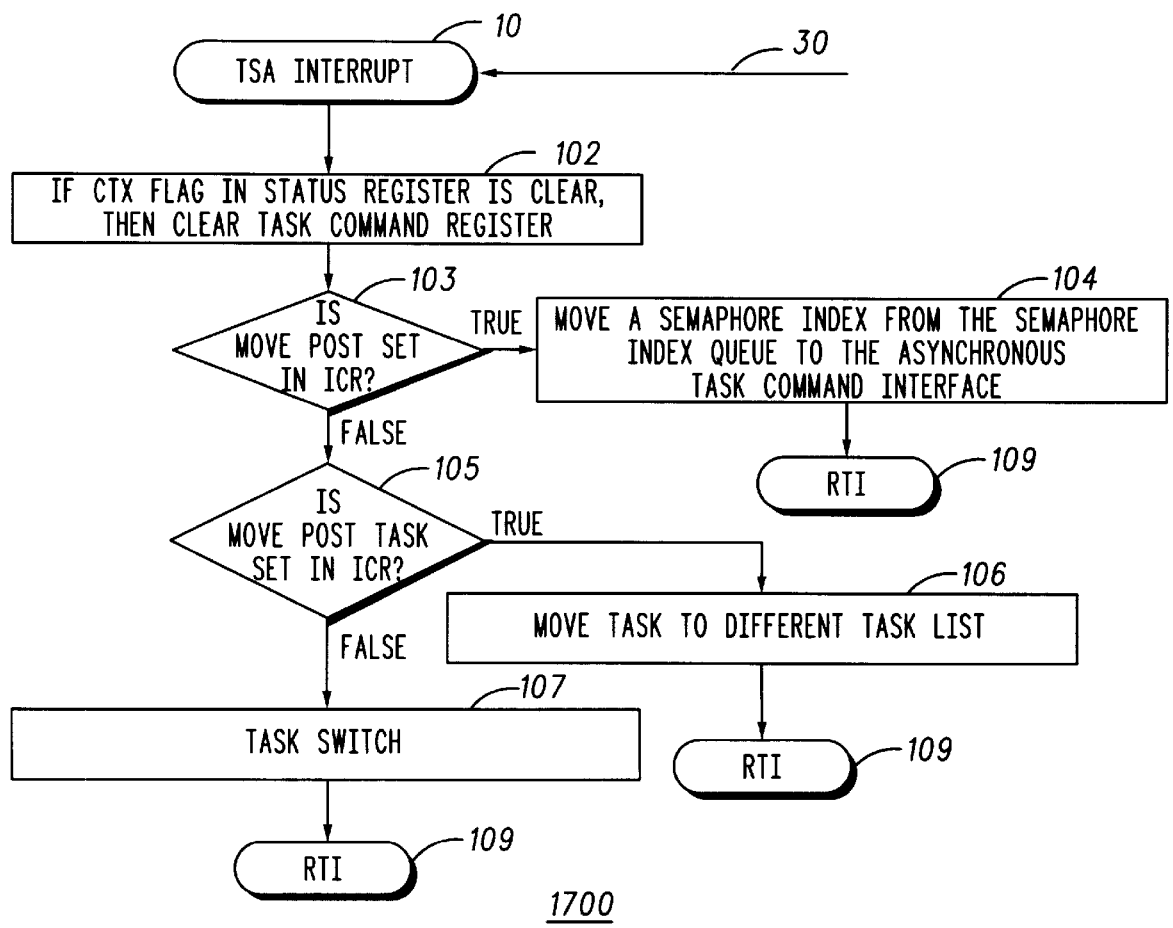
FIG. 17 is a flow chart showing one embodiment of steps for the functions executed by the interrupt service routine on the host processor in accordance with the present invention.

As shown in FIG. 16, numeral 16, the Interrupt Status Information Interface 1601 typically includes a Move Current To register 401, a Take New From register 402 and an Interrupt Control Register 403 that is coupled to an Interrupt Generator 404. The Interrupt Generator 404 determines if any bits are set in the Interrupt Control register 403 and asserts the interrupt 30. If all bits in the Interrupt Control Register 403 are clear, the Interrupt Generator 404 negates the interrupt 30. The host processor responds to the interrupt assertion 30 by activating the TSA-ISR 10 (TSA Interrupt 10) as shown in FIG. 17, numeral 1700. The TSA-ISR 10 first determines the state of the CTX flag 102. Since it is known for a Move Post function that this bit is set, the Task Control register is not cleared. The details of this clearing action are explained in greater detail later. The Interrupt Control register 403 in the ISR Interface 40 is read to determine if the Move Post bit is set 103. In this scenario, this bit has been set and the TSA-ISR 10 executes the function to move a semaphore post from the Semaphore Index Queue 15 to the ATCI as shown in 104.

Figure 18:
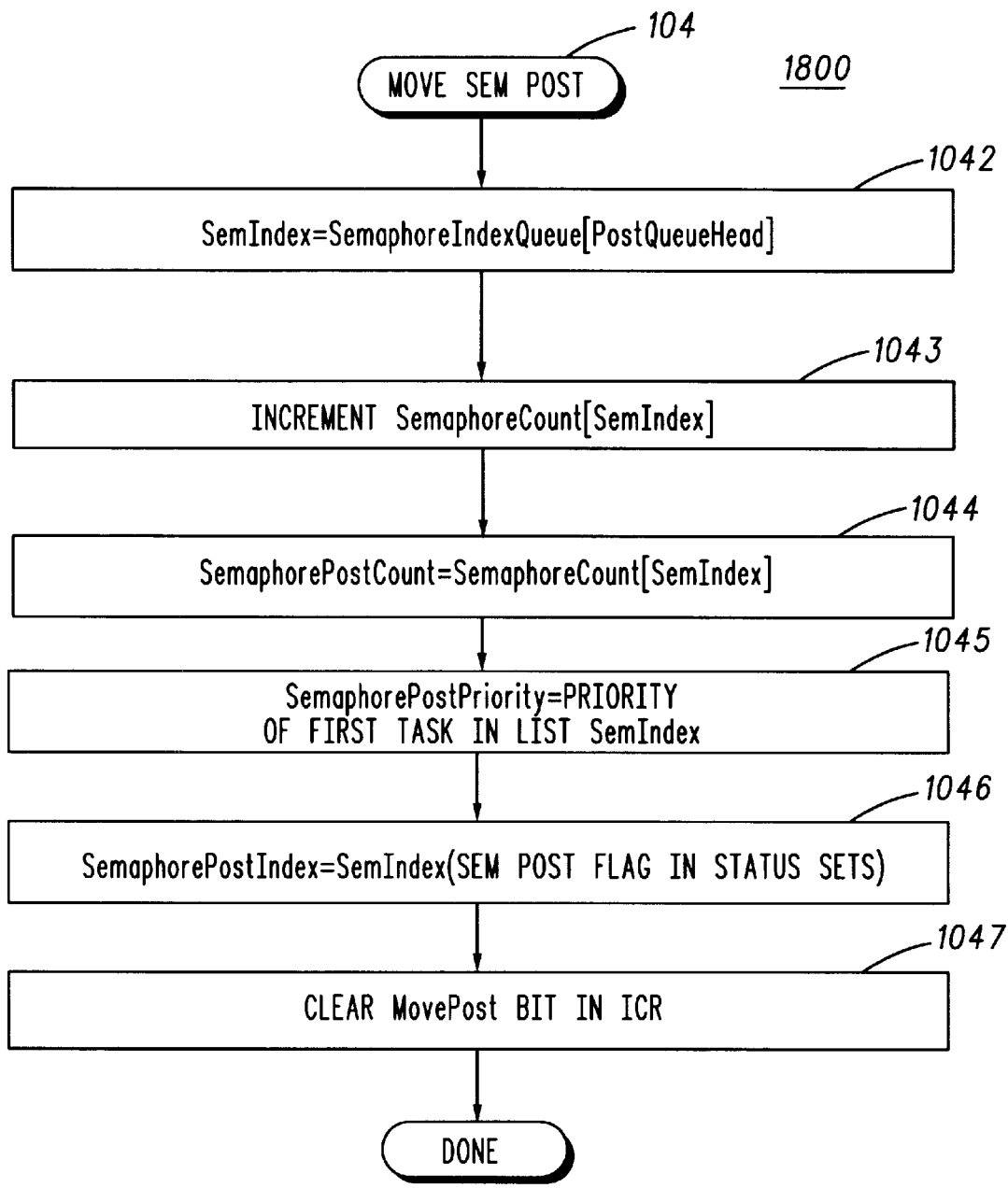
FIG. 18 is a flow chart showing one embodiment of steps for how the interrupt service routine moves a queued semaphore post to the accelerator in accordance with the present invention.

The details of the Move Semaphore Post 104 function are shown in FIG. 18, numeral 1800. The pointer to the semaphore queue is obtained by reading the Post Queue Head register 471 in the Semaphore Post Queue Interface 47. This pointer is used to read the head of the Semaphore Index Queue 15, SemIndex=SemaphoreIndexQueue [PostQueueHead], as shown in 1042. The Semaphore Count associated with the semaphore index is incremented, SemaphoreCount=[SemIndex], as shown in 1043.

The incremented count is written to the ATCI Semaphore Post Count 451 register, SemaphorePostCount= SemaphoreCount[SemIndex], as shown in 1044. The Move Semaphore Post 104 function then obtains the priority of the first task pending (in list SemIndex) on the semaphore from Data Structures 11. This priority is written to the ATCI Semaphore Post Priority register 452 as shown in 1045. The Move Semaphore Post 104 function then writes the index of the semaphore to the ATCI 45 Semaphore Post Index register 453, SemaphorePostindex=SemIndex, as shown in 1046. The action of writing the Semaphore Post Index register 453 causes the ATCI to set the Semaphore Post bit in Status 42. The TSA-ISR then indicates the Move Semaphore Post 104 function has been completed by clearing the Move Post bit in the Interrupt Control register 403 as shown in 1047. The ability of the TSA to request information from the semaphore post index queue by asserting its interrupt relieves the host processor from having to poll the TSA to determine when it is ready.

When a task command has been issued via the STCI 46 or the ATCI 42, the State Machine 41 recognizes a command pending by examining the Task Command register 465 or the Status register 42. The state machine makes scheduling decisions to determine if the currently executing task is allowed to continue execution or if the currently executing task must be preempted. The State Machine 41 may also request from the Host Processor 1 to move a semaphore index from the Semaphore Index Queue 15 or to make a modification to the task list. The last two functions do not change the execution of the currently executing task.

When the State Machine 41 processes commands, there are typically two different actions that result: (1) there is no change in the execution of the current task and the State Machine 41 simply clears the status bit indicating the command has completed, or, (2) the currently executing task is preempted.

Figure 19:
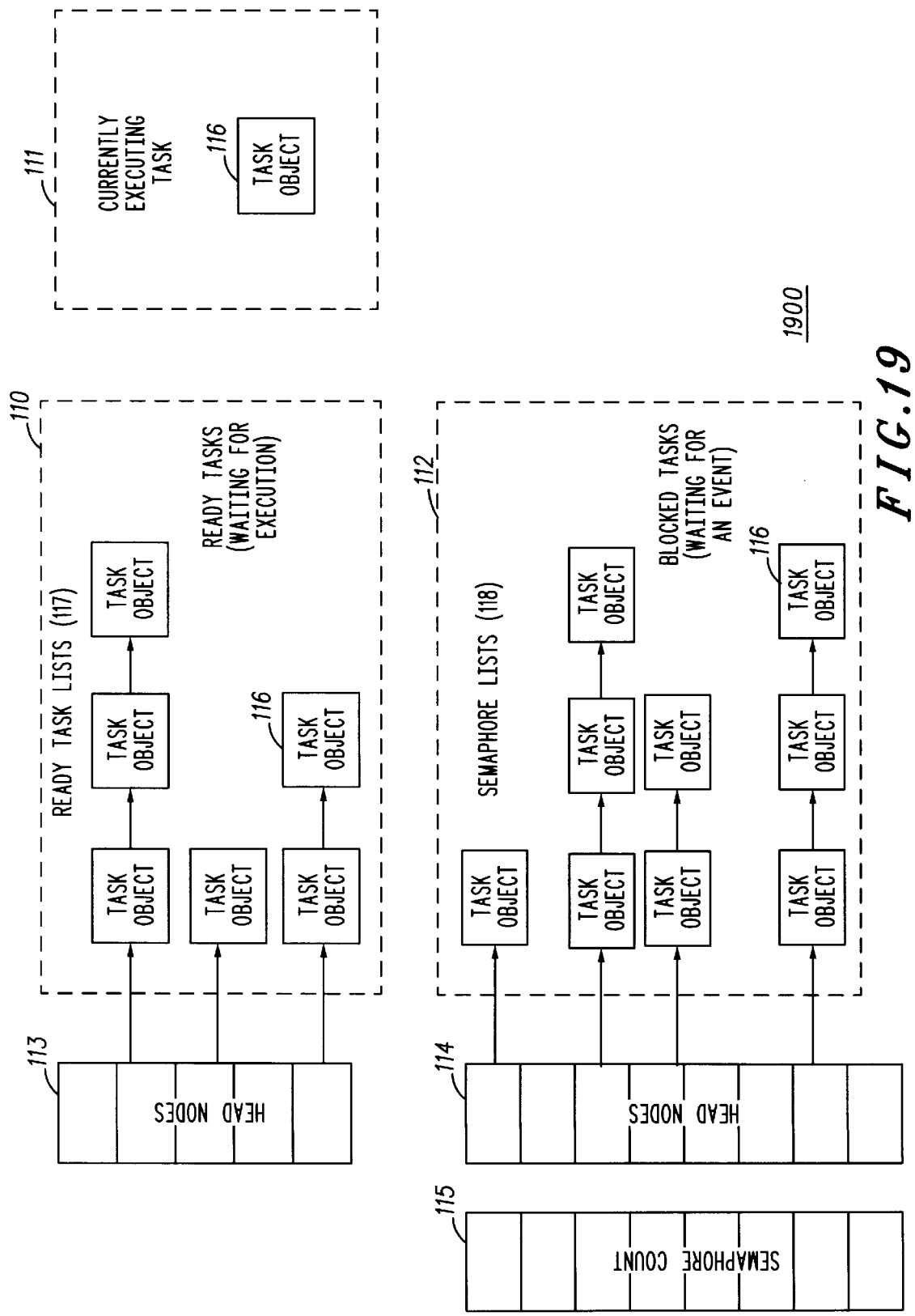
FIG. 19 is a schematic representation of data structures stored on the host processor used to describe the current state of task execution in accordance with the present invention.

A unique aspect of the present invention is how the State Machine 41 efficiently communicates the task switch to the host processor by using the Interrupt Service Routine Interface 40. Data Structures 11 represent the current state of the task set on the host processor as shown in FIG. 19, numeral 1900. A "task object" 116 is the information representing the current state of a single task. The simplest information the task object stores is the task priority and the context of the task. When a task object is the currently executing task 111, the task object 116 is not linked into any list. When the task object is ready for execution 110 but not currently executing, the task object 116 is linked into a Ready Task List 117 according to the task priority. A task of priority zero is linked into the list at the top of the head nodes and tasks of lower priority are linked into lists further from the top of the head nodes. When the task is pending for a semaphore 112, the task object 116 is linked into a list according to the semaphore it is waiting for. Counting semaphores allow a plurality of tasks to be waiting for a single semaphore. Associated with each head node in the Semaphore Queues 112 is a Semaphore Count 115. The Semaphore Count 115 represents the number of events that have been generated or requested for each semaphore. In the situation where the semaphore is zero or positive, there are no blocked tasks on the associated Semaphore List 118. In the situation where a Semaphore Count 115 is negative, the negative value indicates how many tasks are waiting for the semaphore and equivalently, how many tasks are linked into the Semaphore Lists 112. The Head Nodes 113 and 114 are stored contiguously in memory such that a single integer can reference either list. If the integer is zero, it references the highest priority ready task queue 113. If the integer is less than the number of priorities, the integer references a lower priority list 113. If the integer is the same or greater than the number of priority levels, it references head nodes for the semaphore lists 114. As an example, assume there are 64 priority levels and 100 semaphores. Head nodes 113 contains 64 head nodes and head nodes 114 contains 100 head nodes. An index of 0 would reference the highest priority ready task list in 110, an index of 63 would reference the lowest priority ready task list in 110 and an index of 100 would reference the 36th semaphore in head nodes 114. Thus, a single integer can reference tasks that are ready for execution at each priority level or tasks that are waiting for any semaphore.

Figure 20:
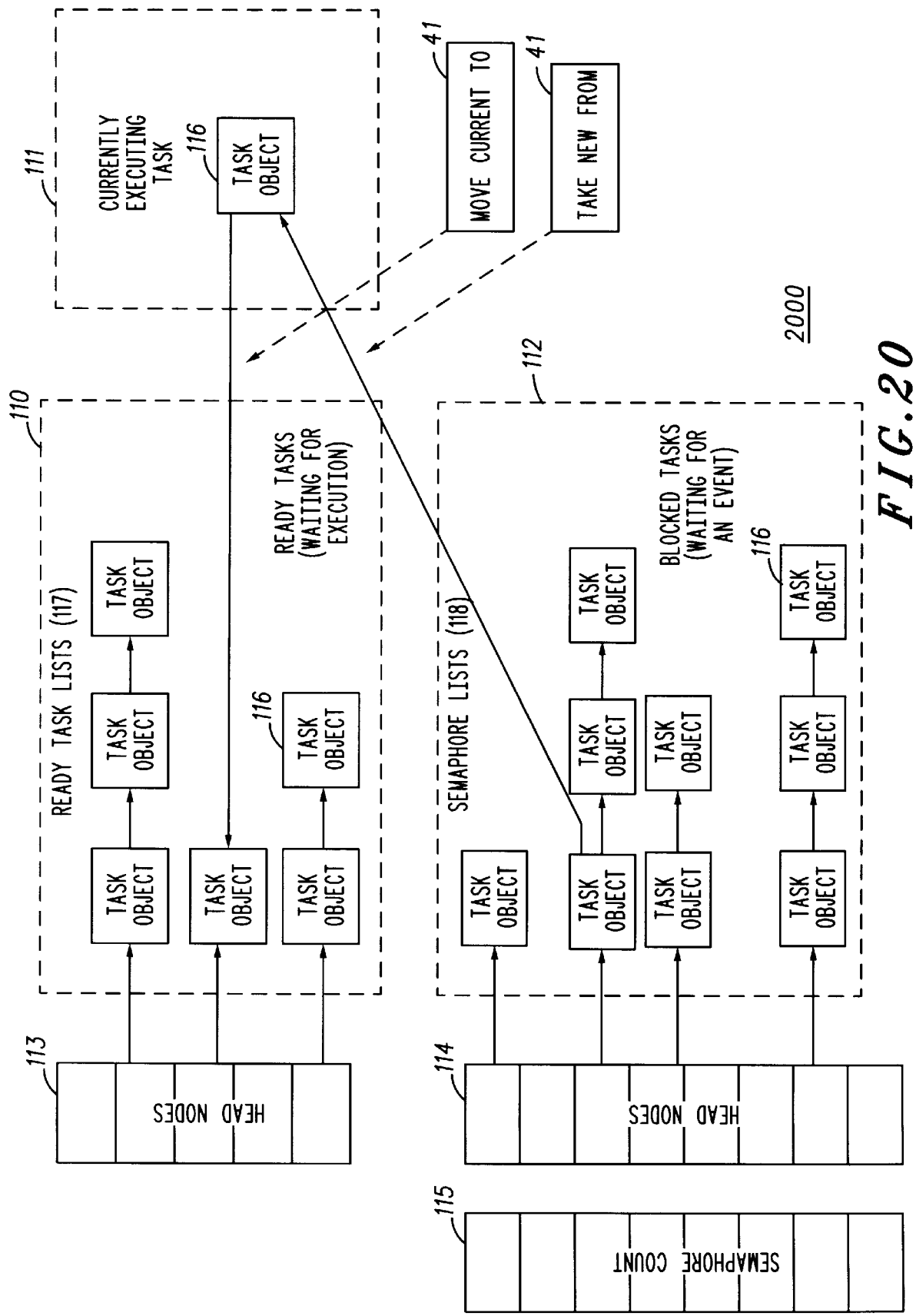
FIG. 20 is a schematic representation of how the interrupt interface communicates information that determines how the interrupt service routine switches tasks in accordance with the present invention.

Using a single integer to reference both lists provides an efficient mechanism for specifying a task switch as shown in FIG. 20, numeral 2000. The Interrupt Service Routine Interface 40 implements two registers containing integers for referencing lists. The Move Current To register 401 specifies an integer indicating a list to move the Currently Executing Task 111 to. The Take New From register 402 indicates a list to take the new task object for execution to replace the Currently Executing Task 111. Thus, the Host Processor 1 does not perform any computations or decisions in determining the task switch—it simply responds to the decisions made by the TSA 2 and adjusts the task lists accordingly. To further qualify the task switch, the Interrupt Control register 403 contains three bits called Save Context, Load Context and Idle. When the Save Context bit is set, it indicates the Move Current To register 401 contains a valid integer and the Currently Executing Task 111 should be saved. As an example, in situations where the currently executing task exits, this bit is zero indicating the Currently Executing Task is no longer needed and it should not be linked into any list. When the Load Context bit is set, it indicates the Take New From register 402 contains a valid integer and the Currently Executing Task 111 should be replaced by the first task on the list specified by the Take New From register 402. As an example, in situations where the task set becomes idle, this bit is clear indicating there is no new task to execute. The Idle bit is set when there is no new task to execute and the task set is idle. This functionality is similar to the Load Context bit; however, if a task exits and there is no new task to execute, both the Save Context and Load Context bits are clear. In order to indicate the idle condition, the Idle bit is set to allow the Interrupt Generator 404 to assert the interrupt 30.

A unique aspect of the present system is the method used to control context of the TSA. It is required for the TSA to clear command bits in the Task Command register 465 (set by synchronous commands) after the command has been processed. This is trivial when there is no change in the executing task—the TSA clears the bit and the task continues. However, when a preemptive task switch occurs, it is necessary to clear the command bit such that the task switch is transparent and when the preempted task is restarted it sees the command has been completed. This is not trivial because preemptive task switches are "transparent" to tasks—a task is never aware a preemption has taken place. Although the TSA asserts the interrupt to preempt the current task, a realistic processor may execute several instructions after the interrupt is asserted because the host processor hardware typically requires time to synchronize and dispatch the interrupt. Thus, the command bit is not allowed to be cleared until after the host processor has begun the actual TSA-ISR. If the TSA clears the command bit prior to this time, the task may erroneously execute additional instructions because it has seen the command bit clear. Another potential solution would be to clear the command bit when the task context is reloaded. However, this does not work because if the task switch was caused by an asynchronous task command (i.e. a semaphore post from an interrupt), the bit would be cleared when in reality it may be valid. This indicates the command bits from synchronous commands can not be cleared when restoring the context of the task. Another issue is that if the TSA-ISR saves the TSA registers as context and then restores them, the TSA is again instructed to execute the same command that just caused the task switch. This indicates the command bits must be cleared prior to saving the task context. The solution to satisfy all these requirements is to clear the command bits in the Task Command register 465 for synchronous task commands after it is assured the host processor has started its interrupt procedure, but before the context for the task has been saved (note the task context includes the host processor registers and the TSA Parameter 460, Semaphore Pend Count 463 and Task Command 465 registers). However, the host processor does not know if the task switch that is occurring is due to a synchronous task command (command bits should be cleared) or an asynchronous task command (command bits should be preserved)—only the TSA knows this information. This is resolved by having the TSA provide a bit called CTX for indicating if the Task Command register 465 represents context (and it should be preserved) or if it is not context because the task switch is due to a synchronous task command (and it should be cleared). This indication is made to the TSA-ISR as shown in FIG. 17 where the Task Control register 465 is cleared if the CTX bit is clear 102. Note that this operation 102 is performed at the start of the interrupt service when it can be guaranteed that the currently executing task has been preempted but before the context for the currently executing task is saved. After the Task Command register 465 has been appropriately adjusted 102, the Task Switch 107 can save the TSA registers and restore them. Although 102 is shown as being implemented as a step in the TSA-ISR, a software implementation of this function would be slow because it would require inquiring the CTX bit in the TSA and conditional execution. The present invention provides a unique solution to this efficiently by implementing function 102 directly in hardware of the TSA. This is implemented by realizing the Interrupt Control register 403 is accessed only by the TSA-ISR. In other words, if the Interrupt Control register 403 is read or written, the TSA can be assured the current task has been preempted. Thus, the function 102 may be implemented directly in hardware by having the TSA clear the Task Command register 465 if the CTX bit is clear and the Interrupt Control register 403 is read. Since this solution does not require software, the TSA-ISR 10 is extremely fast.

The TSA-ISR 10 performs four major functions as shown in FIG. 17. The TSA-ISR 10 first adjusts the context of the Task Command register 465 if necessary as shown in 102. The second major function the TSA-ISR 10 performs is to move semaphore post indexes from the Semaphore Index Queue 15 as shown in 104 if the Move Post bit is set in the Interrupt Control register 403 according to decision 103. The third major function the TSA-ISR 10 performs is to adjust the task lists if the Move Task bit is set in the Interrupt Control register 403 if decision 105 is true. This function moves a task from one list to another as shown in 106. This operation does not disturb the currently executing task but simply modifies links in Data Structures 11. If TSA-ISR function is neither the Move Task nor Move Post function, then the Interrupt Control register 403 performs its fourth major function, a task switch 107.

Figure 21:
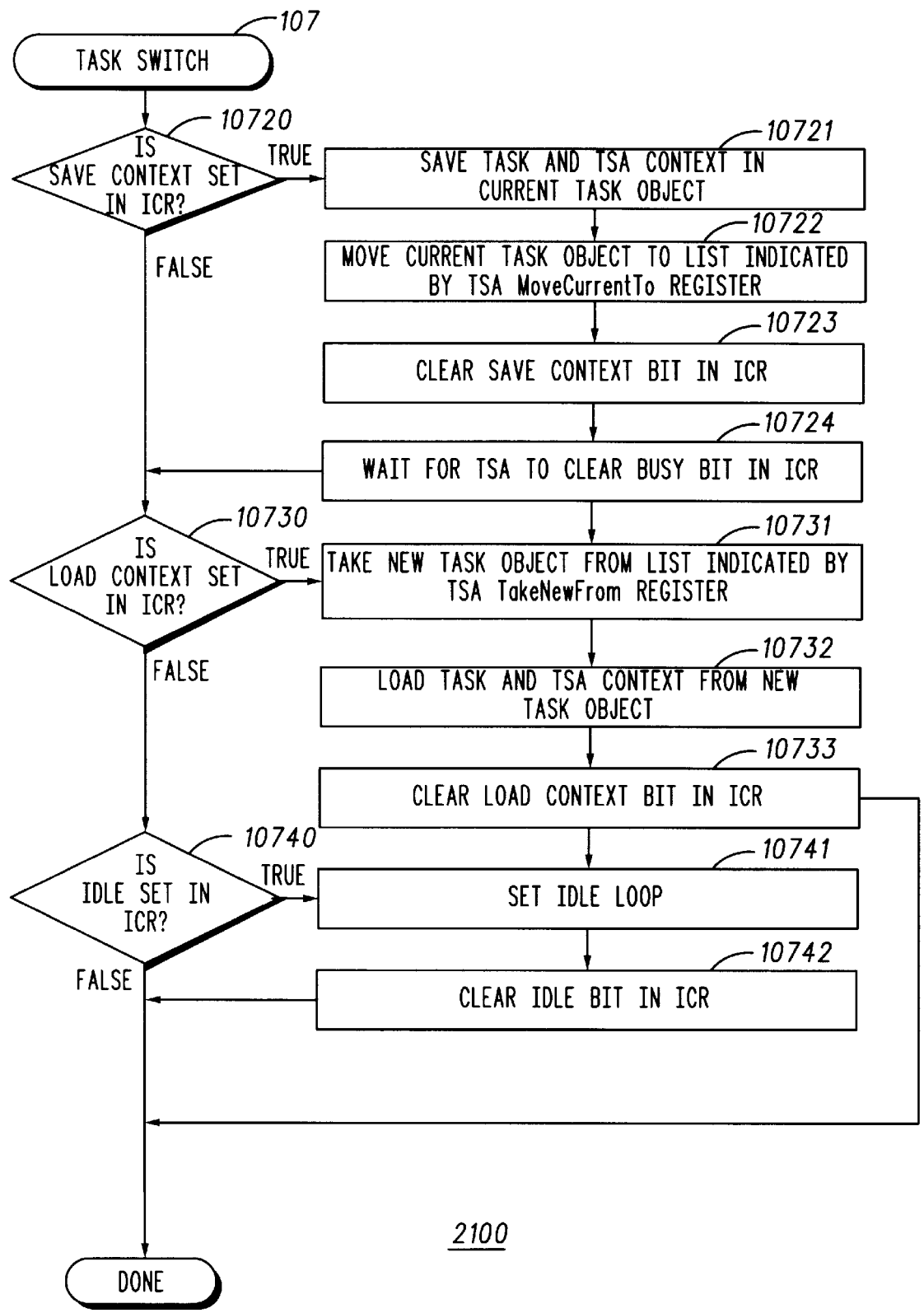
FIG. 21 is a flow chart showing one embodiment of steps for how the interrupt service routine switches tasks in accordance with the present invention.

The task switch function is shown in detail in FIG. FIG. 21, numeral 2100. The task switch procedure between the host processor and the TSA is designed for maximal overlap to minimize (and generally eliminate) the overhead of the TSA scheduling decisions. The Task Switch 107 first determines if the context of the currently executing task needs to be saved 10720. If the Save Context bit is set in the Interrupt Control register 403, then the processor registers and the TSA registers (Parameter 460, Semaphore Pend Count 463 and Task Command 465 registers) are saved as context in the currently executing task object 111 as shown in 10721. The currently executing task object 111 is then moved to a list as indicated by the integer in the Move Current To register 401 as shown in 10722. The Task Switch 107 then clears the Save Context bit in the Interrupt Control register 403 as shown in 10723. Clearing this bit implicitly handshakes with the TSA that the context has been saved. At this point, the Task Switch 107 waits for the TSA to determine the next ready task. It should be noted that as the Task Switch 107 was saving the processor context and linking the currently executing task into the Move Current To task list, the TSA was busy looking for the next task to execute. This provides a maximal processing overlap to effectively hide the time it takes to determine a next ready task. To ensure the TSA has completed looking for a next ready task, the TSA-ISR waits at 10724 for the TSA to clear the Busy bit in the Interrupt Control register 403. When this bit is clear, it indicates the TSA has finished searching the task list and the decision to load context 10730 may now be checked. Although the TSA has searched the task list, it is possible that no ready task was found and the processor is now idle. The decision 10730 determines if the TSA has located another ready task by determining if the Load Context bit in the Interrupt Control register 403 has been set. If the Load Context bit is set, this indicates a new task has been found and should be loaded for execution to become the new Currently Executing Task 111. The new task is taken from the list indicated by the Take New From register 402 as shown in 10731. The host processor then loads the context from the task object 10732. Loading the context involves loading the host processor registers and restoring the TSA registers (Parameter 460, Semaphore Pend Count 463 and Task Command 465 registers). After the context has been restored, the Load Context bit in the Interrupt Control register 403 is cleared 10733 to indicate to the TSA that the task context has been reloaded. If there is no context to be loaded (10730 is false), then the processor is idle and decision 10740 is true. When the task set is idle, the host processor sets up an idle loop 10741 and clears the Idle bit in the Interrupt Command register 43 as shown in 10742. Clearing the Idle bit handshakes with the TSA to let it know that the host processor is entering an idle mode. After the task switch procedure, the TSA-ISR returns. This either switches to a new task if a new task context was loaded, or, idles the processor if no task was loaded.

Figure 22:
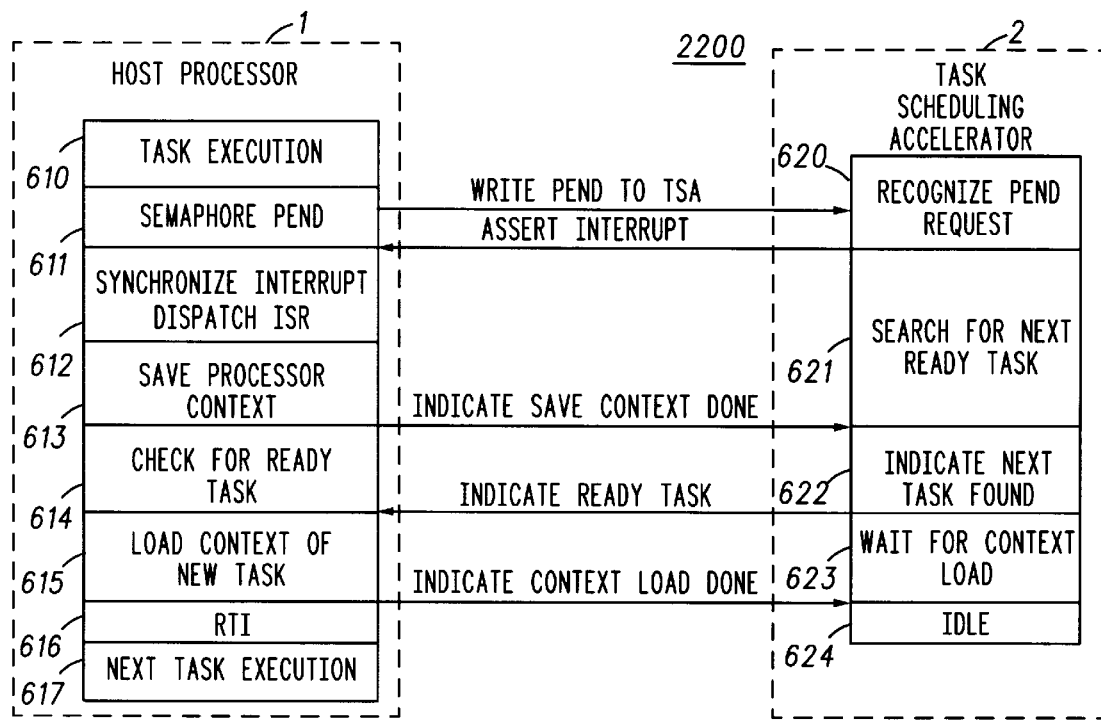
FIG. 22 is a schematic representation of how processing on the host processor and task scheduling accelerator overlap to provide efficient task switching in accordance with the present invention.

The details of the sequence of events for minimizing TSA scheduling decisions are shown in FIG. 22, numeral 2200. The worst case scheduling decision is when the currently executing task blocks because the semaphore count is zero or negative. In this situation, the TSA examines each priority level for a nonzero Ready Task Counter 43. A unique operation of the present invention effectively hides this worst case to virtually zero time. Assume the Host Processor 1 is currently executing a task 610 and the task pends for a semaphore 611. Let us also assume that this semaphore is zero or negative. This causes the currently executing task to block. The task writes the pend request to the TSA 2 and the TSA 2 recognizes the request 620 and starts the State Machine 41. The State Machine 41 immediately determines the current task must be preempted. The TSA 2 immediately asserts its interrupt. Note that at the time the interrupt is asserted, the State Machine 41 has not yet started looking for the next ready task. When the interrupt is asserted, the Host Processor 1 requires some time to synchronize and dispatch the interrupt 612. Additionally, the Host Processor 1 requires time to save the context of the current task and move the task to the list specified by the Move Current To register 401 as shown in 613. While the processor is saving the task context and adjusting the list, the TSA 2 is searching for the next ready task 621. At this point, the TSA 2 and the host processor must synchronize their activities 614. The Host Processor 2 first clears the Save Context bit in the Interrupt Control register 403 to indicate it has completed saving the context and adjusting the lists. If the Host Processor 1 finishes first, the host processor TSA-ISR waits until the TSA 2 clears the Busy bit in the Interrupt Control register 403. Since the TSA 2 is micro-coded hardware, it generally finishes well before the Host Processor 1. If the TSA 2 finishes first, the Busy bit is already cleared when the host processor reads it.

As shown in FIG. 22, numeral 2200, the TSA 2 is assumed to have found a ready task after searching the list. The Host Processor 1 checks the TSA 2 to ensure it is ready 614 and the TSA 2 indicates it is ready after searching the task list 622. The Host Processor 1 then loads the context of the new task 615 and the TSA 2 waits for acknowledgement of the load 623 by waiting for the Load Context bit in the Interrupt Control 403 to clear. The Host Processor begins execution of the new task 616 by performing a "return from interrupt" (RTI). This exits the TSA-ISR and begins execution of the new task 617. After the TSA 2 has determined the new task context has been loaded, it idles waiting for more commands to process 624. Thus, the most time consuming part of task scheduling computation performed by the TSA 2 is overlapped with the operations on the Host Processor 1 to effectively hide the scheduling computation. This is not possible in a software scheduler because no matter how efficiently the software scheduler is, the process of determining the next ready task must be performed serially with the task saving and loading. Additional efficiency of using the TSA 2 is that the method of searching for the next ready task is linear in the number of priorities and is independent of the number of tasks. Adding additional tasks to the task set does not change the amount of time required to search for a ready task. The ready task search time is only dependent on the number of priority levels.

Figure 23:
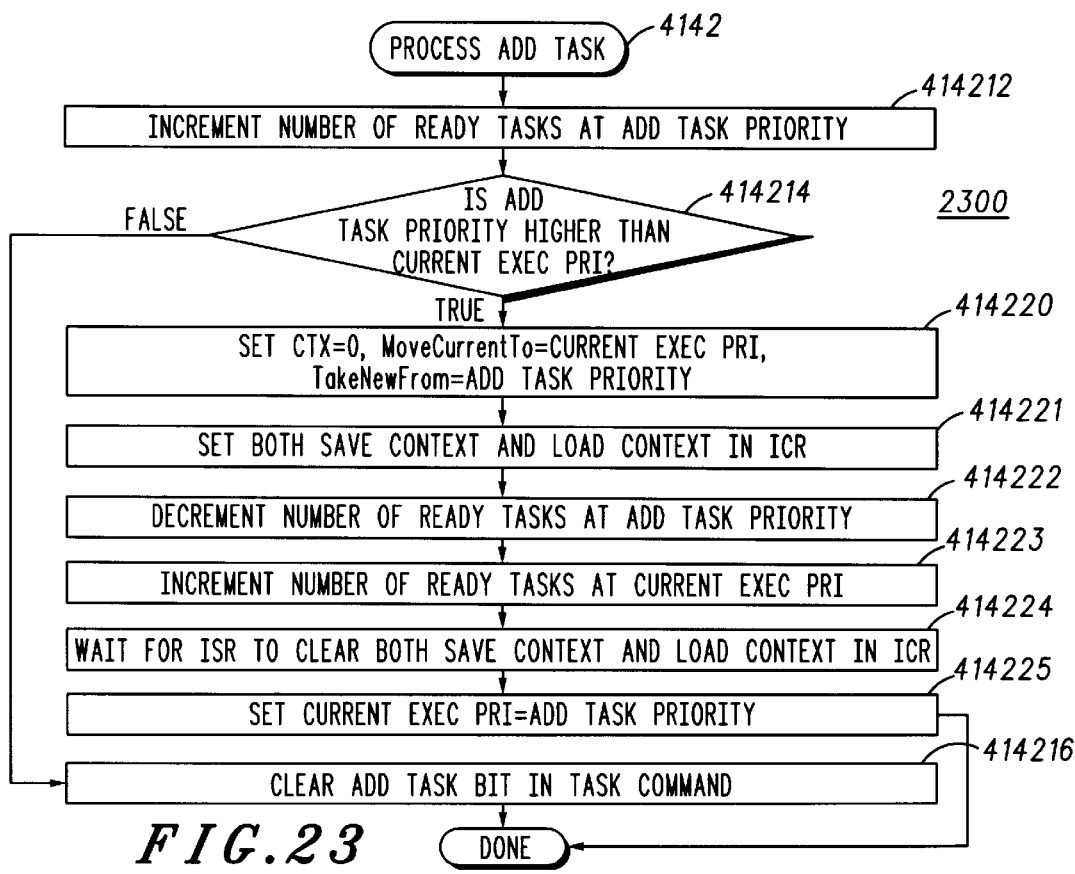
FIG. 23 is a flow chart showing one embodiment of steps for how the state machine processes adding task requests from the host processor in accordance with the present invention.

If an add task function is requested by the Host Processor 1, the State Machine 41 recognizes the Add Task bit in the Task Command register 465 is set as shown in 4140. The State Machine 41 begins a sequence of instructions to process the newly added task (Process Add Task 4142) and is shown in detail in FIG. 23, numeral 2300. The addition of the new task is recorded by incrementing a counter representing the number of ready tasks at the priority level where the new task was added 414212. The State Machine 41 determines the priority level were the new task was added. This is obtained from the Parameter register 460 because the Add Task command 123 wrote the priority to the Add Task register 462. This value was transferred to the Parameter register 460. The state machine next determines if the newly added task is at a higher priority than the currently executing task 414214. If this is false, then there is no change in the current execution and the State Machine 41 clears the Add Task bit in the Task Command register 465 as shown in 414216. The Add Task function 123 then continues executing after verifying the Add Task bit is clear 1235. If the decision 414214 is true, the newly added task is a higher priority than the currently executing task and the newly added task preempts the current task. The State Machine 41 sets up the task switch in 414220 by (1) clearing the CTX bit, (2) indicates the current task should be moved to the list for the current priority level by setting the Move Current To register 401 to the priority level of the currently executing task and (3) indicates the new task should be taken from the list specified by the priority level where the new task was added by setting the Take New From register 402. Since both the Move Current To register 401 and the Take New From register 402 are valid, both the Save Context bit and the Load Context bit in the Interrupt Control register 403 are set 414221. When these bits are set in the Interrupt Control register 403, the Interrupt Generator 404 asserts interrupt 30. While the host processor is synchronizing the interrupt, the TSA performs additional functions. The number of ready tasks at the priority level specified by the priority of the added task is decremented 414222 because this task is taken from the list by the TSA-ISR. The number of ready tasks at the priority level specified by the current execution priority is incremented 41223 because the task being preempted is moved to this list. The state machine then waits for the TSA-ISR to indicate the task switch has taken place by waiting for the TSA-ISR to clear the Save Context and Load Context bits in the Interrupt Control register 403 as shown in 414224. When the TSA-ISR responds to the interrupt as shown in FIG. 17, the Task Command register 465 clears when the host processor reads the Interrupt Control register 403 because CTX is clear as shown in 102. This clears the Add Task flag bit in the Task Command Register 465. Since the Interrupt Control register 403 has the Save Context bit and Load Context bit set, decisions 103 and 105 are false. This results in the TSA-ISR executing the Task Switch 107 function. When the Task Switch 107 function clears both the Save Context and Load Context bits in the Interrupt Control register 403, the state machine continues from its wait at 414224 and the Interrupt Generator 404 negates the interrupt 30. The state machine then updates the current execution priority of the TSA to the priority of the new task that was added 414225.

Figure 24:
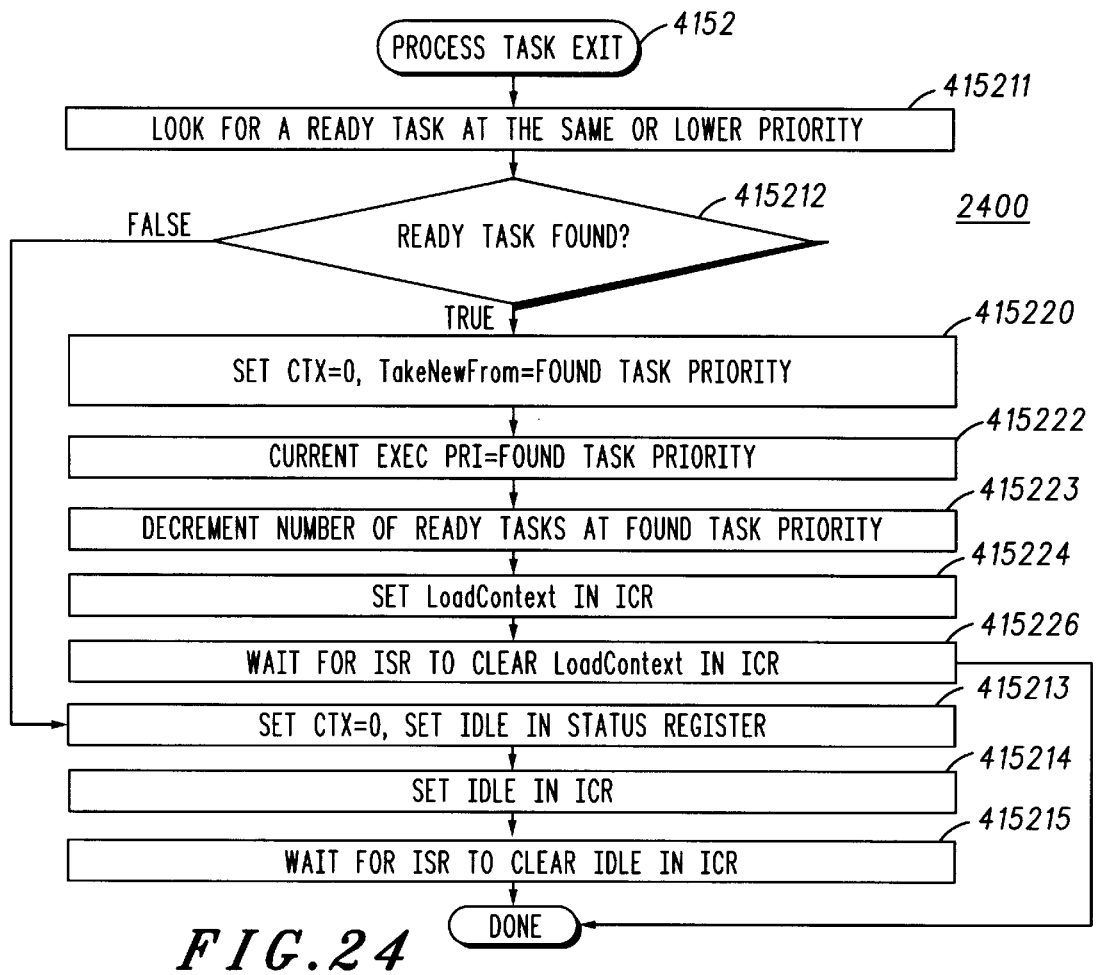
FIG. 24 is a flow chart showing one embodiment of steps for how the state machine processes task exit requests from the host processor in accordance with the present invention.

If a task exit function is requested by the host processor, the State Machine 41 recognizes the Task Exit bit in the Task Command register 465 is set in 4150. The State Machine 41 begins a sequence of instructions to process the exiting task (Process Task Exit 4152) and is shown in detail in FIG. 24, numeral 2400. The State Machine 41 determines if there is another ready task by searching the Ready Task Counters 43 from the Current Execution Priority 44 to the lowest priority as shown in 415211. If the State Machine 41 determines there are no ready tasks, then decision 415212 is false and the processor is idle. The State Machine 41 clears the CTX bit to indicate the Task Command register currently does not contain context 415213. The State Machine 41 also sets the IDLE flag in the Status register 42 to remember the state of the host processor 415213. Since there is no task to save (the current task is exiting) and no task to load (the host is now idle), the State Machine sets only the Idle bit in the Interrupt Control register 403 as shown in 415214. When the Idle bit is set in the Interrupt Control register 403, the Interrupt Generator 404 asserts interrupt 30. The TSA has no additional computation and simply waits for the host processor to clear the IDLE bit in the Interrupt Control register 403 as shown in 415215. When the TSA-ISR responds to the interrupt as shown in FIG. 17, the Task Command register 465 clears when the host processor reads the Interrupt Control register 403 because the CTX bit is clear as shown in 102. This clears the Task Exit flag bit in the Task Command Register 465. Since the Interrupt Control register 403 has only the Idle bit set, decisions 103 and 105 are false. This results in the TSA-ISR executing the Task Switch 107 function. When the Task Switch 107 function idles the host processor and clears the Idle bit in the Interrupt Control register 403, the state machine continues from its wait at 415215 and then exits to the main loop. If when searching for a ready task 415211 a ready task was found, decision 415212 is true. State Machine 41 clears the CTX bit to indicate the Task Command register currently does not contain context 415220. The State Machine 41 sets the Take New From register 402 to the priority level were the ready task was found 415220. The TSA Current Execution Priority 44 is updated to the priority level where the new task was found 415222. The Ready Task Counter 43 at the priority of where the ready task was found 415223 is decremented. Since there is no task to save (the current task is exiting) but there is a task to load (a ready task was found), the State machine 41 sets the Load Context bit in the Interrupt Control register 403 as shown in 415224. The State Machine 41 then waits for the TSA-ISR to clear the Load Context bit in the Interrupt Control register 403 as shown in 415226.

When the TSA-ISR responds to the interrupt as shown in FIG. 17, the Task Command register 465 clears when the host processor reads the Interrupt Control register 403 because the CTX bit is clear as shown in 102. This clears the Task Exit flag bit in the Task Command register 465. Since the Interrupt Control register 403 has only the Load Context bit set, decisions 103 and 105 are false. This results in the TSA-ISR executing the Task Switch 107 function. The Task Switch 107 ignores the task object of the currently executing task (because it is exiting) and loads the context of the new object. When the Task Switch 107 function clears the Load Context bit to indicate the context of the new task has been loaded, the State Machine continues from its wait at 415226 and returns to the main loop.

Figure 26:
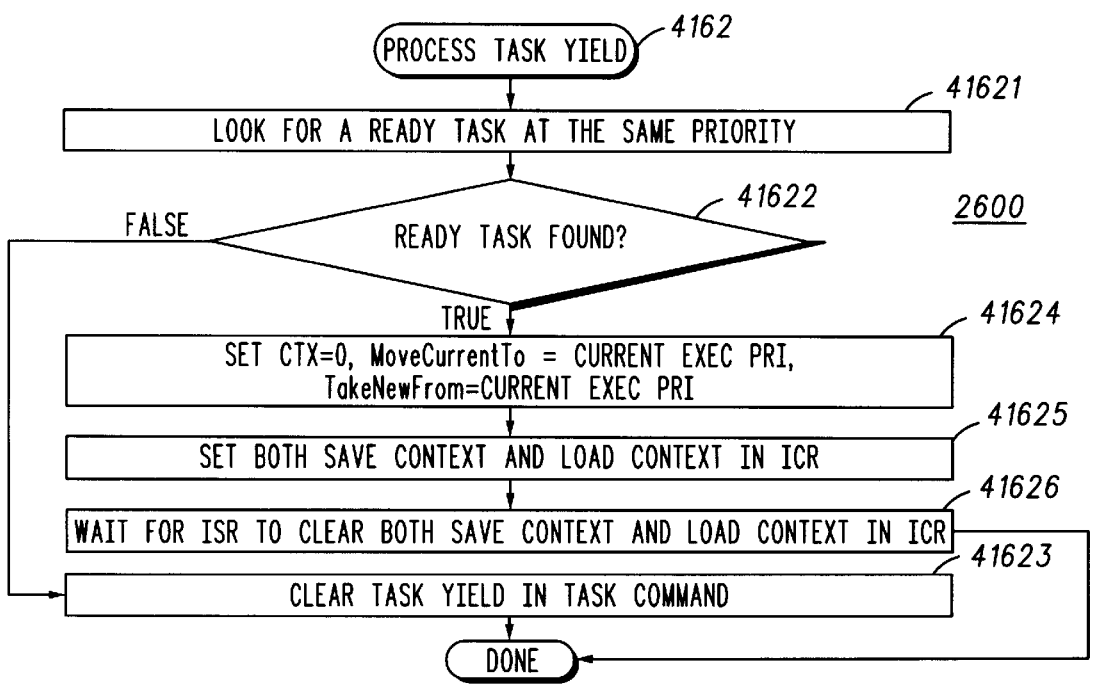
FIG. 26 is a flow chart showing one embodiment of steps for how the state machine processes task yield requests from the host processor in accordance with the present invention.

If a task yield function is requested by the host processor, the State Machine 41 recognizes the Task Yield bit in the Task Command register 465 is set as shown in 4160. The State Machine 41 begins a sequence of instructions to process the task yield request (Process Task Yield 4162) and is shown in detail in FIG. 26, numeral 2600. The Process Task Yield determines if another ready task is present at the same priority level by using the Current Execution Priority 44 and the Ready Task Counters 43 as shown in 416221. If the Ready Task Counter is zero, there are no other ready tasks at the current priority level and decision 41622 is false. The State Machine 41 clears the Task Yield bit in the Task Command register 465 as shown in 41623. The Task Yield function 126 then continues executing after verifying the Task Yield bit is clear 1263. If the decision 41622 determines another task is ready at the same priority level, the currently executing task is preempted. The State Machine 41 sets up the task switch in 41624 by (1) clearing the CTX bit, (2) indicating the current task should be moved to the list for the current priority level by setting the Move Current To register 401 to the priority level of the currently executing task and (3) indicating the new task should be taken from the list specified by the current execution priority by setting the Take New From register 402. Because the Move Current To register 401 and the Take New From register 402 are set to the same value (the Current Execution Priority), the effect of the task yield function is to rotate the ready task list at the current priority level. Since both the Move Current To register 401 and the Take New From register 402 are valid, both the Save Context bit and the Load Context bit in the Interrupt Control register 403 are set 41625. When these bits are set in the Interrupt Control register 403, the Interrupt Generator 404 asserts interrupt 30. The State Machine 41 then waits for the TSA-ISR to indicate the task switch has taken place by waiting for the TSA-ISR to clear the Save Context and Load Context bits in the Interrupt Control register 403.

When the TSA-ISR responds to the interrupt as shown in FIG. 17, the Task Command register 465 clears when the host processor reads the Interrupt Control register 403 because CTX is clear as shown in 102. This clears the Task Yield flag bit in the Task Command Register 465. Since the Interrupt Control register 403 has the Save Context bit and Load Context bit set, decisions 103 and 105 are false. This results in the TSA-ISR executing the Task Switch 107 function. When the Task Switch 107 function clears both the Save Context and Load Context bits in the Interrupt Control register 403, the state machine continues from its wait at 41626 and the Interrupt Generator 404 negates the interrupt 30.

Figure 25:
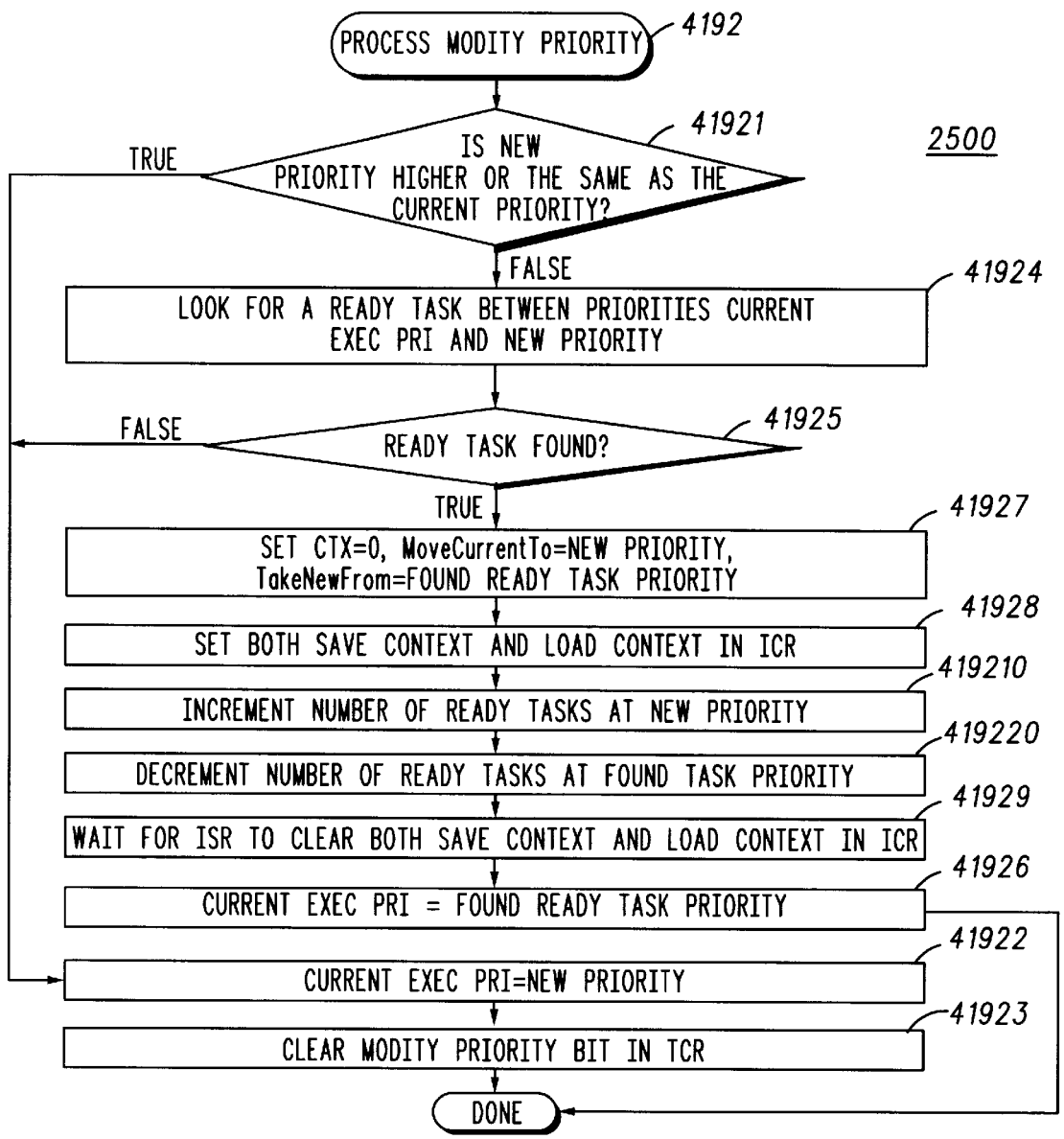
FIG. 25 is a flow chart showing one embodiment of steps for how the state machine processes modify priority requests from the host processor in accordance with the present invention.

If a modify priority function is requested by the host processor, the State Machine 41 recognizes the Modify Priority bit in the Task Command register 465 is set as shown in 4190. The State machine 41 begins a sequence of instructions to process the change in task priority (Process Modify Priority 4192) and is shown in detail in FIG. 25, numeral 2500. The State Machine 41 determines the new priority level from the Parameter register 460 because the Modify Priority command 125 wrote the new priority to the Modify Priority register 461. This value was transferred to the Parameter register 460. The state machine next determines if the new priority is higher or the same as the current execution priority 41921. If this is true, then there is no change in the current execution because the highest priority ready task is currently executing and increasing its priority keeps the task as the highest priority task. The state machine updates the current execution priority to the new priority 41922 and clears the Modify Priority bit in the Task Control register 41923. If the decision 41921 determines the new priority is lower, then it is possible that other ready tasks that were previously at a lower priority level are now higher priority. The state machine searches the Ready Task Counters 43 from the Current Execution Priority 44 to the new priority level for a non-zero ready task counter to determine if there is a ready task 41924. Decision 41925 determines if a ready task was found. If no ready tasks were found, then the currently executing task is still the highest s priority task. The state machine updates the current execution priority to the new priority 41922 and clears the Modify Priority bit in the Task Control register 41923. If decision 41925 determines a ready task was found, then the current task must be preempted because it is no longer the highest priority ready task. The State Machine 41 sets up the task switch in 41927 by (1) clearing the CTX bit, (2) indicating the current task should be moved to the list for the new priority by setting the Move Current To register 401 to the new priority level and (3) indicating the new task should be taken from the list specified by the priority level where the new task was found by setting the Take New From register 402. Since both the Move Current To register 401 and the Take New From register 402 are valid, both the Save Context bit and the Load Context bit in the Interrupt Control register 403 are set 41928. The number of tasks at the priority level where the current task is being moved to is incremented 4192810. The number of tasks at the priority level where the new task is being taken from is decremented 4192820. The State Machine 41 then waits for the TSA-ISR to clear both bits 41929. When the Save Context and Load Context bits are set in the Interrupt Control register 403, the Interrupt Generator 404 asserts interrupt 30. The state machine then waits for the TSA-ISR to indicate the task switch has taken place by waiting for the TSA-ISR to clear the Save Context and Load Context bits in the Interrupt Control register 403.

When the TSA-ISR responds to the interrupt as shown in s FIG. 17, the Task Command register 465 clears when the host processor reads the Interrupt Control register 403 because CTX is clear as shown in 102. This clears the Modify Priority flag bit in the Task Command Register 465. Since the Interrupt Control register 403 has the Save Context bit and Load Context bit set, decisions 103 and 105 are false. This results in the TSA-ISR executing the Task Switch 107 function. When the Task Switch 107 function clears both the Save Context and Load Context bits in the Interrupt Control register 403, the state machine continues from its wait at 41929 and the Interrupt Generator 404 negates the interrupt 30. The state machine then updates the current execution priority of the TSA to the priority of the new task that was found 41926.

Figure 27:
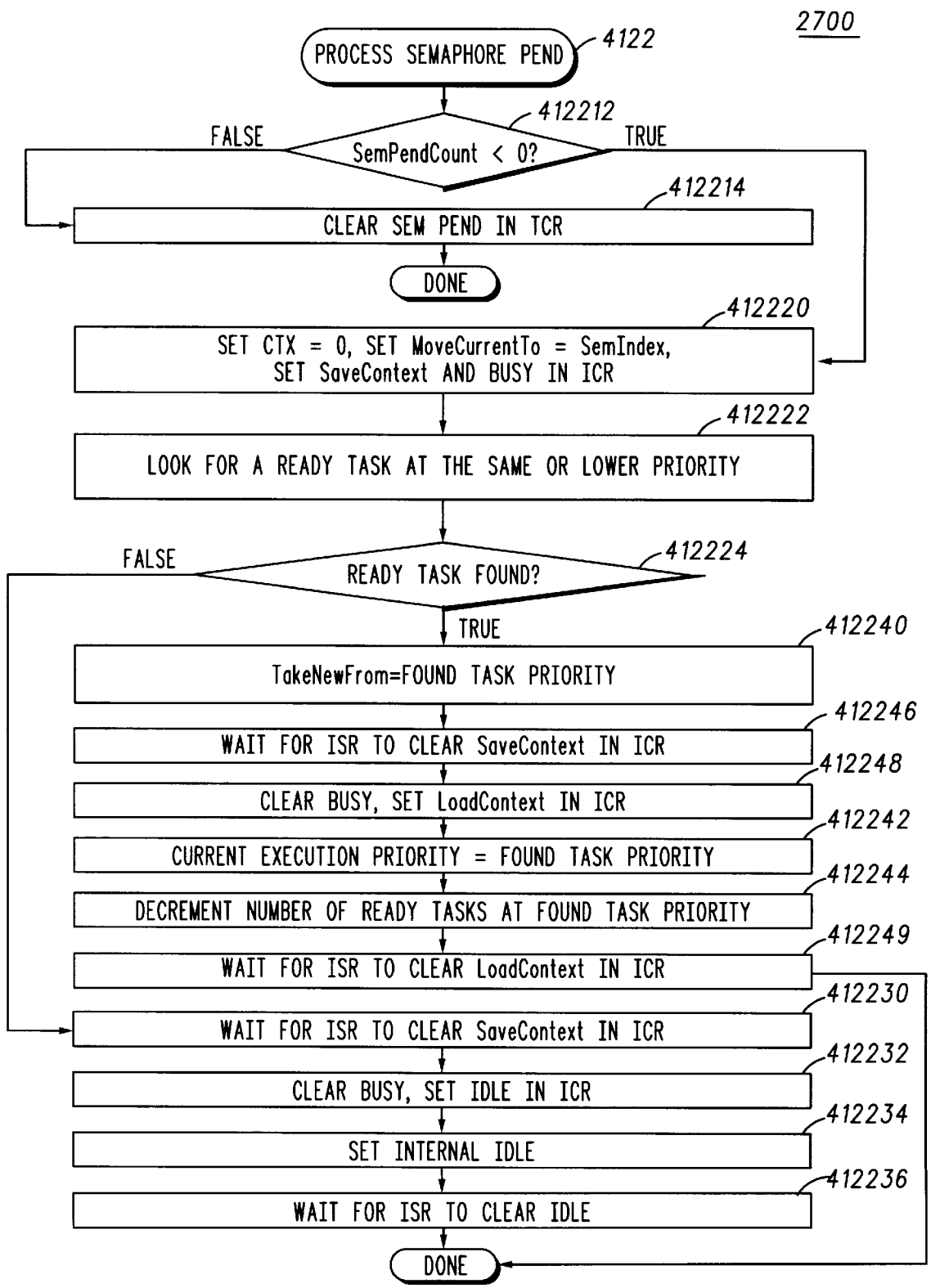
FIG. 27 is a flow chart showing one embodiment of steps for how the state machine processes semaphore pend requests from the host processor in accordance with the present invention.

If a semaphore pend function is requested by the host processor, the State Machine 41 recognizes the Semaphore Pend bit in the Task Command register 465 is set as shown in 4120. The State Machine 41 begins a sequence of instructions to process the semaphore pend (Process Semaphore Pend 4122) and is shown in detail in FIG. 27, numeral 2700. The processing of the semaphore pend begins by examining the value of the semaphore count 412212 that was written to the Semaphore Pend Count register 463. The decision 412212 determines if the semaphore pend count is less than zero. If this is false, it indicates the semaphore pend count is greater than or equal to zero. Since this counter was decremented prior to being written to the Semaphore Pend Count register 463, a value that is currently greater than or equal to zero indicates the original s counter was strictly positive prior to being decremented. A positive count on the semaphore indicates the semaphore had previous recorded events. Since the pend request for the semaphore can be immediately satisfied, there is no change in the current execution and the State Machine 41 clears the Semaphore Pend bit in the Task Command register 465 as shown in 412214. The Semaphore Pend function 122 then continues executing after verifying the Semaphore Pend bit is clear 1224. If the decision 412212 determines the semaphore pend count is less than zero then the current task is preempted. Since the counter was decremented prior to being written to the Semaphore Post Count register 463, a value that is negative indicates the original counter was zero or negative prior to being decremented. A negative or zero count on the semaphore indicates the semaphore previously had no events. A pend request on a semaphore without events causes the task to block execution until events become available. The State Machine 41 sets up the task switch in 412220 by (1) clearing the CTX bit, (2) indicating the current task should be moved to the list to wait for the semaphore as specified by the Semaphore Pend Index register 464 and (3) setting the Save Context and Busy bits in the Interrupt Control register 403. At this time it is known the current task can be preempted and its context saved; but, it is not known if there is another ready task for execution. When the Busy and Save Context bits are set in the Interrupt Control register 403, the Interrupt Generator 404 asserts interrupt 30. While the host processor is synchronizing the interrupt, the TSA looks for another ready task at the same or lower priority levels 412222.

When the TSA-ISR responds to the interrupt as shown in FIG. 17, the Task Command register 465 clears when the host processor reads the Interrupt Control register 403 because the CTX bit is clear as shown in 102. This clears the Semaphore Pend flag bit in the Task Command Register 465. Since the Interrupt Control register 403 has only the Save Context and Busy bit set, decisions 103 and 105 are false. This results in the TSA-ISR executing the Task Switch 107 function. The TSA-ISR clears the Save Context bit 10723 to indicate the context of the executing task has been saved and then waits while the Busy bit 10724 in the Interrupt Control register is set. The decision 412224 determines if a ready task has been found. If this decision is false, it indicates there are no ready tasks and the task set is now idle. The TSA waits 412230 for the TSA-ISR to clear the Save Context bit in the Interrupt Control register 403 to ensure the TSA-ISR does not further write the Interrupt Control Register. The TSA then responds 412232 by clearing the Busy bit and setting the Idle bit in the Interrupt Control Register 403. The internal IDLE bit is set to indicate the task set is now idle 412234. When the Busy bit in the Interrupt Control register 403 is cleared, the TSA-ISR continues and determines if there is a new context to load 10730. Since the Idle bit is set, the Task Switch 107 function idles the host processor 10741 and clears the Idle bit 10742 in the Interrupt Control register 403. The state machine continues from its wait at 412236 and then exits to the main loop. If when searching for a ready task 412222 determines a ready task was found, then decision 412224 is true. The Take New From register 402 is set to indicate the priority level where a new task was found 412240. The TSA waits 412246 for the TSA-ISR to clear the Save Context bit in the Interrupt Control register 403 to ensure the TSA-ISR does not further write the Interrupt Control Register. The TSA then responds 412248 by clearing the Busy bit and setting the Load Context bit in the Interrupt Control Register 403. When the Busy bit in the Interrupt Control register 403 is cleared, the TSA-ISR continues and determines if there is a new context to load 10730. Since the Load Context bit is set, the Task Switch 107 function removes the task from the list 10731, loads the context 10732, and clears the Load Context bit 10733 in the Interrupt Control register 403. In parallel to the host processor loading the context of the new task, the TSA is performing other functions—the Current Execution Priority 44 is set to the priority where the new task was found 412242 and the number of ready tasks at that priority level is decremented 412244. After the TSA-ISR clears the Load Context bit, the state machine continues from its wait at 412249 and then exits to the main loop. Thus, it can be seen the semaphore pend function is virtually transparent to the host processor because (1) the TSA hides the determination of the next ready task during the time the host processor is saving the context of the current task and (2) the TSA hides it s internal updates during the time the host processor is loading the context of the next task. In effect, the task switch time is limited only by the time it takes for the Host Processor 1 to context switch and is not dependent on the TSA 2.

Figure 28:
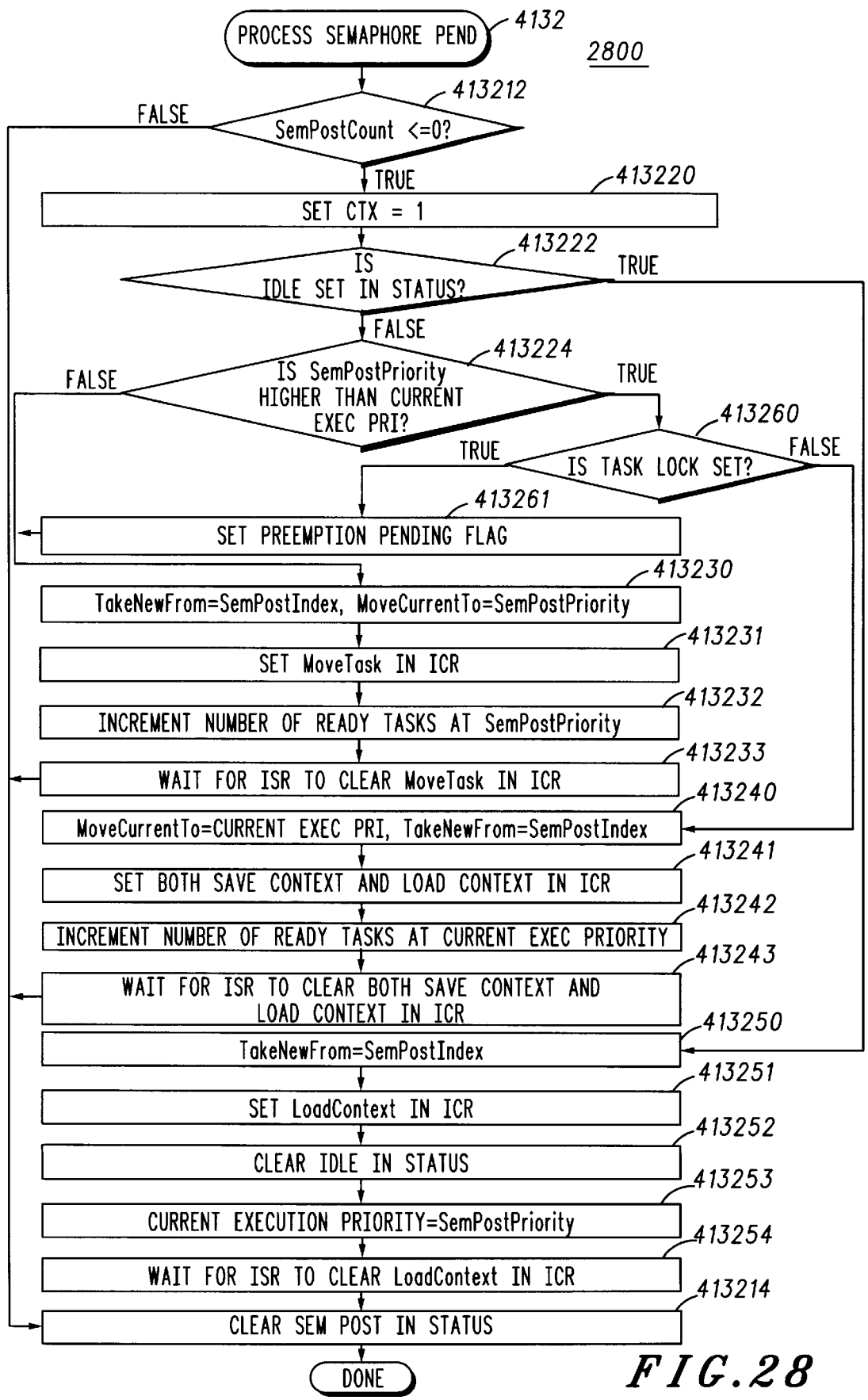
FIG. 28 is a flow chart showing one embodiment of steps for how the state machine processes semaphore post requests from the host processor in accordance with the present invention.

If a semaphore post function is requested by the host processor, the State Machine 41 recognizes the Semaphore Post bit in the Status register 42 is set as shown in 4130. The State machine 41 begins a sequence of instructions to process the semaphore post (Process Semaphore Post 4132) and is shown in detail in FIG. 28, numeral 2800. The process of posting a semaphore is different than the previously described task commands because (1) semaphore posts can be requested by interrupts as well as tasks and (2) there is no "synchronization" with the semaphore posts (tasks/ISRs do not wait for them to complete). Once a semaphore post has been issued, the task or ISR continues execution without waiting for the TSA to process the semaphore. The processing of the semaphore post begins by examining the value of the semaphore count 413212 that was written to the Semaphore Post Count register 451. The decision 413212 determines if the semaphore post count is less than or equal to zero. If this is false, it indicates the semaphore post count is greater than zero. Since this counter was incremented prior to being written to the Semaphore Post Count register 451, a value that is greater than zero indicates the original counter was greater than or equal to zero prior to being incremented. A semaphore count greater than or equal to zero indicates there were no tasks pending for this semaphore and therefore no new tasks have become ready. The State Machine 41 clears the Semaphore Post bit in the Status register 42 as shown in 413214. If the decision 413212 is true, it indicates a task is currently pending for the semaphore and has become ready. One of four different situations may occur: (1) if the host processor is currently idle, the ready task begins execution regardless of its priority, (2) if the ready task is the same or lower priority than the currently executing task, the task is moved to a ready list but does not preempt the currently executing task, (3) the ready task is higher priority than the currently executing task and preempts it, or (4) the ready task is a higher priority than the currently executing task but the task lock is enabled which prevents preemption. The CTX bit is set 413220 to indicate that the TSA registers in the STCI are preserved. This happens because a task may be in the process of issuing a synchronous task command when then semaphore post begins processing. Transparently saving the TSA registers in the STCI ensures the task is transparently restored. Setting CTX is necessary for both the task preemption and the move task situation. For the wake up from idle, context is irrelevant because when the processor is in the idle state, it does not have context. The decision at 413222 determines if the host processor is currently idle. If the IDLE bit is set in the Status register 42, the host processor wakes up from an idle condition. In many situations, the host processor implements a "wait" instruction. The "wait" places the processor in the low power state. This low power state is typically exited by an interrupt that the TSA provides.

The State Machine 41 sets the Take New From register 402 to the Semaphore Post Index 453 as shown in 413250. This represents the list where the semaphore posted. The Load Context bit is set in the Interrupt Control register to indicate there is only a task to load 413251. Since the host processor is no longer idle, the IDLE bit in the Status register is cleared 413252. The Current Execution Priority 44 is updated to the priority of the first task that was pending on the semaphore as specified in the Semaphore Post Priority register 452 as shown in 413253. The State Machine 41 then waits for the TSA-ISR to clear the Load Context bit in the Interrupt Control Register 403 as shown in 413254. When the Load Context bit is set in the Interrupt Control register 403, the Interrupt Generator 404 asserts interrupt 30. When the TSA-ISR responds to the interrupt as shown in FIG. 17, the Task Command register 465 is not cleared when the host processor reads the Interrupt Control register 403 because the CTX bit is set as shown in 102. This preserves the value of the Task Command Register in case a task was in the process of issuing a synchronous task command. Since the Interrupt Control register 403 has only the Load Context bit set, decisions 103 and 105 are false. This results in the TSA-ISR executing the Task Switch 107 function. The TSA-ISR clears the Load Context 10733 to indicate the context of the new task has been loaded. The state machine continues after the wait 413254 and clears the Semaphore Post bit in the Status register 42 as shown in 413214.

If the decision 413222 indicates the host processor is not currently idle, then the State Machine 41 determines if the priority of the first task pending on the semaphore is higher than the current execution priority 413224. This is performed by comparing the value in the Semaphore Post Priority register 452 to the Current Execution Priority 44. If the decision 413224 is false, this indicates the task that was pending on the semaphore was the same or lower priority than the currently executing task. In this situation, the currently executing task remains executing (no preemption) but the task that was pending on the semaphore now becomes ready. The task needs to be moved from the semaphore list to the ready task list. The State Machine 41 indicates how to move the ready task from the semaphore list to the ready task list by using the Move Current To register 401 and the Take New From register 402. The roles of these registers are slightly different because they indicate a task to be moved from one list to another rather than a context switch. The list where the task was pending is specified by the Semaphore Post Index register 453 and sets the Take New From register 402. The Move Current To register 401 specifies the list where the task is moved to and is set to the priority of the pending task that was written to the Semaphore Post Priority register 452. These registers are set in 413230. The Move Task bit is set in the Interrupt Control register to indicate a task move is required 413231. The number of ready tasks at the priority level where the task is being moved to is incremented 413232. The State Machine 41 then waits for the TSA-ISR to clear the Move Task bit in the Interrupt Control Register 403 as shown in 413233. When the Move Task bit is set in the Interrupt Control register 403, the Interrupt Generator 404 asserts interrupt 30.

When the TSA-ISR responds to the interrupt as shown in FIG. 17, the Task Command register 465 is not cleared when the host processor reads the Interrupt Control register 403 because the CTX bit is set as shown in 102. This preserves the value of the Task Command register because the Move Task operation should not affect the currently executing task. Since the Interrupt Control register 403 has only the Move Task bit set, decision 105 is true. This results in the TSA-ISR executing the Move Task 106 function. The TSA-ISR removes the ready task from the semaphore list as specified by the Take New From register as shown in 1062. This task is placed at the end of the ready list as specified by the Move Current To register as shown in 1063. The Move Task bit in the Interrupt Control register is then cleared 1064. The state machine continues after the wait 413233 and clears the Semaphore Post bit in the Status register 42 as shown in 413214.

If the decision 413224 is true indicating the ready task that was pending on the semaphore has a higher priority than the currently executing task, then the current task potentially needs to be preempted. The decision 413260 determines if the task lock mode is enabled. If the task lock mode is enabled, the TSA is not allowed to preempt the current task even though a higher priority task has become ready. If decision 413260 is true, the task lock is set and the Preemption Pending bit is set in the status register 413261. This bit remembers that a higher priority task has become ready and that the currently executing task should be preempted when the task lock is removed. After the Preemption Pending bit is set, the semaphore post is processed as a task move. This moves the task to a ready list using the task move operation as previously described.

If the decision 413260 determines the task lock is currently off, then the ready task preempts the currently executing task. The currently executing task is moved to the list for its priority level by setting the Move Current To register 401 to the Current Execution Priority 44, and the new task is taken from the semaphore list by setting the Take New From register 402 to the Semaphore Post Index register 453 as shown in 413240. Both the Save Context and the Load Context bits in the Interrupt Control register 403 are set to save the context of the current task and load the context of the new task 413241. The number of ready tasks at the priority level of the currently executing task is incremented 413242 and the State Machine 41 waits for the TSA-ISR to clear both the Save Context and Load Context bits in the Interrupt Control register 403 as shown in 413243.

When the TSA-ISR responds to the interrupt as shown in FIG. 17, the Task Command register 465 is not cleared when the host processor reads the Interrupt Control register 403 because CTX is set as shown in 102. This preserves the Task Command register of the task being preempted. Since the Interrupt Control register 403 has the Save Context bit and Load Context bit set, decisions 103 and 105 are false. This results in the TSA-ISR executing the Task Switch 107 function. When the Task Switch 107 function clears both the Save Context and Load Context bits in the Interrupt Control register 403, the state machine continues from its wait at 413243 and clears the Semaphore Post bit in the Status register 42 as shown in 413214.

Figure 41:
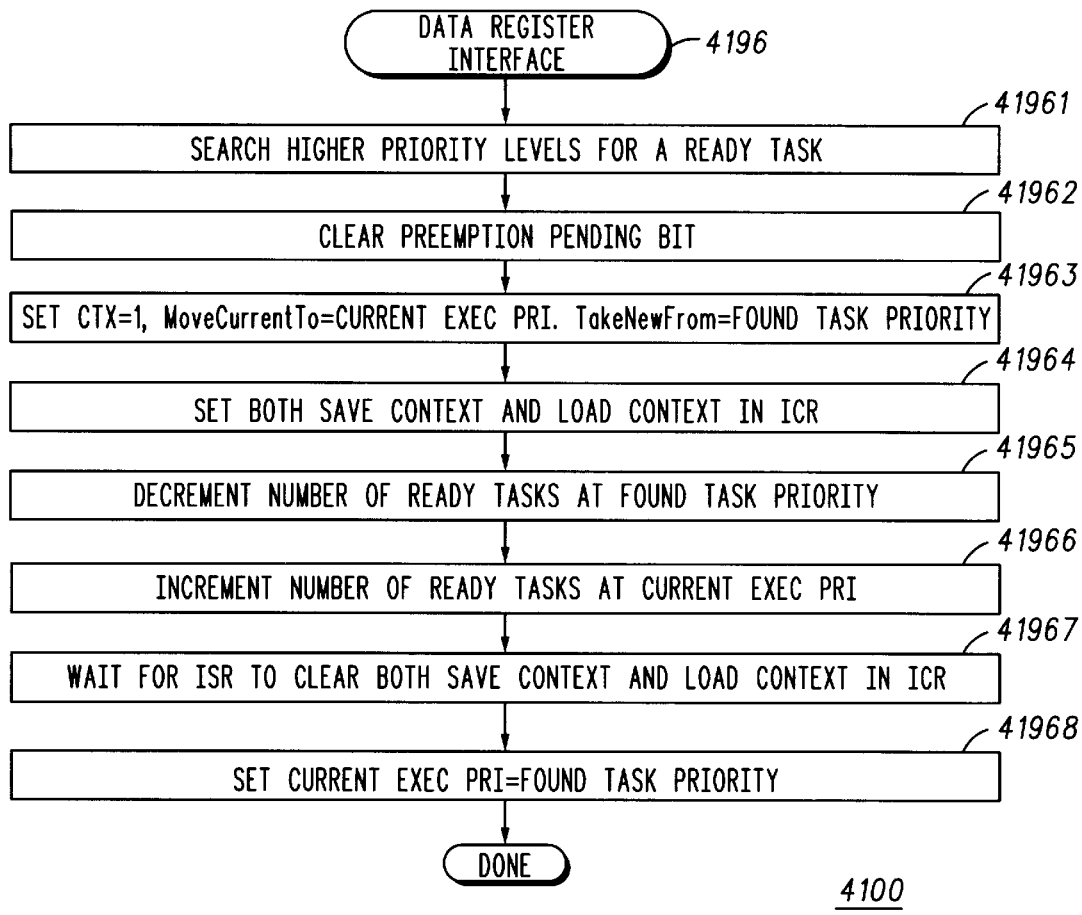
FIG. 41 is a flow chart illustrating how the Task Scheduling Accelerator selects a task after the task lock has been turned off and higher priority ready tasks are pending.

If the state machine determines the task lock is off (preemption is now enabled) but the Preemption Pending bit is set 4195, then a task that had become ready while the task lock was on must now be selected for execution. This is performed by the Reschedule function 4196 and is shown in detail in FIG. 41, numeral 4100. The reschedule operation begins by searching from the highest priority level to the current priority level for a ready task 41961. Since it was know a preemption was pending, this search is always successful. The Preemption Pending bit is then cleared 41962. Since the reschedule operation appears as a semaphore post that was delayed in time, the CTX bit is set to preserve the task context 41963. The currently executing task is moved to its priority level by setting the Move Current To register to the current execution priority. The Take New From register is set to where the new highest priority ready task was found. Both the Save Context and Load Context bits are set in the Interrupt Status register 41964 to save the current task and load the new task. The number of ready tasks at the priority level where the highest priority task was found is decremented 41965 and the number of tasks at the priority level where the current task is being moved to is incremented 41966. The TSA then waits for both the Save Context and the Load Context bits to clear 41967 indicating the task switch has taken place. The current execution priority is then updated to the priority of the task that was found 41978.

A device comprising a Task Scheduling Accelerator and a host processor is shown in FIG. 30, numeral 3000. This describes the TSA 80 as connecting to any arbitrary Host Processor 70 using the standard peripheral interface, except that it includes an interrupt line 92. As shown in FIG. 30, the Host Processor 70 and TSA 80 are connected with a data bus 90, an address bus 91 and an interrupt line 92. Thus, the TSA 80 appears as any arbitrary peripheral in the host system. The TSA 80 is connected as a memory mapped device using an interrupt line 92. This is an important feature of the present invention because the TSA 80 may be connected to almost any type of Host Processor 70: RISC, CISC, DSP, microcontroller, etc. This allows the TSA 80 to be connected as an external device or a device integrated directly onto the processor chip. Since the TSA 80 does not require any specialized instructions on the Host Processor 70, the TSA 80 is independent of the type of Host Processor 70. This allows fast integration and fast time to market by not requiring any changes to the processor core for integrating the TSA 80.

Figure 31:
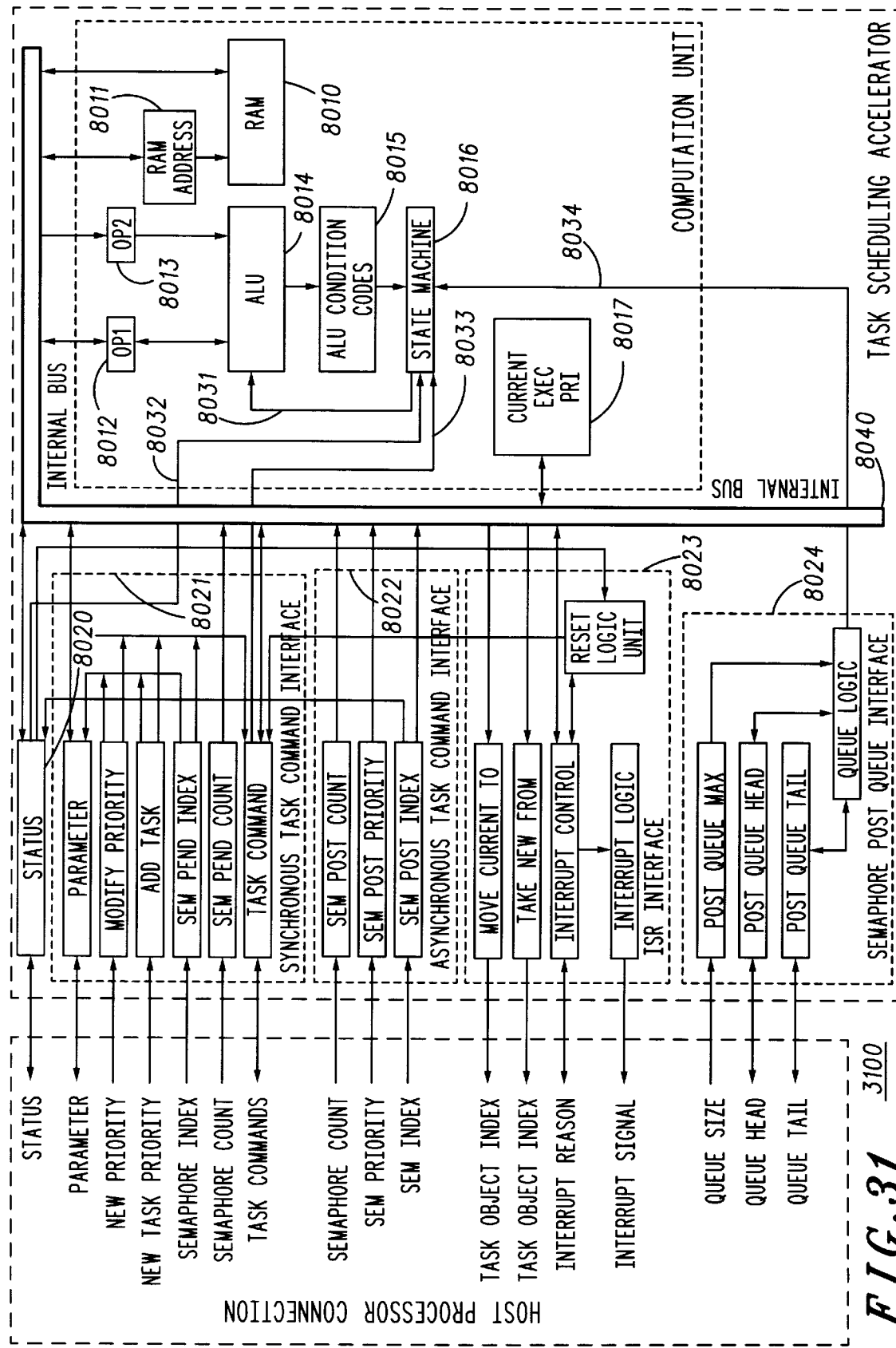
FIG. 31 is a block diagram schematic showing one embodiment of how the task scheduling accelerator may be implemented in a hardware configuration in accordance with the present invention.

Although there are various methods to implement the TSA hardware, the preferred embodiment uses the hardware architecture shown in FIG. 31, numeral 3100. The architecture generally comprises several functional interfaces (8021, 8022, 8023 and 8024), an internal bus for moving registers 8040, an ALU 8014 for manipulating values and comparing values, a current execution priority register 8017 and a RAM 8010 for storing values. The Synchronous Task Command interface 8021 is used for issuing synchronous commands and contains several registers. These registers are the Parameter, Modify Priority, Add Task, Sem Pend Index, Sem Pend Count and Task Command registers. Since a synchronous task command is completed prior to another synchronous task command being issued, only one synchronous task command is active at any given time. This allows registers that hold parameters to be reused for a reduction in hardware cost. When writing the Modify Priority, Add Task or Sem Pend Index register, the value is transferred to the Parameter register. Writing these registers also causes a flag to set in the Task Command register to indicate a pending command. The task exit and task yield commands do not require parameters and are performed by setting a bit in the Task Command register directly. The Parameter, Sem Pend Count and Task Command registers are connected to the internal bus 8040 and are manipulated by moving the value from the register to an ALU operand register. The Parameter, Sem Pend Count and Task Command registers are readable from the host processor and are saved/restored on a context switch. The Asynchronous Task Command interface 8022 is used for issuing commands asynchronous to tasks. The only command that may be issued by interrupts (asynchronous to tasks) is the semaphore post. This interface allows commands to be issued without waiting for them to complete. To issue a semaphore post through the Asynchronous Task Command interface, the Semaphore Post Count, Semaphore Post Priority and Semaphore Post Index registers are written. When the Semaphore Post Index register is written, the Semaphore Post flag in the Status register 8020 is set. The Interrupt Control interface 8023 is used to direct the activities of the interrupt service routine on the host computer. This interface contains the Move Current To and Take New From registers to indicate how to perform a task switch or how to move a task between lists. The Interrupt Control register contains flags that indicate the reason for the interrupt (move semaphore post, move task or context switch) and additional flags for qualifying the operation of the context switch. The Interrupt Logic is a logical-OR of all the bits in the Interrupt Control register and asserts the interrupt when any bit in the Interrupt Control register is set and negates the interrupt if all bits are clear. The Interrupt Control interface also contains special reset logic. This reset logic resets the Task Command register if the CTX bit in the Status register is clear and the Interrupt S Control register is read. This is used to efficiently manipulate the TSA context for a context switch. The Post Queue Control interface is used to assist the queuing of semaphore posts when the Asynchronous Task Command interface is currently full. The Post Queue Control interface contains queue pointers that auto-increment after being read and wrap at a maximum value as specified by the Post Queue max register. Queue Logic determines if the head and tail pointers are equal and determines if the queue contains any information.

The OP1 register is used as a source register for ALU operations. All ALU results go to the OP1 register. The OP2 register is used when the ALU needs to compare a value to the OP1 register. The ALU 8014 is capable of clear, increment, decrement, bit set, bit clear, bit test, test OP1 and compare to operand register OP2. This minimal amount of functions can perform the algorithms for task scheduling. A bit test, test OP1 or compare to OP2 operation sets the condition codes 8015. These condition codes can be used by conditional jump instructions in the state machine 8016. The condition codes currently implemented are N (negative), Z (zero), C (carry) and A (always true). The state machine executes micro-instructions to execute the scheduling algorithms. The Current Execution Priority 8017 stores the priority of the currently executing task. The RAM 8010 stores the plurality of ready task counters. Addresses within the RAM are referenced with the RAM Address register 8011.

In a preferred embodiment the architecture is a "16 bit" architecture from the point of view that most of the registers are 16 bits wide. The RAM is a 64×8 RAM. This assignment of architecture components creates the following configuration on the TSA:

There are 64 priority levels. This is considered to be a significant number because most commercial task schedulers typically implement 8–16 priority levels. The number of priority levels is determined by the depth of the RAM.

There can be up to 255 tasks at each priority level.

The number of tasks at each priority level is determined by the width of the RAM.

The TSA can support up to 255*64=16320 tasks. For a single processor, this is considered to be a significantly large value.

The total number of semaphores the device may allocate is 65536 minus the number of priority levels (64) equaling 65472.

Semaphores may have up to 32767 semaphore posts.

Semaphores may have up to 32768 tasks pending for each semaphore.

This configuration is a balance of TSA silicon size verses the typical size of most multi-tasking systems. These parameters may easily be changed by changing the RAM size or the size of the architecture. Even with this preferred configuration, the TSA far exceeds the typical requirements of a single processor system.

Figure 32:
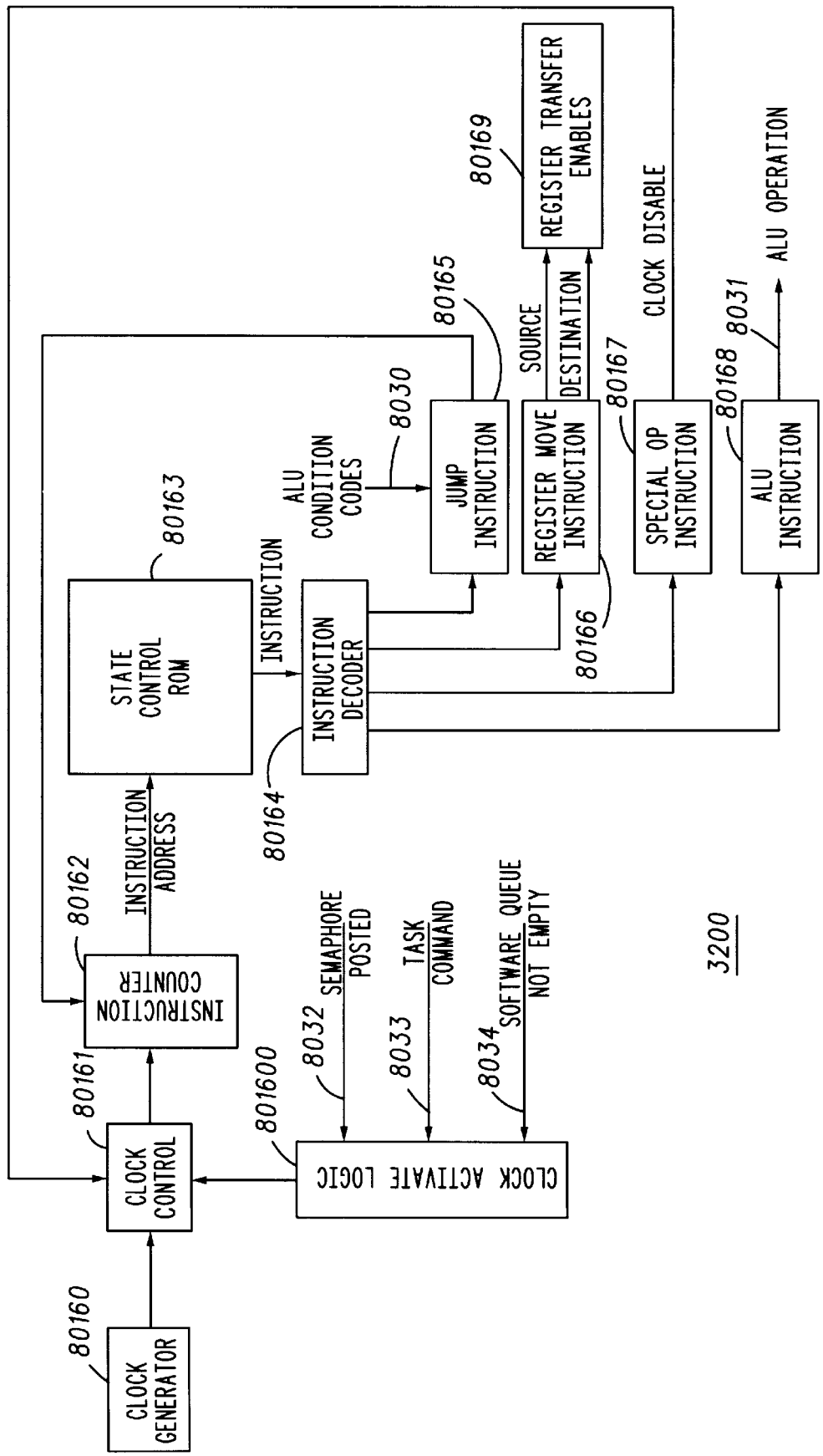
FIG. 32 is a block diagram schematic showing one embodiment of the state machine that controls the hardware in accordance with the present invention.

The details of the State Machine 8016 are shown in FIG. 32, numeral 3200. The State Machine contains a State Control ROM 80163 for storing a sequence of State Machine Instructions (SMIs) that execute the task scheduling algorithms. Instruction Counter 80162 is a counter that increments sequentially or may be parallel loaded. The Instruction Counter 80162 points to an address in the State Control ROM 80163 to reference an SMI for execution. The State Control ROM 80163 outputs the SMI to the Instruction Decoder 80164. The Instruction Decoder 80164 determines the type of SMI and routes it to the correct execution unit: jump instruction 80165, register move instruction 80166, special operation 80167 or ALU instruction 80168. If the SMI is a jump instruction, the jump instruction decoder 80165 determines if the jump is executed by examining the ALU conditions 8030. If the jump instruction is true, the instruction counter 80162 is loaded with a new value to jump to a different SMI. If the jump instruction is false, the Instruction Counter 80162 increments to the next SMI. If the SMI is a register move instruction, the Register Move Instruction decoder 80166 determines the source and destination registers. The Register Transfer Enable logic 80169 enables the source register onto the bus and reads the destination register from the bus. The special operation instruction decoder 80167 performs irregular operations. The only irregular instruction currently required is to disable the s TSA clock to reduce power consumption. When the Special Operation Instruction decoder 80167 decodes a clock disable operation, Clock Control 80161 disables the clock from the Clock Generator 80160 to the Instruction Counter 80162. If the SMI is an ALU instruction, the ALU Instruction decoder 80168 determines the ALU operation and operand 8031, and instructs the ALU 8014. When the clock has been disabled, the clock is re-enabled when the state machine has commands to process. The Clock Control 80161 is re-activated by the Clock Activate Logic 801600 whenever any of three conditions exist: (1) a semaphore is posted 8032 as indicated by Semaphore Posted bit set in the Status register, (2) a task command has been issued 8033 as indicated by any bit in the Task Command register being set, or (3) the software Semaphore Index Queue 15 is non-empty and can be transferred to the Asynchronous Task Command Interface as is indicated by the Semaphore Post bit in the Status register being cleared and the Post Queue Head counter being unequal to the Post Queue Tail counter 8034. Thus, it can be seen that if the TSA is inactive, disabling the state machine can save considerable power.

Figure 33:
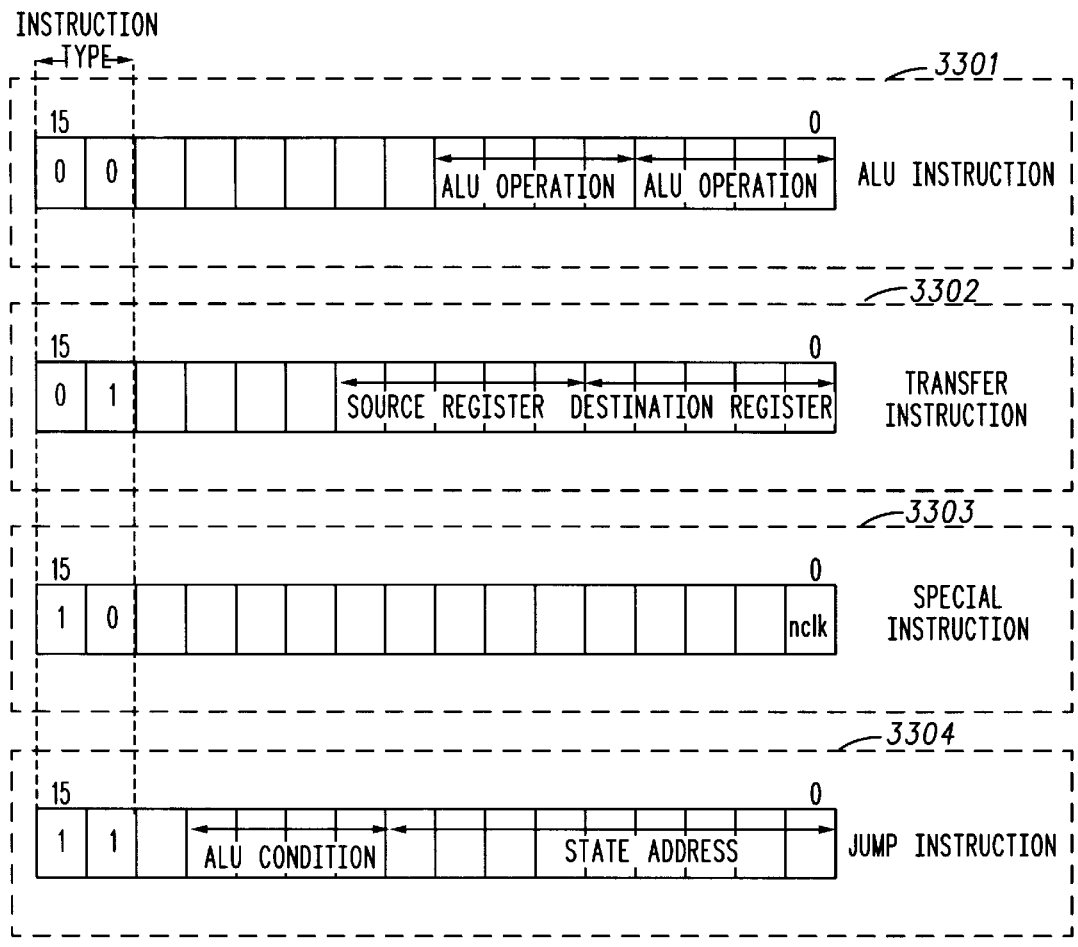
FIG. 33 is a schematic representation of examples of encoding of the instructions for the state machine in accordance with the present invention.

The instruction set for controlling the state machine is efficiently encoded to minimize the size of the State Control ROM 80163. The details of the encoding are shown in FIG. 33, numeral 3300. The instructions are encoded into 16 bits and have a plurality of reserved bits for future expansion. The first two bits of each instruction determine the instruction type. Since there are four types of instructions, this is efficiently encoded in two bits. There are 4 types of SMIs:

The ALU instruction 3301. The ALU instruction controls the ALU to perform a function. This function may require the OP1 or OP2 registers. The ALU instruction is required to encode 8 ALU operations.

This is encoded into 3 bits with an extra reserved bit for a total of 4 bits for the ALU operation field. The ALU operand is used to select a bit offset for the bit test, bit set or bit clear functions. Since the TSA is a 16 bit device, the ALU Operand field can be encoded in 4 bits. The remaining 6 bits in the ALU instruction are reserved.

The Transfer instruction 3302. The transfer instruction is used to move registers on the internal bus. Internally, there are 16 registers to access:

Status, Parameter, Sem Pend Count, Task Control, Sem Post Count, Sem Post Priority, Sem Post Index, Move Current To, Take New From, Interrupt Control, OP1, OP2, RAM Address, Ram Data (RAM input/output) and Current Execution Priority. This efficiently encodes into 4 bits for the source and 4 bits for the destination. An extra reserved bit is included for a total of 5 bits for each field. The remaining 4 bits are reserved.

The Special Instruction 3303. Each bit in the special instruction performs an operation. The only currently encoded special instruction is to disable the clock as specified with the "nclk" bit. The remaining 13 bits are reserved.

The Jump instruction 3304. The jump condition allows the state machine to jump to another SMI based on the condition codes. The four condition codes Z, C, N and A are encoded into 2 bits. Another bit is used to indicate the complement of the condition. For example, the complement of "zero" is "non-zero". An extra reserved bit is included for expansion of the number of condition codes for a total of 4 bits for the ALU condition field. If the resulting test is true, the Instruction Counter is loaded with the value in the State Address field. Since this is a 9 bit field, the state machine can address up to 512 SMIs. This is more than adequate for implementing the scheduling algorithms. The remaining 1 bit is reserved.

The instruction set is efficient and easy to decode resulting in an inexpensive implementation of the TSA.

The device of the present invention may be implemented in an article of manufacture that utilizes a processor. Examples of such articles of manufacture are: base stations, handheld radios, engine controllers, musical devices, security systems, cordless telephones, modems, fax machines, disk drives, cellular telephones, automotive controllers, motor controls, and the like.

Figure 34:
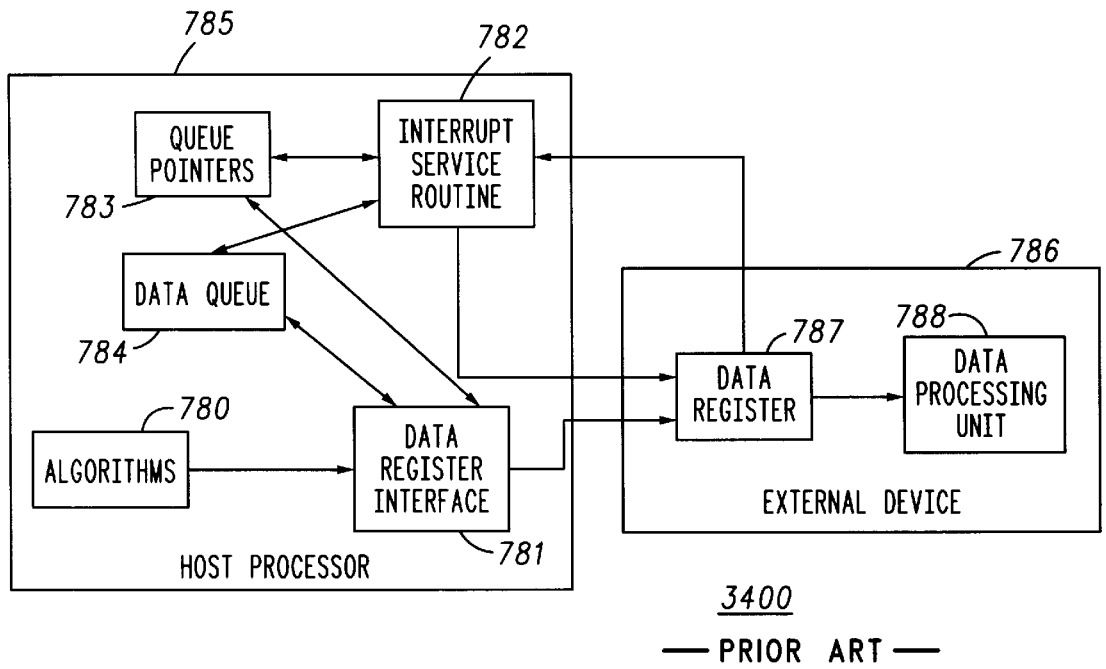
FIG. 34 is a block diagram illustrating how data is typically transferred between a software task or interrupt on a host processor to an external device in the prior art.
Figure 35:
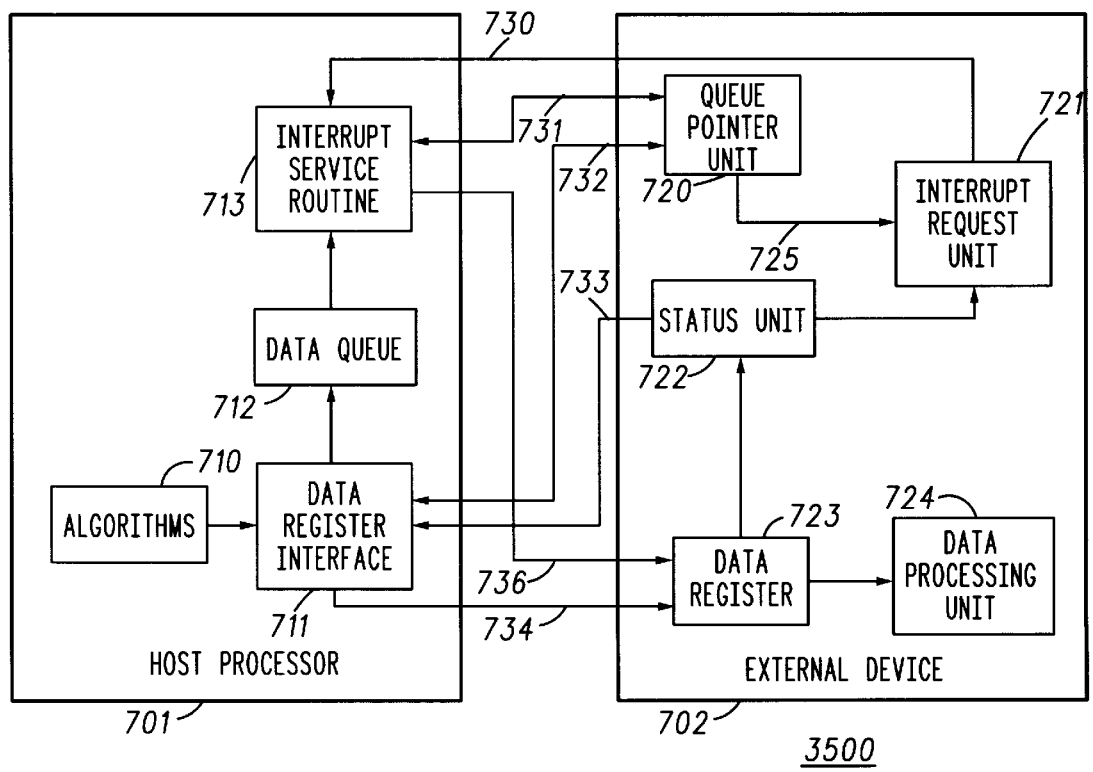
FIG. 35 is a block diagram illustrating the specific details of implementing an efficient data queuing method.

A unique aspect of the device incorporating the TSA is the previously discussed method for queuing data from the host processor to the TSA. To determine a simplified diagram of only the data queuing mechanism, a simplified diagram is shown in FIG. 35, numeral 3500. To understand why this is a more efficient mechanism than prior art, a prior art system is shown in FIG. 34, numeral 3400. In the prior art, data is transferred from an executing algorithm 780 on a host processor 785 to a data register interface 787 in an external device 786. The data register interface 781 writes data to the external device data register 787 for processing by an arbitrary data processing unit 788. If the algorithm 780 generates data faster than the data processing unit 788 can consume the data items, either the data items are queued or the algorithms must wait. In an environment where waiting is not possible (such as data items generated by interrupt service routines), data must be efficiently queued. In typical prior art, the Data Register Interface 781 stores the data in a host processor data queue 784 and modifies pointers 783. The Data Register Interface 781 must also enable the interrupt of the external device such that the external device generates an interrupt when the Data Register 787 is empty. When the data register 787 is not full, the interrupt is asserted to request data from the host processor. The Interrupt Service Routine 782 moves data from the queue 783 and updates the pointers 784. This prior art mechanism requires many steps in the software of the host processor:

The Interrupt Service routine must move the data from the queue to the external device, update the data queue pointers, wrap the pointers according to the size of the queue and disable the external device interrupt if no more data is in the queue.

The host processor must store the data in the queue, update the data queue pointers, wrap the pointers according to the queue size and enable the external device interrupt.

This enabling/disabling of interrupts must be exclusive to avoid race conditions between the host processor interrupt service routine disabling interrupts and the data register interface function enabling them.

Figure 38:
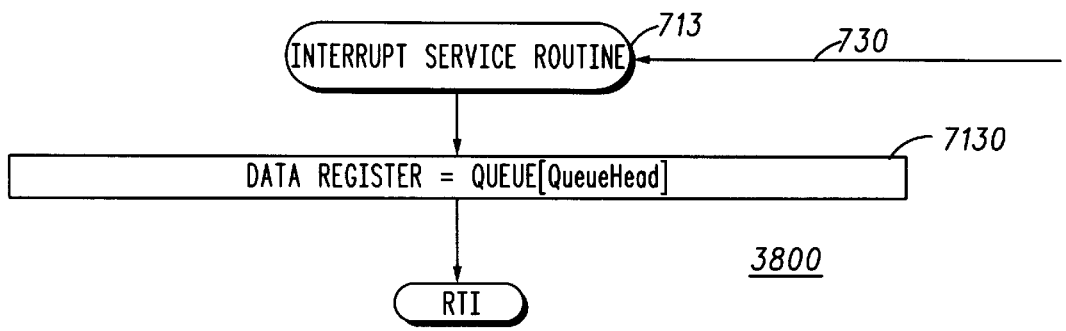
FIG. 38 is a flow chart illustrating how the interrupt service routine efficiently moves data from the host processor to the external device.
Figure 36:
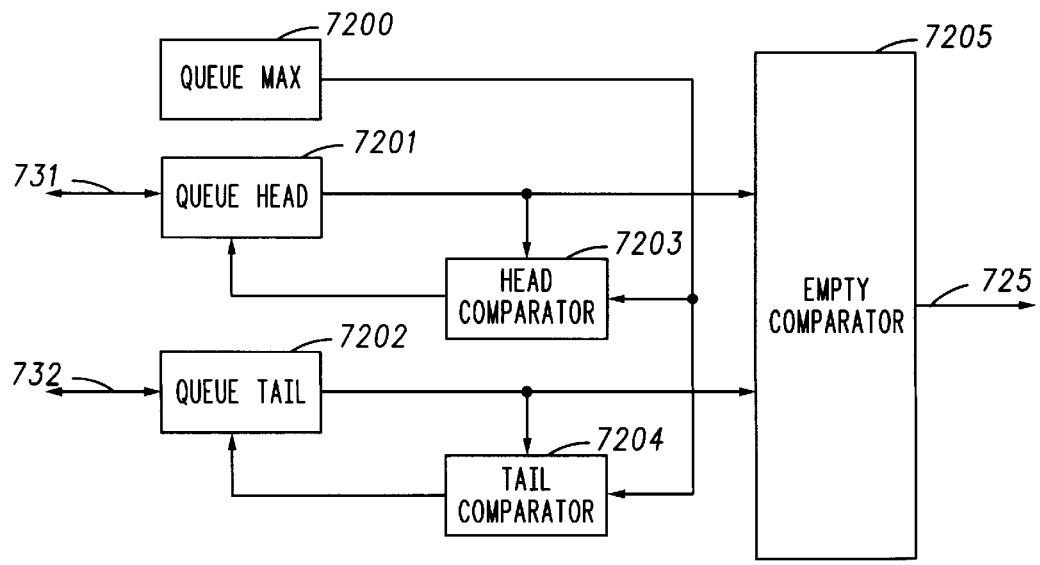
FIG. 36 is a block diagram illustrating the specific details of how hardware queue pointers operate.
Figure 37:
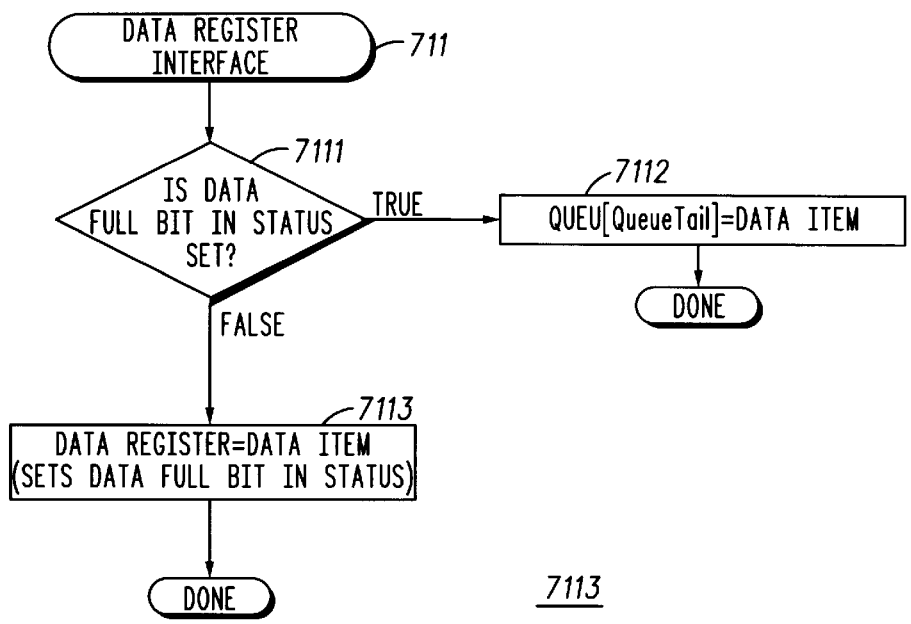
FIG. 37 is a flow chart illustrating the required operations by an interface function on the host processor for either writing data to the external device or queuing the data.

To reduce the complexity of the host software, it is best to balance the operation of the queue between the host processor and the external device as shown in FIG. 35, numeral 3500. The host processor stores the data items but the external device stores the queue pointers. The host processor is simplified by not requiring storing pointers, incrementing or wrapping them. The external device can always determine the status of the queue in the host processor by comparing the queue pointers removing the need for enabling/disabling interrupts. Thus, the external device does not generate an interrupt unless it determines the host processor queue has data available and the external device can accept data. The host processor data queuing and interrupt processing code is simplified. When an algorithm 710 writes a value to the data register interface 711 to transfer data to the external device, the data register interface 711 determines if the data register is full by examining the status unit 722 as shown in FIG. 37, numeral 3700. If decision 7111 is false, this indicates the data register is empty and can be written. The data registers are written with the data item 7113. If the decision 7111 determines the data register 723 is full, the data item must be queued. The Queue Tail pointer 7202 is read from the hardware 7112 and used as an index to the queue for storing the data item. Note the simplicity of the software in 7112 because the queue tail pointer automatically increments and wraps in hardware, and there is no need to enable the interrupts. The queue pointer unit 720 shown in detail in FIG. 36, numeral 3600, contains the queue head 7201 and the queue tail 7202. When the queue head or queue tail is read by the host processor, it is automatically incremented. The head comparator 7203 and tail comparator 7204 determine if a pointer is equal to the queue max 7200 value. If a pointer increments to the maximum value, the pointer is reset. This provides the pointer incrementing and wrapping functions required for queue indexing. The queue head 7201 and queue tail 7202 pointers are compared by the empty comparator 7205. If the queue head 7201 and queue tail 7202 are equal, the software queue is empty. If the queue head 7201 and queue tail 7202 are not equal, the software queue is non-empty. When the software queue is non-empty as indicated by 725 and the data register 723 is not full as indicated by status unit 722, then the interrupt request unit 721 asserts its interrupt. The host processor responds to the interrupt in FIG. 38, numeral 3800. The interrupt service routine reads the hardware queue head pointer 7201, retrieves the data item from the queue and writes the data item to the data register. Note the simplicity of the software in 7130 because the queue head pointer automatically increments and wraps in hardware, and there is no need to check the status of the queue and disable interrupts. It is generally important to minimize the complexity and time of an interrupt service routine. Thus, it can be seen this method of data queuing considerably simplifies the host software and minimizes the interrupt service routine.

Figure 39:
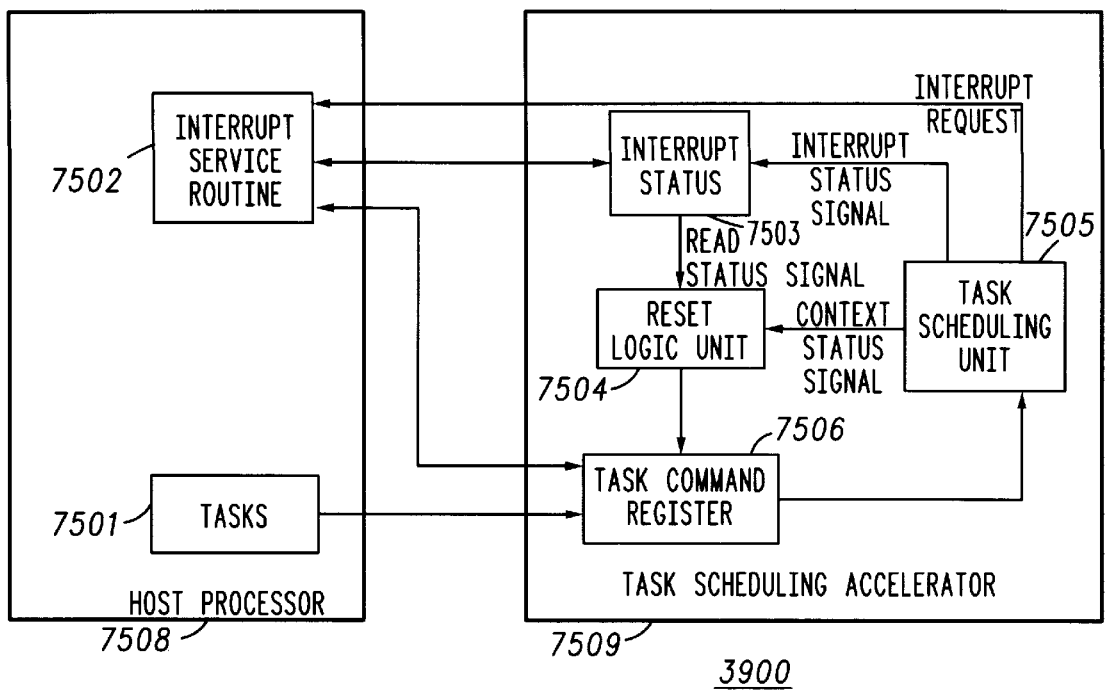
FIG. 39 is a block diagram illustrating specific details of how the task command register is cleared.

A unique aspect of the device incorporating the TSA is the previously discussed method for clearing the register for issuing commands to the TSA. To determine a simplified diagram of only the register clearing mechanism, a simplified diagram is shown FIG. 39, numeral 3900. The TSA has been simplified to include only the components that are involved in issuing commands and clearing them. Tasks 7501 on a host processor 7508 issue commands to the TSA 7509 by setting command bits in the Task Command register 7506. The Task Scheduling Unit 7505 determines if the command causes a task switch. If a task switch is required, the Task Scheduling Unit 7505 asserts an interrupt request to activate the Interrupt Service Routine 7502 on the Host Processor. To switch tasks, the Interrupt Service Routine 7502 saves the context of the current task and loads the context of a new task. Since the Task Command register 7502 is used by all tasks to issue commands, the Task Command register 7502 is considered as processor context because each task believes it is the only task using the register. This is a problematic situation because of the following issues:

If the Task Command register 7502 is saved and restored by the Interrupt Service Routine 7502, then the command that caused the task switch will be reloaded when the task context is loaded. This causes the task to re-execute the same command that just caused the task switch. This creates the requirement that the task command register must be cleared if a task command caused the task switch. This allows the task to determine the task command has been completed and continue execution.

If the context switch occurs for a reason other than a task command (for example, a semaphore post which does not use the task command register), then the Task Command register 7506 must be preserved (saved and restored) to ensure the preemption is transparent to the currently executing task.

Although one may assume that the Task Command register 7506 could be cleared each time the task context is loaded, this would violate the second requirement that the Task Command register 7506 must sometimes be preserved. Another assumption would be to clear the task command register as soon as the TSA recognizes the command; however, this is problematic because the task on the host processor may assume the task command is completed when in actuality it is not (it has only been recognized) and continue executing. This is typically due to the issue that a realistic processor typically takes a finite amount of time to respond to an interrupt. Thus, the Task Command register 7506 must be cleared after the task switch (Interrupt Service Routine 7502) has started but only if the task switch is being caused by a task command. This is further complicated by the fact that only the Task Scheduling Unit 7505 knows the reason for the task switch, but the Interrupt Service Routine 7502 is actually performing the task switch. Although it would be possible to communicate the reason for the task switch from the Task Scheduling Unit 7505 to the Interrupt Service Routine 7502 and have the Interrupt Service Routine 7502 clear the Task Command register 7506 and adjust the context it saves for the task, this is slow in software and degrades the task switch performance of the Interrupt Service Routine 7501.

The unique solution to this problem is to include a special Reset Logic Unit 7504 to clear the Task Command register 7506. When the Interrupt Service Routine 7502 reads the Interrupt Status register 7503, it is known that the Task 7501 is now preempted. Reading the Interrupt Status register 7503 generates a signal that indicates to the Reset Logic Unit 7504 that the Interrupt Service Routine has taken control of the host processor. The Reset Logic Unit determines if the preemption taking place is due to a task command (the Task Command register does not represent context) or if the preemption taking place is due to a non-task command (the Task Command is context and must be preserved) by using the Context Status Signal from the Task Scheduling Unit 7505. If the Reset Logic Unit 7504 determines the Interrupt Status register 7503 is being read and the Task Scheduling Unit 7505 has indicated the preemption is due to a task command, then the Reset Logic Unit 7504 clears the Task Command register 7506. This operation has the following effects:

If the preemption is due to a task command, when the Interrupt Service Routine 7502 begins and reads the Interrupt Status register 7503, the Task Command register 7506 clears. The Interrupt Service Routine 7502 then saves the processor registers and the cleared Task Command register 7506. When the task context is restored, the processor registers are restored and the Task Command register 7506 is restored. Since the Task Command register was cleared prior to saving it, restoring it effectively clears the task command. The task continues execution because it sees the task command has cleared.

If the preemption is due to a semaphore post, the Task Command register 7506 is not cleared when the Interrupt Status register 7503 is read. The Interrupt Service routine saves and later restores the Task Command register 7506 without changes. This allows a completely transparent preemption.

This solution allows the Task Command register 7506 to be cleared at the optimal time to ensure correct system operation and simplifies the Interrupt Service Routine 7502 because it simply saves/restores the Task Command register 7506 as any other register in the processor context.

Figure 40:
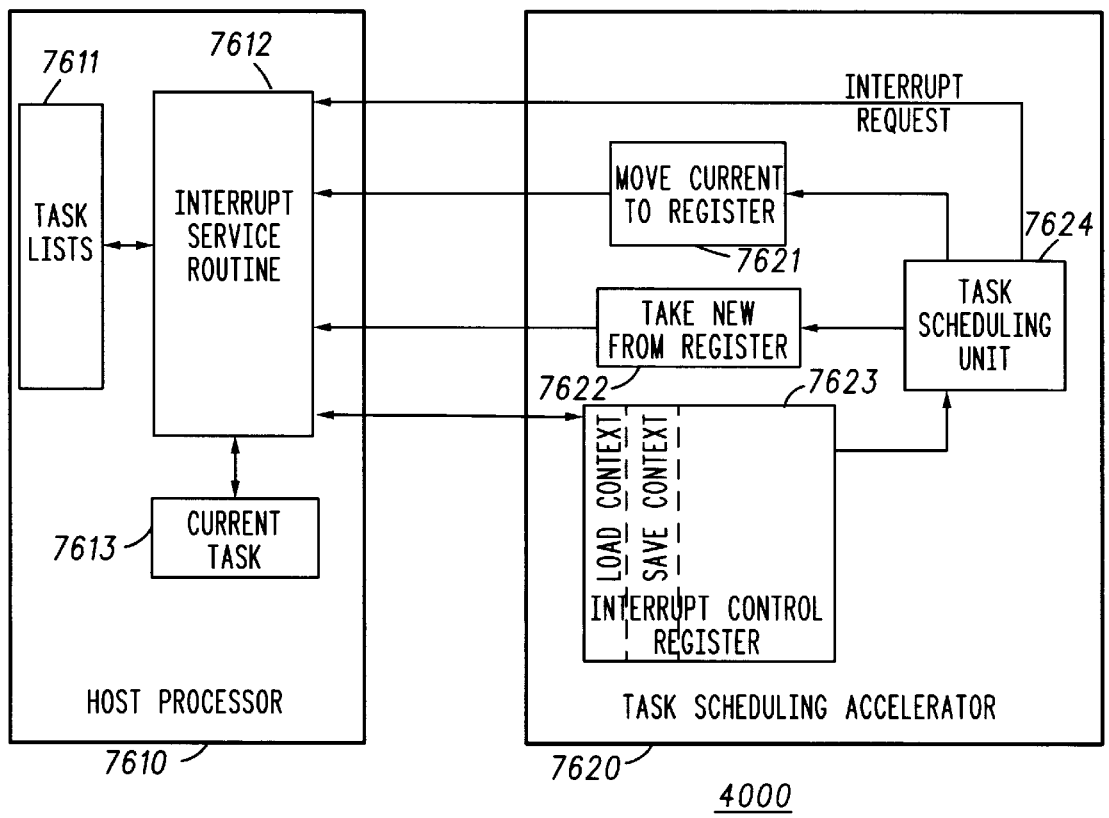
FIG. 40 is a block diagram illustrating specific details of how the Task Scheduling Accelerator efficiently communicates information about a task switch to the Host Processor.

A unique aspect of the device incorporating the TSA is the previously discussed method the TSA to specify and control a task switch. To determine a simplified diagram of only task switching indication, a simplified diagram is shown FIG. 40, numeral 4000. The TSA has been simplified to include only the components that are involved specifying and controlling the task switch. When the Task Scheduling Unit 7624 determines a task switch is necessary, an interrupt request is made to the Host Processor 7610 which activates the Interrupt Service Routine 7612. To make the task switch efficient, the Interrupt Service Routine 7612 must manipulate task lists representing both ready tasks and tasks waiting for semaphores. This is illustrated in FIG. 19, numeral 1900 where the Head Nodes 113 for the ready task lists 117 are contiguous with the Head Nodes 114 for the Semaphore Lists 118. This allows a single integer index to access any head node in any list. These lists are grouped together in 7611 of FIG. 40, numeral 4000. The task that is currently executing 7613 is not linked in to any list. An efficient mechanism is required to indicate the specific details on how to manipulate the task lists 7611 and the current task 7613. The Task Scheduling Accelerator 7620 specifies and controls the task switch using three registers: the Move Current To register 7621, the Take New From register 7622 and the Interrupt Control register 7623. The Move Current To register 7621 indicates which list to link the currently executing task into. The Save Context bit in the Interrupt Control Register 7623 determines if the Move Current To register is valid. If the Save Context bit indicates the Move Current To register is valid, the Current Task is linked into the list specified by the Move Current To register. Situations such as when a task exits would cause the Save Context bit to indicate that the Move Current To register is not valid since the Current Task object would not need to be saved. After the currently executing task has been handled, the Interrupt Service Routine 7612 needs to determine if there is another task to execute. The Interrupt Control Register Load Context bit indicates if the Take New From register 7622 is valid. If the Take New From register is valid, the Interrupt Service Routine 7612 removes the task at the head of the list specified by the Take New From register and sets this as the current task for execution. If the Load Context bit is clear, it indicates the Take New From register is invalid. The Take New From register may be invalid when the task set is idle and there are no tasks available for execution. Thus, the entire task switch can be specified and controlled using two registers specifying indexes (Move Current To 7621 and the Take New From 7622 registers) and a set of bits (Load Context and Save Context) to indicate if the registers are valid. This produces a very efficient task switch on the host processor.

A device according to the present invention accelerates scheduling of a preemptive, prioritized, multi-tasking system by balancing software and hardware components in a manner that maximizes processor efficiency. The multi-tasking system is typically implemented in an embedded processor system, a subscriber unit or a base station. This efficiency is achieved by utilizing a highly efficient, predetermined interrupt service routine in a host processor to respond to a task scheduling accelerator which is implemented in hardware. The task scheduling accelerator processes scheduling decisions requested by commands from tasks in the host processor.

A combined hardware and software data queuing mechanism for efficient data transfer from a host processor to an external device is presented. The host processor maintains a queue of data items and the external device maintains hardware pointers to the queue. Data is efficiently stored in the host processor's queue by reading the external hardware pointers when the external device data registers are full. Data is efficiently retrieved from the queue and written to the external device by an interrupt service routine by reading the external hardware pointers. The hardware queue pointers automatically increment and wrap when reaching a maximum value. Placing the queue pointers in hardware relieves the software of maintaining the pointers, incrementing them and wrapping them. Since the external hardware device has direct access to the queue pointers, the external hardware device asserts its interrupt to request data from the host processor only when it knows there is data queued in the host processor.

It should be understood the foregoing description of the TSA system is only illustrative of the invention. Various alternatives and modifications can be devised by those skilled in the art without departing from the current invention. One such modification is the ability of the state machine to advance its decisions incrementally as values are being written to its registers. The present invention embraces all such alternatives, modifications and variations falling within the scope of the claims.

I claim:

1. A device for efficient transfer of data items between a host processor and an external device comprising:

the host processor, coupled to external queue pointers, for queuing a plurality of data items and transferring the plurality of data items to the external device using an interrupt service routine unit, and the external device, coupled to the host processor for storing and incrementing/decrementing the external queue pointers, and processing the data items; wherein the external device further comprises:

a data register unit, coupled to the interrupt service routine unit and a data register interface, for storing at least one data item of the plurality of data items, a data processing unit, coupled to the data register unit, for processing the at least one data item stored in the data register unit, a status unit, coupled to the data register unit, for storing a data register status flag, an interrupt request unit, coupled to the status unit and a queue pointer unit, for asserting an interrupt, and the queue pointer unit, coupled to the interrupt service routine unit and the data register interface, for storing queue head and queue tail pointers and determining a queue status.

2. The device of claim 1 wherein the data register status flag represents one of: data register unit full and data register unit empty.

3. The device of claim 1 wherein the queue status represents one of: software queue empty and software queue data available.

4. The device of claim 1 wherein the interrupt request unit asserts an interrupt when the data register status flag indicates data register unit empty and a queue status indicates software queue data available.

5. The device of claim 1 wherein the queue pointer unit further comprises:

a queue max unit for storing a predetermined threshold, a queue head unit, coupled to a head compare unit and an interrupt service routine unit, for storing an integer value representing the offset to a head of a queue, a queue tail unit, coupled to a tail compare unit and data register interface, for storing an integer value representing the offset to a tail of a queue, the head compare unit, coupled to the queue max unit and the queue head unit, for determining if a queue head unit value has reached a first predetermined value and setting the queue head unit value to a second predetermined value if the first predetermined value is reached, the tail compare unit, coupled to the queue max unit and the queue tail unit, for determining if a queue tail unit value has reached a first predetermined value and setting the queue tail unit value to a second predetermined value if the first predetermined value is reached, and an empty compare unit, coupled to the queue head unit and queue tail unit, for determining if a queue status is software queue empty when the queue head unit value is equal to the queue tail unit value and the queue status is software queue data available when the queue head unit value is unequal to the queue tail unit value.

6. The device of claim 5 wherein the queue head unit automatically adjusts after being read by an interrupt service routine unit.

7. The device of claim 5 wherein the queue tail unit automatically adjusts after being read by a data register interface.

8. A device for efficient transfer of data items between a host processor and an external device comprising:

the host processor, coupled to external queue pointers, for queuing a plurality of data items and transferring the plurality of data items to the external device using an interrupt service routine unit, and the external device, coupled to the host processor for storing and incrementing/decrementing the external queue pointers, and processing the data items;

wherein the host processor comprises:

an algorithm unit for processing functions on the host processor, a data register interface, coupled to the algorithm unit, a queue pointer unit and a status unit, for writing selected data items to a data queue unit and writing other selected data items to a data register unit, the data queue unit, coupled to the data register interface, for storing a plurality of the selected data items, and the interrupt service routine unit, coupled to the data queue unit, the queue pointer unit and an interrupt request unit, for transferring the selected data items from the data queue unit to the data register unit.

9. The device of claim 8 wherein the data register interface further determines if the data register interface may be written by reading the status of a status unit.

10. The device of claim 9 wherein when the status unit indicates data register unit empty, the data register interface writes a data item to the data register unit.

11. The device of claim 9 wherein when the status unit indicates that the data register unit is full, the data register interface further reads the queue pointer unit to obtain an index from the queue tail unit and writes a data item to a queue using the index.

12. The device of claim 8 wherein the interrupt service routine unit reads the queue pointer unit to obtain an index from the queue head unit, retrieves a data item from a queue using the index and writes the data item to the data register unit.

13. A method for efficient transfer of data items between a host processor and an external device comprising the steps of:

using a host processor, coupled to external queue pointers for queuing a plurality of data items and transferring the plurality of data items to the external device using an interrupt service routine unit, using the external device coupled to the host processor for storing and manipulating the external queue pointers, and processing the data items, using a data register unit, coupled to the interrupt service routine unit and a data register interface, for storing at least one data item of the plurality of data items, using a data processing unit, coupled to the data register unit for processing the at least one data item stored in the data register unit, using a status unit, coupled to the data register unit, for storing a data register status flag, using an interrupt request unit, coupled to the status unit and a queue pointer unit, for asserting an interrupt, and using the queue pointer unit, coupled to the interrupt service routine unit and the data register interface, for storing queue head and queue tail pointers and determining a queue status.

14. The method of claim 13 wherein the data register status flag represents one of: data register unit full and data register unit empty.

15. The method of claim 13 wherein the queue status represents one of: software queue empty and software queue data available.

16. The method of claim 13 further including asserting, by the interrupt request unit, an interrupt when the data register status flag indicates data register unit empty and a indicating a queue status when software queue data is available.

17. A method for efficient transfer of data items between a host processor and an external device comprising the steps of:

using a host processor, coupled to external queue pointers, for queuing a plurality of data items and transferring the plurality of data items to the external device using an interrupt service routine unit, using the external device, coupled to the host processor for storing and manipulating the external queue pointers, and processing the data items, using an algorithm unit for processing functions on the host processor, using a data register interface, coupled to the algorithm unit, a queue pointer unit and a status unit, for writing selected data items to a data queue unit and writing other selected data items to a data register unit, using the data queue unit, coupled to the data register interface, for storing a plurality of the selected data items, using the interrupt service routine unit, coupled to the data queue unit, the queue pointer unit and an interrupt request unit, for transferring the selected data items from the data queue unit to the data register unit.

18. The method of claim 17 further including determining, by the data register interface, if the data register unit may be written by reading the status of a status unit.

19. The method of claim 18 wherein when the status unit indicates data register unit empty, further including writing, by the data register interface, a data item to the data register unit.

20. The method of claim 18 further including, when the status unit indicates that the data register unit is full, reading, by the data register interface, the queue pointer unit to obtain an index from the queue tail unit and writes a data item to a queue using the index.

21. The method of claim 17 further including, reading, by the interrupt service routine unit, the queue pointer unit to obtain an index from the queue head unit, retrieving a data item from a queue using the index and writing the data item to the data register unit.

22. An article of manufacture having a device for efficient transfer of data items between a host processor and an external device, the device comprising:

a host processor, coupled to external queue pointers, for queuing a plurality of data items and transferring the plurality of data items to the external device using an interrupt service routine unit, and the external device, coupled to the host processor for storing and manipulating the external queue pointers, and processing the data items, wherein the external device further comprises:

data register unit, coupled to the interrupt service routine unit and a data register interface, for storing at least one data item of the plurality of data items, a data processing unit, coupled to the data register unit, for processing the at least one data item stored in the data register unit, a status unit, coupled to the data register unit, for storing a data register status flag, an interrupt request unit, coupled to the status unit and a queue pointer unit, for asserting an interrupt, and the queue pointer unit, coupled to the interrupt service routine unit and the data register interface, for storing queue head and queue tail pointers and determining a queue status.

23. The article of manufacture of claim 22 wherein the data register status flag represents one of: data register unit full and data register unit empty.

24. The article of manufacture of claim 22 wherein the queue status represents one of: software queue empty and software queue data available.

25. The article of manufacture of claim 22 wherein the interrupt request unit asserts an interrupt when the data register status flag indicates data register unit empty and a queue status indicates software queue data available.

26. An article of manufacture having a device for efficient transfer of data items between a host processor and an external device, the device comprising:
- a host processor, coupled to external queue pointers, for queuing a plurality of data items and transferring the plurality of data items to the external device using an interrupt service routine unit, and
- the external device, coupled to the host processor for storing and manipulating the external queue pointers, and processing the data items;

wherein the host processor comprises:
- an algorithm unit for processing functions on the host processor,
- a data register interface, coupled to the algorithm unit, a queue pointer unit and a status unit, for writing selected data items to a data queue unit and writing other selected data items to a data register unit,
- the data queue unit, coupled to the data register interface, for storing a plurality of the selected data items, and
- the interrupt service routine unit, coupled to the data queue unit, the queue pointer unit and an interrupt request unit, for transferring the selected data items from the data queue unit to the data register unit.

27. The article of manufacture of claim 26 wherein the data register interface further determines if the data register interface may be written by reading the status of a status unit.

28. The device of claim 27 wherein when the status unit indicates data register unit empty, the data register interface writes a data item to the data register unit.

29. The device of claim 27 wherein when the status unit indicates that the data register unit is full, the data register interface further reads the queue pointer unit to obtain an index from the queue tail unit and writes a data item to a queue using the index.

30. The device of claim 26 wherein the interrupt service routine unit reads the queue pointer unit to obtain an index from the queue head unit, retrieves a data item from a queue using the index and writes the data item to the data register unit.

31. The article of manufacture of claim 26 wherein the article of manufacture is one of: a base station, a handheld radio, an engine controller, an electrical musical device, a security system, a cordless telephone, a modem, a fax machine, a disk drive, a cellular telephone, an automotive controller, and a motor control.

\* \* \* \* \*